US009933628B2

(12) United States Patent
Ariji

(10) Patent No.: US 9,933,628 B2
(45) Date of Patent: Apr. 3, 2018

(54) LENS DRIVING DEVICE AND CAMERA

(71) Applicant: Makoto Ariji, Tokyo (JP)

(72) Inventor: Makoto Ariji, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 64 days.

(21) Appl. No.: 14/377,185

(22) PCT Filed: Feb. 14, 2013

(86) PCT No.: PCT/JP2013/000822
§ 371 (c)(1),
(2) Date: Aug. 7, 2014

(87) PCT Pub. No.: WO2013/121788
PCT Pub. Date: Aug. 22, 2013

(65) Prior Publication Data
US 2016/0025995 A1    Jan. 28, 2016

(30) Foreign Application Priority Data
Feb. 14, 2012   (JP) ................. 2012-029729

(51) Int. Cl.
*G02B 7/02*   (2006.01)
*G02B 27/64*  (2006.01)
(Continued)

(52) U.S. Cl.
CPC ........... *G02B 27/646* (2013.01); *G02B 7/023* (2013.01); *G02B 7/08* (2013.01); *G02B 7/09* (2013.01);
(Continued)

(58) Field of Classification Search
CPC ..................................................... G02B 7/09
(Continued)

(56) References Cited
U.S. PATENT DOCUMENTS 5,303,089 A  *  4/1994  Ohno ................... G11B 7/0933
                                                  359/814
5,506,732 A  *  4/1996  Mori ................... G11B 7/0925
                                                  359/814
(Continued)

FOREIGN PATENT DOCUMENTS

EP          1729509 A2    12/2006
JP          11-064905 A    3/1999
(Continued)

OTHER PUBLICATIONS

Extended European Search Report for EP 13749951.3 dated Oct. 5, 2015.

*Primary Examiner* — Thomas K Pham
*Assistant Examiner* — Nicholas R Pasko
(74) *Attorney, Agent, or Firm* — Brundidge & Stanger, P.C.

(57) ABSTRACT

A lens driving device includes: a lens holder; a first coil wound onto the lens holder around the optical axis direction; a plurality of magnets having a first surface and a second surface perpendicular to the first surface, the magnets being disposed in a state in which the first surface opposes a circumferential surface of the first coil; a magnet holder that fixes the magnets apart from each other; a yoke constituting, together with the magnets, a magnetic circuit having a magnetic flux that traverses the first coil; a second coil provided opposite the second surface of the magnets; and a base on which the second coil is disposed. An auto-focus lens driving part that includes the lens holder, the first coil, the magnets, the magnet holder, and the yoke is held on the base so as to allow relative displacement in a direction perpendicular to the optical axis.

10 Claims, 37 Drawing Sheets

(51) Int. Cl.
  *G02B 7/08* (2006.01)
  *G03B 3/10* (2006.01)
  *G02B 7/09* (2006.01)
  *G02B 13/00* (2006.01)
  *G03B 3/12* (2006.01)
  *G03B 5/04* (2006.01)
  *G03B 5/02* (2006.01)
  *H04N 5/225* (2006.01)
  *H04N 5/232* (2006.01)

(52) U.S. Cl.
  CPC ............ *G02B 13/001* (2013.01); *G03B 3/10* (2013.01); *G03B 3/12* (2013.01); *G03B 5/02* (2013.01); *G03B 5/04* (2013.01); *G03B 2205/0007* (2013.01); *G03B 2205/0069* (2013.01); *H04N 5/2257* (2013.01); *H04N 5/23287* (2013.01)

(58) Field of Classification Search
  USPC .................................. 359/694–706, 811–830
  See application file for complete search history.

(56) References Cited

U.S. PATENT DOCUMENTS

| | | | | |
|---|---|---|---|---|
| 7,227,285 | B2* | 6/2007 | Osaka | H02K 41/0356 310/12.31 |
| 7,649,703 | B2* | 1/2010 | Shiraki | G02B 7/08 310/14 |
| 7,791,827 | B2* | 9/2010 | Lam | G02B 27/62 359/824 |
| 7,826,157 | B2* | 11/2010 | Chen | G02B 7/08 359/696 |
| 7,881,598 | B1* | 2/2011 | Wu | G03B 17/00 396/133 |
| 7,929,849 | B2* | 4/2011 | Ohno | G03B 5/00 396/55 |
| 8,009,373 | B2* | 8/2011 | Sata | G02B 27/646 359/813 |
| 8,026,978 | B2* | 9/2011 | Osaka | H04N 5/2257 348/335 |
| 9,036,260 | B2* | 5/2015 | Sugawara | G02B 7/08 359/557 |
| 9,046,642 | B2* | 6/2015 | Sugawara | G02B 7/08 |
| 2006/0284495 | A1 | 12/2006 | Seo et al. | |
| 2007/0009244 | A1 | 1/2007 | Takahashi | |
| 2007/0188620 | A1 | 8/2007 | Takahashi | |
| 2008/0192124 | A1* | 8/2008 | Nagasaki | G02B 7/02 348/208.11 |
| 2010/0135648 | A1 | 6/2010 | Enomoto | |
| 2011/0097062 | A1* | 4/2011 | Tsuruta | G02B 7/022 396/55 |
| 2011/0103782 | A1* | 5/2011 | Tsuruta | G02B 7/022 396/55 |
| 2011/0176046 | A1 | 7/2011 | Hu et al. | |
| 2011/0217029 | A1* | 9/2011 | Wu | G03B 17/00 396/55 |
| 2011/0286732 | A1* | 11/2011 | Hosokawa | G03B 3/02 396/55 |
| 2012/0154614 | A1 | 6/2012 | Moriya et al. | |
| 2012/0229901 | A1* | 9/2012 | Moriya | G03B 3/10 359/557 |
| 2012/0229926 | A1* | 9/2012 | Wade | G02B 7/08 359/824 |
| 2013/0089311 | A1* | 4/2013 | Jung | H04N 5/2257 396/55 |
| 2015/0226978 | A1* | 8/2015 | Sugawara | G02B 7/08 359/557 |

FOREIGN PATENT DOCUMENTS

| | | | | |
|---|---|---|---|---|
| JP | 2004-274242 | A | 9/2004 | |
| JP | 2006-065352 | A | 3/2006 | |
| JP | 2006-215095 | A | 8/2006 | |
| JP | 2007-017874 | A | 1/2007 | |
| JP | 2007-017957 | A | 1/2007 | |
| JP | 2007-041455 | A | 2/2007 | |
| JP | 2007-093953 | A | 4/2007 | |
| JP | 2007-212876 | A | 8/2007 | |
| JP | 2008-015159 | A | 1/2008 | |
| JP | 2008-026634 | A | 2/2008 | |
| JP | 2008-268476 | A | 11/2008 | |
| JP | 2009-145771 | A | 7/2009 | |
| JP | 2009-288770 | A | 12/2009 | |
| JP | WO 2011021559 A1 * | | 2/2011 | ............... G03B 3/10 |
| JP | 2011-065140 | A | 3/2011 | |
| JP | 2011-081417 | A | 4/2011 | |
| JP | 2011-085666 | A | 4/2011 | |
| JP | 2011-085754 | A | 4/2011 | |
| JP | WO 2011062123 A1 * | | 5/2011 | ............... G02B 7/08 |
| JP | 2011-107470 | A | 6/2011 | |
| JP | 2011-113009 | A | 6/2011 | |
| JP | 2011-128583 | A | 6/2011 | |
| JP | 2011-203283 | A | 10/2011 | |
| JP | 2012-008379 | A | 1/2012 | |
| KR | WO 2011159117 A2 * | | 12/2011 | ........... H04N 5/2257 |

* cited by examiner

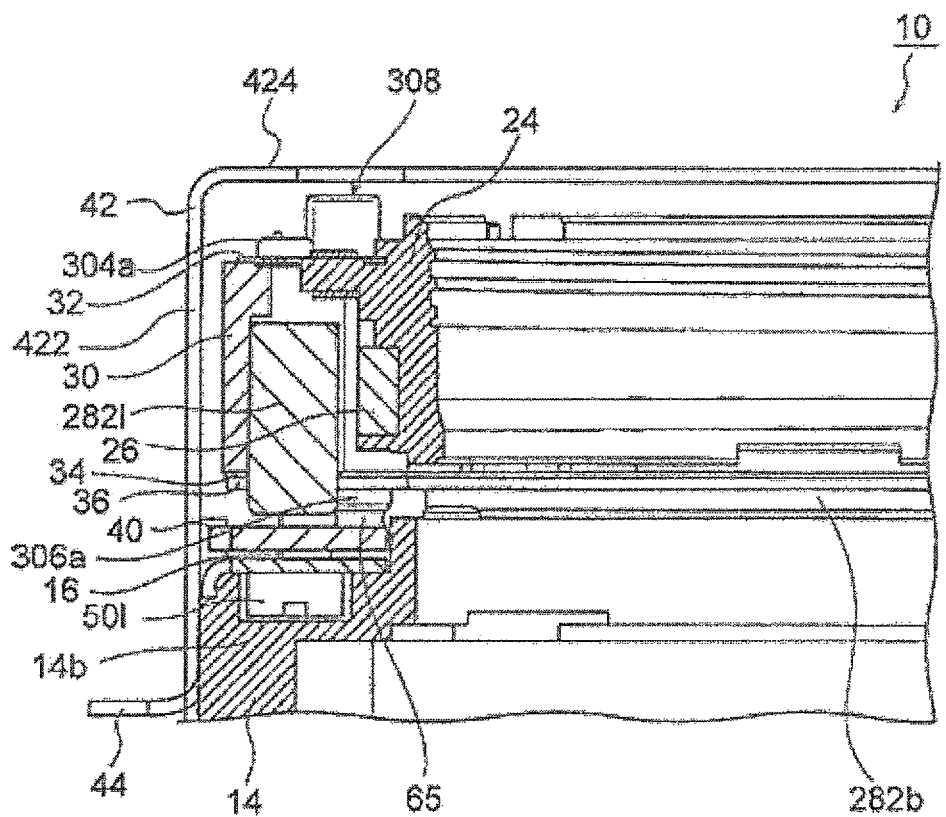
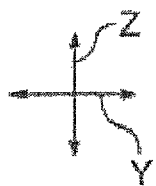
FIG. 2

| | BAND NOT HIGHER THAN PRIMARY RESONANCE FREQUENCY $|a|>|b|$ | BAND NOT LOWER THAN PRIMARY RESONANCE FREQUENCY $|a|>|b|$ | BAND NOT LOWER THAN PRIMARY RESONANCE FREQUENCY $|a|<|b|$ |
|---|---|---|---|
| MAGNETIC FLUX DENSITY GIVEN BY MAGNET: a | 0deg | -180deg | -180deg |
| MAGNETIC FLUX DENSITY GENERATED IN COIL: b | 0deg | 0deg | 0deg |
| TOTAL MAGNETIC FLUX DENSITY: a+b | 0deg | -180deg | 0deg |

FIG. 10

| | BAND NOT HIGHER THAN PRIMARY RESONANCE FREQUENCY $\|a\| > \|b\|$ | BAND NOT LOWER THAN PRIMARY RESONANCE FREQUENCY $\|a\| > \|b\|$ | BAND NOT LOWER THAN PRIMARY RESONANCE FREQUENCY $\|a\| < \|b\|$ |
|---|---|---|---|
| MAGNETIC FLUX DENSITY GIVEN BY MAGNET: a | 0deg | -180deg | -180deg |
| MAGNETIC FLUX DENSITY GENERATED IN COIL: b | -180deg | -180deg | -180deg |
| TOTAL MAGNETIC FLUX DENSITY: a+b | 0deg | -180deg | -180deg |

FIG. 17

LENS DRIVING DEVICE AND CAMERA

TECHNICAL FIELD

This invention relates to a lens driving device and a camera and, in particular, to a lens driving device and a camera that are suitable for a small-sized mobile terminal and that are capable of picking up images without blurs by stabilizing the image blurring (movement) occurring upon shooting an image.

BACKGROUND ART

Hitherto, various lens driving devices have been proposed which are capable of taking photographs with a high degree by stabilizing blurry images on an image-forming surface although there are blurry images (movement) upon shooting the static image.

As image stabilizing methods, "optical methods" such as a sensor shift method or a lens shift method and "a software stabilizing method" for stabilizing the blurry images using image processing by software are known. An image stabilizing method introduced in the mobile phone mainly adopts the software stabilizing method.

The software stabilizing method is disclosed, for example, in Japanese Unexamined Patent Application Publication No. H11-64905 (JP-A-11-064905) (PTL 1). The software stabilizing method disclosed in PTL1 comprises the steps of removing noise components from detected results of detection means, of calculating, from a detected signal in which the noise components are removed, particular information necessary to stabilize image blurred due to an image blurring of an image pickup device, thereby making a picked-up image be at a standstill in a nonshaking state where the image pickup device remains at rest.

However, the image stabilizing method of "the software stabilizing method" disclosed in PTL1 has a problem so that image quality degrades in compassion with the "optical method" which will later be described. In addition, the image stabilizing method of the software stabilizing method has disadvantage so that a taking time interval becomes longer because processing of the software is included therein.

Therefore, as the image stabilizing methods, request of "the optical methods" are on the increase with higher pixels in recent years. As the image stabilizing methods of "the optical methods", "a sensor shift method", "a lens shift method", and "an optical unit tilt method" are known.

The sensor shift method is disclosed, for example, in Japanese Unexamined Patent Application Publication No. 2004-274242 (JP-A-2004-274242) (PTL 2). A digital camera disclosed in PTL 2 has structure in which an image pickup device (CCD) can shift with a center at a reference position (center) by an actuator. The actuator moves the CCD in response to blurry images detected by a blurry sensor to stabilize blurry images. The CDD is disposed in a CCD moving portion. The CCD can move in an X-Y plane orthogonal to a Z-axis by the CCD moving portion. The CCD moving portion mainly comprises three members: a base plate fixed to a housing; a first slider moving with respect to the base plate in a direction of an X-axis; and a second slider moving with respect to the first slider in a direction of a Y-axis.

However, in "the sensor shift method" as disclosed in PTL 2, the CCD moving portion (a movable mechanism) becomes large. It is therefore difficult in terms of size (outer dimensions, height) to adopt the image stabilizer of the sensor shift method to a miniature camera for a mobile phone.

Now, the description will proceed to the lens shift method.

By way of illustration, Japanese Unexamined Patent Application Publication No. 2009-145771 (JP-A-2009-145771) (PTL 3) discloses an image stabilizing device including an image stabilizing unit for driving a correction lens. The image stabilizing unit comprises a base plate serving as a fixed member, a movable mirror barrel holding the correction lens movably, three balls sandwiched between the base plate and the movable mirror barrel, and a plurality of elastic bodies for elastically supporting the movable mirror barrel with respect to the base plate, two coils fixed to the base plate, and two magnets fixed to the movable mirror barrel.

In addition, Japanese Unexamined Patent Application Publication No. 2006-65352 (JP-A-2006-065352) (PTL 4) discloses "an image stabilizing device" for stabilizing image blurred by moving and controlling a particular lens group (which will later be called "a correction lens") among an image pickup optical system comprising a plurality of lens groups in two directions orthogonally crossing to each other within a plane perpendicular to an optical axis. In the image stabilizing device disclosed in PTL 4, the correction lens is movably supported with respect to a fixed frame up and down (in a pitch direction) and from side to side (in a yaw direction) via a pitching moving box and a yawing moving frame.

Japanese Unexamined Patent Application Publication No. 2008-26634 (JP-A-2008-026634) (PTL 5) discloses "an image stabilizing unit" including a stabilizing optical member for stabilizing blurry images formed by an imaging optical system by being moved to a direction crossed with an optical axis of the imaging optical system. In the stabilizing optical member disclosed in PTL 5, a lens holding flame for holding a correction lens is movably supported with respect to a receiving barrel in a pitch direction and a yaw direction via a pitch slider and a yaw slider.

Japanese Unexamined Patent Application Publication No. 2006-215095 (JP-A-2006-215095) (PTL 6) discloses "an image stabilizing device" which is capable of moving a correction lens by small driving force and which is capable of rapidly and accurately stabilizing the blurry images. The image stabilizing device disclosed in PTL 6 comprises a holding frame holding the correction lens, a first slider for slidably supporting the holding frame in a first direction (a pitch direction), a second slider for slidably supporting the holding frame in a second direction (a yaw direction), a first coil motor for driving the first slider in the first direction, and a second coil motor for driving the second slider in the second direction.

Japanese Unexamined Patent Application Publication No. 2008-15159 (JP-A-2008-015159) (PTL 7) discloses a lens barrel comprising an image stabilizing optical system provided to enable to move in a direction orthogonal to an optical axis. In the image stabilizing optical system disclosed in PTL 7, a movable VR unit disposed in a VR body unit holds a correction lens (a third lens group) and is disposed so as to enable to move in an X-Y plane orthogonal to the optical axis.

Japanese Unexamined Patent Application Publication No. 2007-212876 (JP-A-2007-212876) (PTL 8) discloses "an image stabilizer" which is capable to stabilize image blurred by performing control so that the optical axis of a correction lens held in a moving frame may be aligned with the optical axis of a lens system by moving the correction lens in first and second directions orthogonal to the optical axis of the lens system by driving means.

Japanese Unexamined Patent Application Publication No. 2007-17957 (JP-A-2007-017957) (PTL 9) discloses "an image stabilizer" for stabilizing image blurred by driving a correcting lens for stabilizing the blurry images that are formed by a lens system by operation of a lens driving part in a first direction and a second direction which are perpendicular to an optical axis of the lens system and which are perpendicular to each other. In the image stabilizer disclosed in PTL 9, the lens driving part is provided at one side of the correcting lens in the direction perpendicular to the optical axis.

Japanese Unexamined Patent Application Publication No. 2007-17874 (JP-A-2007-017874) (PTL 10) discloses "an image stabilizer" which is capable to stabilize blurry images by performing control so that the optical axis of a correction lens held in a moving frame may be aligned with the optical axis of a lens system by moving the correction lens in first and second directions which are perpendicular to the optical axis of the lens system and which are perpendicular to each other. The image stabilizer disclosed in PTL 10 comprises driving means including a coil and a magnet which can be relatively moved. One of the coil and the magnet is fixed to a moving frame while another is fixed to a supporting frame for supporting a movable frame movably. In addition, the image stabilizer disclosed in PTL 10 comprises a first Hall element for detecting position information related to the first direction of the correction lens by detecting a magnetic force of the magnet and a second Hall element for detecting position information related to the second direction of the correction lens by detecting the magnetic force of the magnet.

Any of the image stabilizers (the image stabilizing devices) of "the lens shift method" disclosed in the above-mentioned PTLs 3 to 10 has structure for moving and adjusting the correction lens in a plane perpendicular to the optical axis. However, such image stabilizers (the image stabilizing devices) have problems in which structure is complicated and they are unsuited for miniaturization. That is, like in the above-mentioned image stabilizer of the sensor shift method, it is difficult in terms of size (outer dimensions, height) to adopt the image stabilizer of the lens shift method to the miniature camera for the mobile phone.

In order to resolve the above-mentioned problems, an image stabilizer (an image stabilizing device) has been proposed which stabilizes blurry images (image blurred) by swinging a lens module (a camera module) for holding a lens and a pickup device (an image sensor) in itself. Such a method will be referred to herein as "an optical unit tilting method".

Now, the description will proceed to "the optical unit tilting method".

By way of illustration, Japanese Unexamined Patent Application Publication No. 2007-41455 (JP-A-2007-041455) (PTL 11) discloses "an image stabilizer of an optical device" comprising a lens module for holding a lens and an imaging element, a frame structure for rotatably supporting the lens module by rotary shafts, driving means (actuators) for rotating the lens module with respect to the frame structure by imparting driving force to driven parts (rotors) of the rotary shafts, and energizing means (leaf springs) for energizing the driving means (the actuators) to the driven parts (the rotors) of the rotary shafts. The frame structure comprises an inner frame and an outer frame. The driving means (the actuators) is disposed so as to be in contact with the driven parts (the rotors) of the rotary shafts from directions perpendicular to an optical axis. The driving means (the actuators) comprises a piezoelectric element and an action part of the rotary shafts side. The action part drives the rotary shafts by vertical vibrations and bending vibrations of the piezoelectric element.

However, it is necessary for the image stabilizer of "the optical unit tilting method" disclosed in PTL 11 to cover the lens module with the frame structure comprising the inner frame and the outer frame. As a result, there is a problem in which the image stabilizer becomes large.

In addition, Japanese Unexamined Patent Application Publication No. 2007-93953 (JP-A-2007-093953) (PTL 12) discloses "an image stabilizer for a camera" for stabilizing blurry images upon shooting a static image by accommodating a camera module in which a pickup lens and an image sensor are integrated in a housing, by swingably mounting the camera module in housing at a center of first and second axes which are orthogonal to a pickup optical axis and which cross each other at right angles, and by controlling the attitude of the camera module as a whole in the housing in response to a shake of the housing detected by a shake sensor. The image stabilizer for the camera disclosed in PTL 12 comprises an intermediate frame for swingably supporting an inner frame in which the camera module is fixed at the first axis as a center from the outside thereof, an outer frame, fixed to the housing, for swingably supporting the intermediate frame at the second axis as a center from the outside thereof, first driving means, mounted inside the intermediate frame, for swinging the inner frame around the first axis in response to a shake signal from a shake sensor (a first sensor module for detecting a shake in a pitch direction), and second driving means, mounted inside the outer frame, for swinging the intermediate frame around the second axis in response to a shake signal from a shake sensor (a second sensor module for detecting a shake in a yaw direction). The first driving means comprises a first stepping motor, a first reduction gear train for reducing a rotation thereof, and a first cam for swinging the inner frame through a first cam follower provided to the inner frame by rotating it integral with a final stage gear. The second driving means comprises a second stepping motor, a second reduction gear train for reducing a rotation thereof, and a second cam for swinging the intermediate frame through a second cam follower provided to the intermediate frame by rotating it integral with a final stage gear.

However, also in the image stabilizer of "the optical unit tilting method" disclosed in PTL 12, it is necessary to cover the camera module with the inner frame, the intermediate frame, and the outer frame. As a result, the image stabilizer becomes large. Furthermore, inasmuch as there are the rotary axes in "the optical unit tilting method", there is a problem in which friction is produced between a hole and an axis and it results in exhibiting hysteresis.

Furthermore, Japanese Unexamined Patent Application Publication No. 2009-288770 (JP-A-2009-288770) (PTL 13) discloses an optical photography device which is capable of reliably stabilizing blurry images by improving the structure of a photography unit drive mechanism for stabilizing the blurry images in a photography unit. The optical photography device disclosed in PTL 13 comprises, inside a fixed cover, the photography unit (a movable module) and an image stabilizing mechanism for stabilizing blurry images by displacing the photography unit. The photography unit is for moving a lens along a direction of an optical axis. The photography unit comprises a moving body for holding the lens and a fixed aperture therein, a lens driving mechanism for moving the moving body in the direction of the optical axis, and a supporting body in which the lens driving mechanism and the moving body are mounted. The lens driving mechanism comprises a lens driving coil, a lens driving magnet, and a yoke. The photography unit is supported to a fixed body via four suspension wires. At two positions on both sides sandwiching the optical axis, a first photography unit drive mechanism and a second photography unit drive mechanism, which are for stabilizing the blurry images, are respectively provided as a pair. In each of their photography unit drive mechanisms, a photography unit drive magnet is held in a movable body side while a photography unit drive coil is held in a fixe body side.

However, in the optical photography device of "the optical unit tilting method" disclosed in PTL 13, it is necessary to use the photography unit drive magnets as well as the lens drive magnet. As a result, there is a problem in which the optical photography device becomes large.

In addition, Japanese Unexamined Patent Application Publication No. 2011-107470 (JP-A-2011-107470) (PTL 14) discloses a lens driving device which is capable of not only driving a lens in a direction of an optical axis but also stabilizing blurry images. The lens driving device disclosed in PTL 14 comprises a first holding body for holding the lens so as to be movable it in the direction of the optical axis (Z direction), a second holding body for holding the first holding body so as to be movable it in the Z direction, a fixed body for holding the second holding body so as to be movable it in a direction which is substantially orthogonal to the Z direction, a first driving mechanism for driving the first holding body in the Z direction, a second driving mechanism for driving the second holding body in an X direction, and a third driving mechanism for driving the second holding body in a Y direction. The first holding body is supported to the second holding body by a first supporting member made of an elastic material so as to be movable in the Z direction. The second holding body is supported to the fixed body by a second supporting member made of an elastic material so as to be movable in the Z direction. The first driving mechanism comprises a first drive coil and a first drive magnet, the second driving mechanism comprises a second drive coil and a second drive magnet, and the third driving mechanism comprises a third drive coil and a third drive magnet.

In the lens driving device disclosed in PTL 14, three kinds of driving mechanisms consisting of the first through the third driving mechanism require as driving mechanisms, and each of the first through third driving mechanisms comprises a coil and a magnet, independently. Therefore, there is a problem in which the number of parts is increased.

Japanese Unexamined Patent Application Publication No. 2011-113009 (JP-A-2011-113009) (PTL 15) discloses a lens driving device which uses a plurality of wires as the second supporting member and which comprises a buckling prevention member for preventing buckling of the wires while its basic structure is similar to the lens driving mechanism disclosed in the above-mentioned PTL 14. Each wire is formed in a straight line and the second holding member is supported by the wires so as to be movable in the direction which is substantially orthogonal to the Z direction. The buckling prevention member is made of an elastic member and becomes elastically deformed in the Z direction at a force smaller than a buckling load of the wire. More specifically, the buckling prevention member comprises a wire fixed portion formed to a leaf spring for the first supporting member. When a force applies to a movable part such as the second holding body downwards, the wire fixed portion becomes elastically deformed downwards.

In also the lens driving device disclosed in PTL 15, in the manner similar to the lens driving device disclosed in PTL 14, there is a problem in which the number of parts is increased.

Therefore, the present inventors (present applicants) proposed an image stabilizer which is capable of miniaturizing and lowering height by sharing a permanent magnet for an auto-focusing (AF) lens driving device as a permanent magnet for the image stabilizer (see, Japanese Unexamined Patent Application Publication No. 2011-65140 (JP-A-2011-065140) (PTL 16)).

The image stabilizer disclosed in PTL 16 is called an image stabilizer of "a barrel shift method" because camera shake is corrected by moving a lens barrel received in an AF lens driving device in itself. In addition, the image stabilizers of "the barrel shift method" are classified into "a moving magnet method" in which the permanent magnet moves (is movable) and "a moving coil method" in which the coil moves (is movable).

PTL 16 discloses, as the image stabilizer of "the moving magnet method" in a second exemplary embodiment thereof, an image stabilizer which is provided with a permanent magnet comprising four first permanent magnet pieces and four second permanent magnet pieces which are disposed so as to apart from up and down in a direction of an optical axis and which is provided with a stabilizer coil disposed between the upper four first permanent magnet pieces and the lower four second permanent magnet pieces. That is, the second exemplary embodiment comprises the image stabilizer of "the moving magnet method" including the permanent magnet comprising eight permanent magnet pieces in total.

In the image stabilizer disclosed in PTL 16, a base is disposed so as to apart from at a bottom portion of the auto-focusing lens driving device and a plurality of suspension wires have one ends which are fixed to the base at outer regions thereof. The plurality of suspension wires has other ends which are firmly fixed to the auto-focusing lens driving device.

On the other hand, Japanese Patent Application Laid-Open No. 2011-128583 (PTL 17) discloses a lens driving device in which an AF magnet and an image stabilizer magnet are provided. The lens driving device disclosed in PTL 17 includes: the aforementioned first driving portion that includes a first magnet that is mounted to a focus portion, and a first coil that is mounted to a base portion and is disposed facing the first magnet, so as to thereby cause the focus portion to move relative to the base portion along a direction perpendicular to an optical axis; and a second driving portion that includes a second coil that is mounted to a lens portion, and a second magnet that is mounted to a focus base and is disposed facing the second coil.

CITATION LIST

Patent Literature

PTL 1
Japanese Patent Application Laid-Open No. HEI 11-64905
PTL 2
Japanese Patent Application Laid-Open No. 2004-274242
PTL 3
Japanese Patent Application Laid-Open No. 2009-145771

PTL 4

Japanese Patent Application Laid-Open No. 2006-65352

PTL 5

Japanese Patent Application Laid-Open No. 2008-26634

PTL 6

Japanese Patent Application Laid-Open No. 2006-215095

PTL 7

Japanese Patent Application Laid-Open No. 2008-15159

PTL 8

Japanese Patent Application Laid-Open No. 2007-212876

PTL 9

Japanese Patent Application Laid-Open No. 2007-17957

PTL 10

Japanese Patent Application Laid-Open No. 2007-17874

PTL 11

Japanese Patent Application Laid-Open No. 2007-41455

PTL 12

Japanese Patent Application Laid-Open No. 2007-93953

PTL 13

Japanese Patent Application Laid-Open No. 2009-288770 (FIG. 1 to FIG. 5)

PTL 14

Japanese Patent Application Laid-Open No. 2011-107470

PTL 15

Japanese Patent Application Laid-Open No. 2011-113009 (paragraphs 0085 to 0088, FIG. 11)

PTL 16

Japanese Patent Application Laid-Open No. 2011-65140 (paragraphs 0091 to 0149, FIG. 5 to FIG. 11)

PTL 17

Japanese Patent Application Laid-Open No. 2011-128583 (paragraphs 0030 to 0083, FIG. 1 to FIG. 5)

SUMMARY OF INVENTION

Technical Problem

The "software-type" image stabilizing method disclosed in PTL 1 has a problem of image quality degrading in comparison with an optical type, and also has the disadvantage of taking a long time, since it includes both imaging time and software processing time.

The "sensor-shifting" image stabilizer (digital camera) disclosed in the above-mentioned PTL 2 has a large CCD moving portion (movable mechanism), and is therefore difficult to apply to a small camera for mobile phone use from a size (external shape and height) standpoint.

On the other hand, each of the image stabilizers (image stabilizing devices) of "the lens shift method" disclosed in the above-mentioned PTLs 3 to 10 has a structure for moving and adjusting the correction lens in a plane perpendicular to the optical axis, and there is therefore a problem in that their structure is complex and is not suitable for miniaturization.

On the other hand, in the image stabilizing device of the "optical unit tilting method" disclosed in PTL 11, it is necessary to cover the lens module with a frame structure including an inner frame and an outer frame. As a result, there is the problem that the image stabilizing device becomes large. In the image stabilizer that adopts the "optical unit tilting method" disclosed in PTL 12 also, it is necessary to cover the camera module with an inner frame, an intermediate frame, and an outer frame. As a result, the image stabilizer becomes large. Furthermore, because a rotation shaft is used with the "optical unit tilting method", there is also a problem of the occurrence of friction between a hole and the shaft, resulting in the occurrence of hysteresis. In the optical photography device that adopts the "optical unit tilting method" disclosed in PTL 13, it is necessary to use the photography unit drive magnets as well as the lens drive magnet. As a result, there is a problem that the optical photography device becomes large. In the lens driving device disclosed in PTL 14, three kinds of driving mechanisms consisting of a first to a third driving mechanism are required as driving mechanisms, and each of the first to third driving mechanisms includes a coil and a magnet, independently. Therefore, there is a problem that the number of parts is increased. In the lens driving device disclosed in PTL 15 also, similarly to the lens driving device disclosed in the aforementioned PTL 14, there is a problem that the number of parts is increased. In the image stabilizer disclosed in PTL 16, since the permanent magnet includes eight permanent magnet pieces, there is a problem that there are a large number of parts. Further, since an image stabilizer coil is disposed between four first permanent magnet pieces on an upper side and four second permanent magnet pieces on a lower side, there is also the problem that assembly of the image stabilizer requires time and effort. In the lens driving device disclosed in PTL 15, since a first driving portion and a second driving portion each include a coil and a magnet, independently, there is a problem that the number of parts is increased.

An object of the present invention is to provide a lens driving device and a camera that can be miniaturized.

Other objects of this invention will become clear as the description proceeds.

Solution to Problem

A lens driving device according to the present invention including:

a lens holder to which a lens barrel is mountable, the lens holder being movable in a direction of an optical axis;

a first coil wound around the lens holder about the optical axis;

a plurality of magnets that have a first surface magnetized to a south pole or a north pole and a second surface that is perpendicular to the first surface and the optical axis, the magnets being disposed in a state in which the first surface faces a circumferential face of the first coil;

a magnet holder that fixes the plurality of magnets apart from each other;

a yoke constituting, together with the plurality of magnets, a magnetic circuit that generates a magnetic flux that crosses the first coil;

a second coil that is provided facing the second surface of the magnet; and a base on which the second coil is disposed;

wherein an auto-focusing lens driving portion that includes the lens holder, the first coil, the plurality of magnets, the magnet holder and the yoke is held so as to be relatively movable in a direction perpendicular to the optical axis with respect to the base.

A camera according to the present invention may include the above-described lens driving device incorporated therein.

Advantageous Effect of Invention

According to the present invention, a lens driving device and a camera that can be miniaturized can be provided.

BRIEF DESCRIPTION OF DRAWINGS

FIG. 2 is a partial vertical cross sectional view of the lens driving device illustrated in FIG. 1;

FIG. 10 is a view tabulated for the relationships of FIG. 9;

FIG. 17 is a view tabulated for the relationships of FIG. 16;

DESCRIPTION OF EMBODIMENTS

Referring now to Figures, the description will proceed to exemplary embodiments of the present invention.

First Exemplary Embodiment

Figure 1:
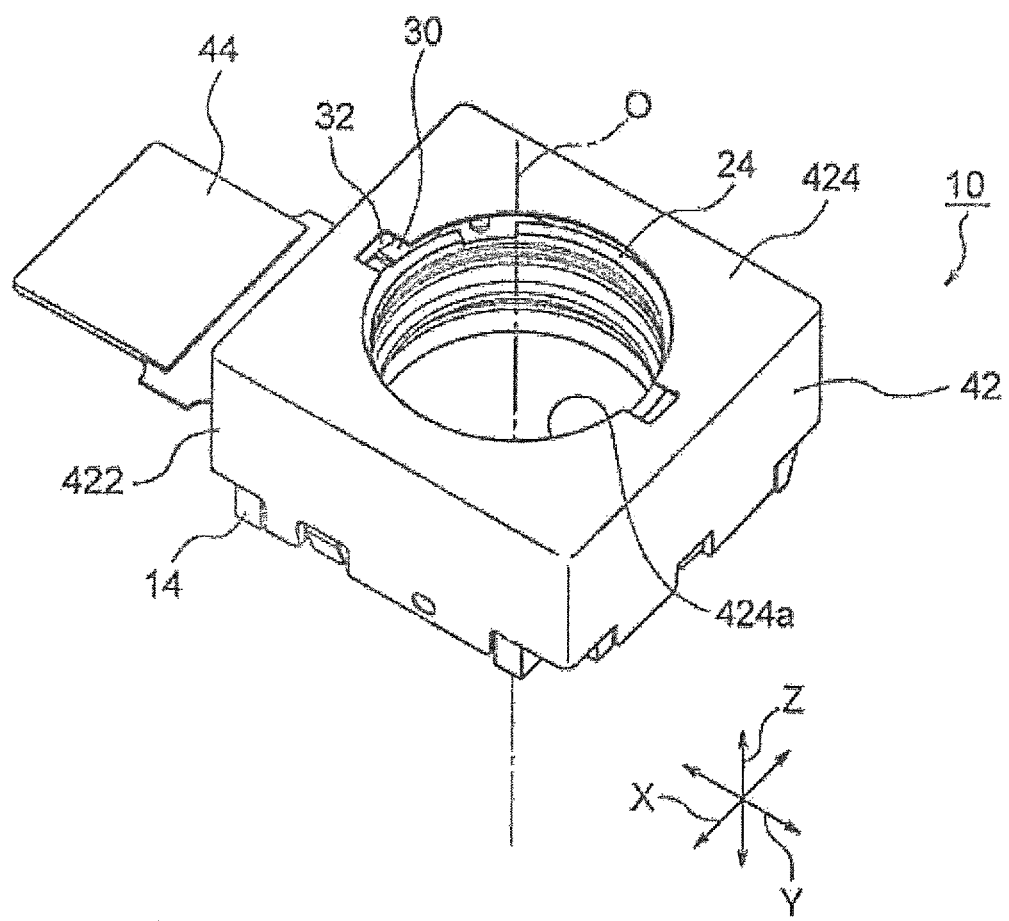
FIG. 1 is an external perspective view of a lens driving device according to a first exemplary embodiment of the present invention.
Figure 3:
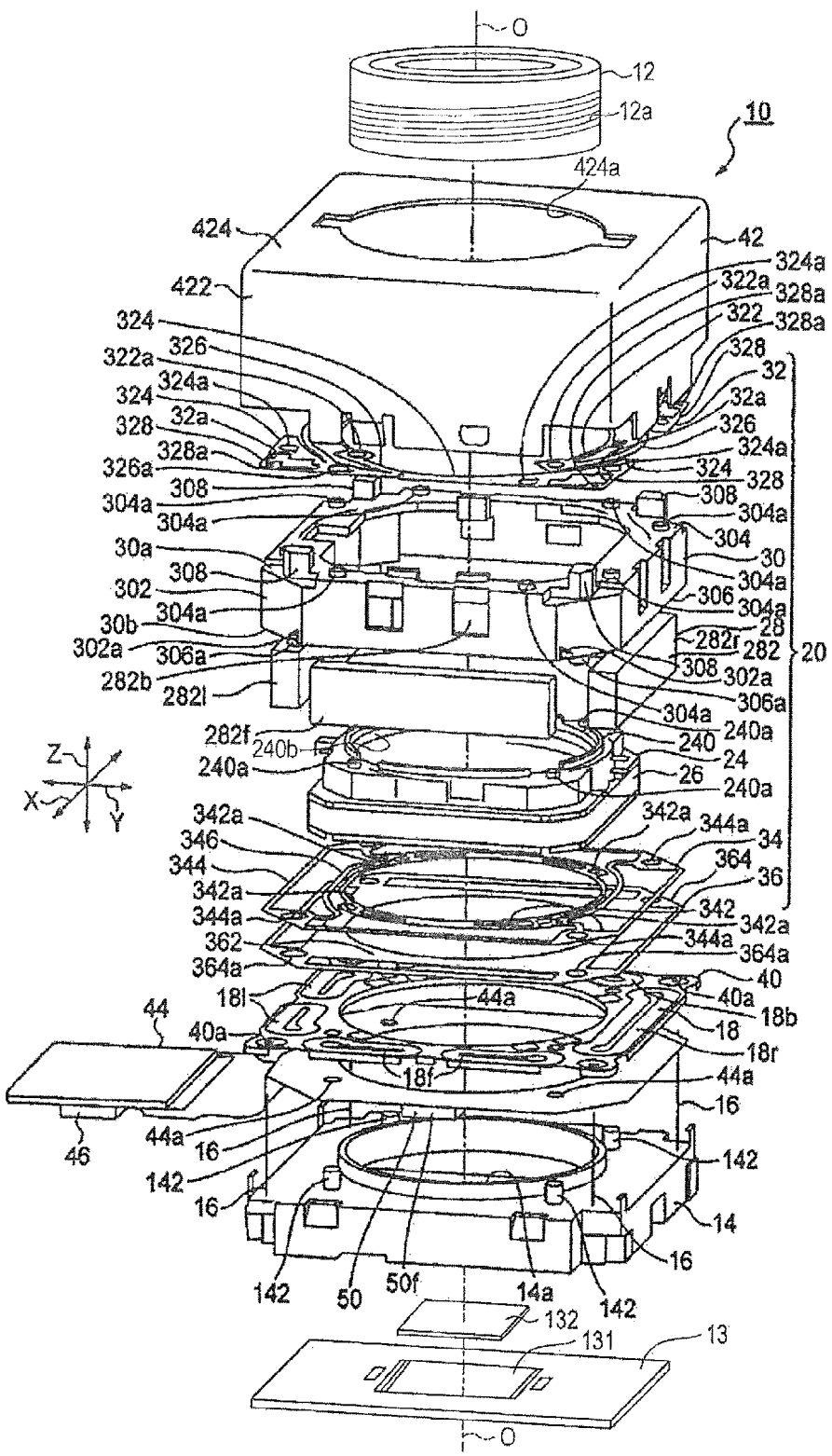
FIG. 3 is an exploded perspective view of the lens driving device illustrated in FIG. 1.

Referring to FIGS. 1 through 3, the description will proceed to lens driving device 10 according to a first exemplary embodiment of this invention. FIG. 1 is an external perspective view of lens driving device 10. FIG. 2 is a partial vertical cross sectional view of lens driving device 10. FIG. 3 is an exploded perspective view of lens driving device 10.

Herein, in the manner shown in FIGS. 1 through 3, an orthogonal coordinate system (X, Y, Z) is used. In a state illustrated in FIGS. 1 through 3, in the orthogonal coordinate system (X, Y, X), an X-axis direction is a fore-and-aft direction (depth direction), a Y-axis direction is a left-and-right direction (width direction), and a Z-axis direction is an up-and-down direction (height direction). In addition, in the example being illustrated in FIGS. 1 through 3, the up-and-down direction Z is a direction of optical axis O of a lens. In the exemplary embodiment, the X-axis direction (the fore-and-aft direction) is called a first direction while the Y-axis direction (the left-and-right direction) is called in a second direction.

However, in an actual use situation in which a user shoots a front subject, the direction of optical axis O, namely, the Z-axis direction becomes a fore-and-aft direction. In other words, an upper direction of the Z-axis becomes a front direction while a lower direction of the Z-axis becomes a rear direction.

Figure 44:
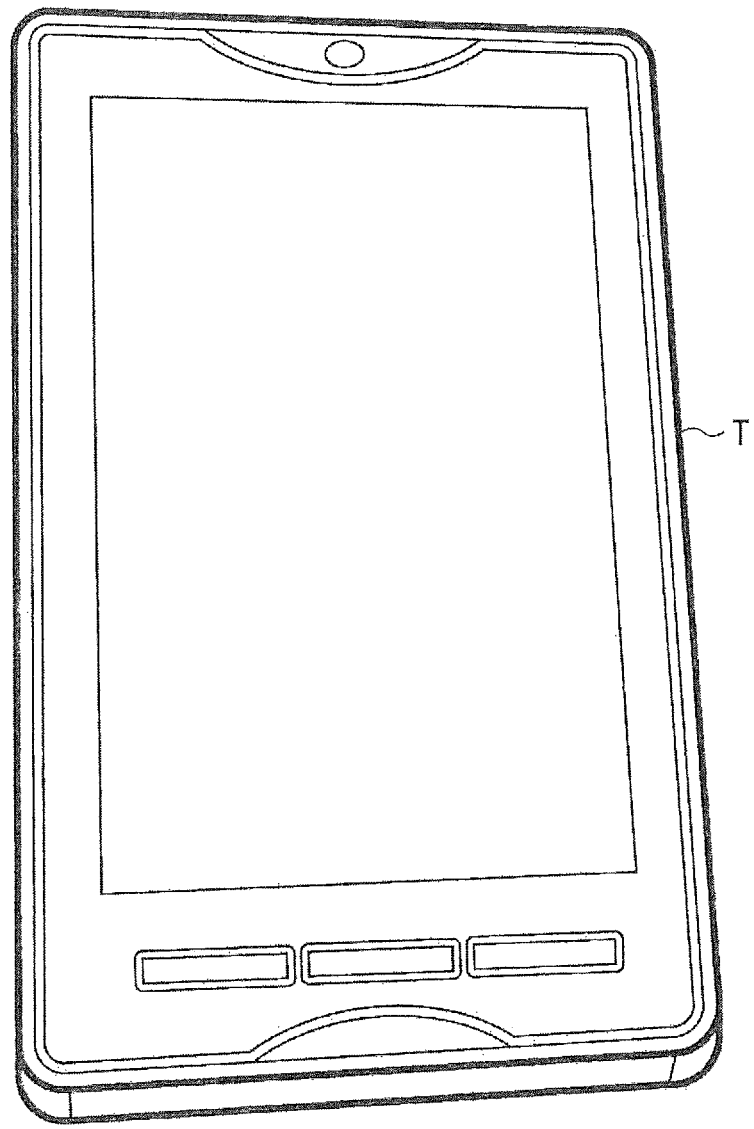
FIG. 44 illustrates an example of a mobile terminal in which a lens driving device is to be mounted.

The illustrated lens driving device 10 is mounted to small-sized mobile terminal T as shown in FIG. 44 such as a cellular mobile phone, a smartphone, a notebook personal computer, a tablet-type personal computer or a mobile-type game machine, or to a web camera or a vehicle-mounted camera or the like. Lens driving device 10 comprises auto-focusing lens driving portion 20 which will later be described, and an image stabilizer portion (which will later be described) for stabilizing blurry images (vibrations) occurring in auto-focusing lens driving portion 20 upon shooting a static image and video, and is a device which is capable of picking up the image without image blurred. The image stabilizer portion of lens driving device 10 stabilizes the blurry images by moving the auto-focusing lens driving portion 20 in first direction (fore-and-aft direction) X and second direction (left-and-right direction) Y which are orthogonal to optical axis O and which are perpendicular to each other.

Auto-focusing lens driving portion 20 is for moving lens barrel 12 along optical axis O. Base 14 is disposed apart from a bottom portion of auto-focusing lens driving portion 20 on the underside in the optical axis direction. Image pickup board 13 on which image pickup device 131 is mounted is disposed on a lower portion (a rear portion) of base 14. Image pickup device 131 converts a subject image (light) formed by lens barrel 12 into an electric signal.

Image pickup device 131 may, for example, comprise a CCD (charge coupled device) type image sensor, a CMOS (complementary metal oxide semiconductor) type image sensor, or the like. Infrared light filter 132 that blocks wavelengths in the infrared light region is disposed on the front surface of image pickup device 131. Therefore, a camera module is constituted by combining auto-focusing lens driving portion 20, image pickup board 13 and image pickup device 131.

Base 14 has a ring-shaped which has the outside shape of a rectangular and which has circular opening 14a in the interior thereof.

The image stabilizer portion of lens driving device 10 comprises four suspension wires 16 each having one ends fixed at four corner portions of base 14, and image stabilizer coil 18 (second coil) disposed to face permanent magnet 28 of auto-focusing lens driving portion 20.

Four suspension wires 16 extend along optical axis O and swingably support auto-focusing lens driving portion 20 as a whole in first direction (fore-and-aft direction) X and second direction (left-and-right direction) Y. Four suspension wires 16 have the other ends which are fixed to an upper end portion (first leaf spring 32) of above-mentioned auto-focusing lens driving portion 20.

In the manner described above, four suspension wires 16 serves as a supporting member for swingably supporting auto-focusing lens driving portion 20 with respect to base 14 in first direction Y and second direction Y.

Figure 21:
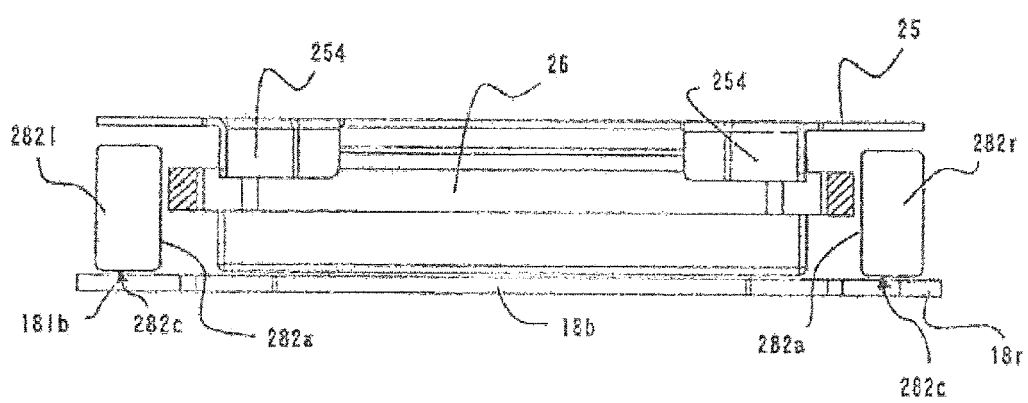
FIG. 21 is a vertical cross sectional view of the magnetic circuit illustrated in FIG. 19.
Figure 22:
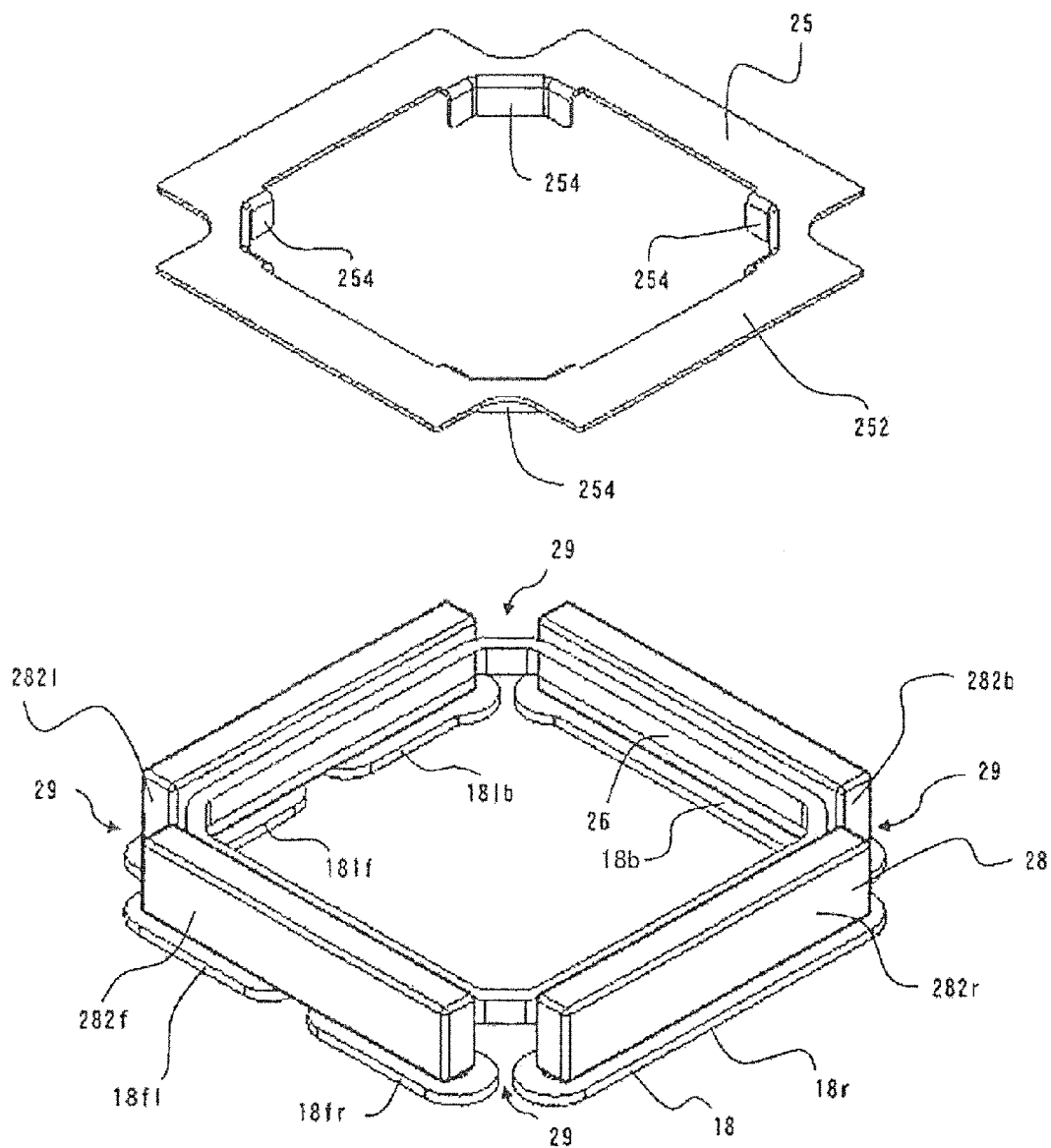
FIG. 22 is an exploded perspective view illustrating a relationship with respect to the magnetic circuit in the lens driving device according to the first modified example of the first exemplary embodiment.
Figure 23:
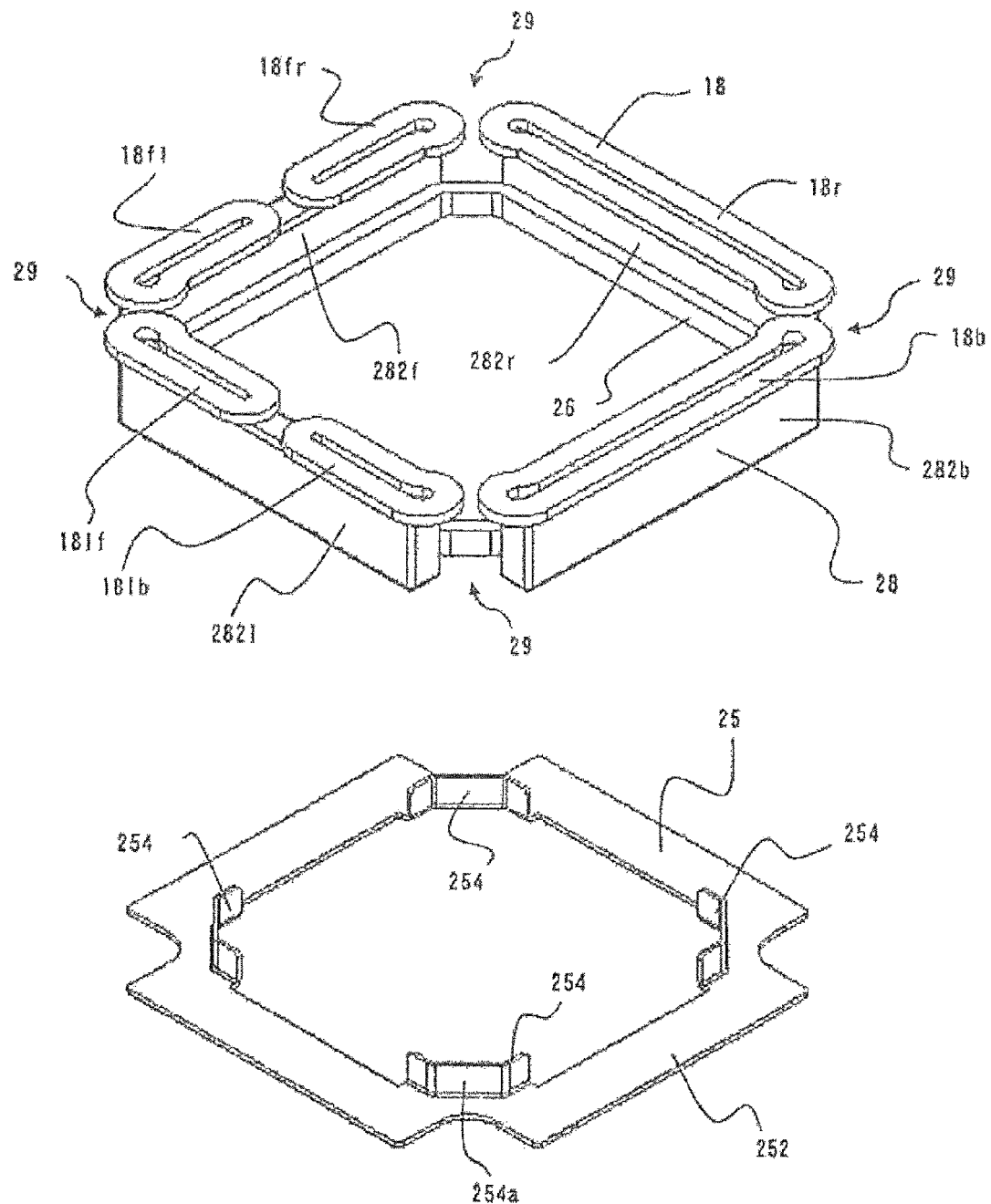
FIG. 23 is an exploded perspective view illustrating the relationship with respect to the magnetic circuit in the lens driving device according to the first modified example of the first exemplary embodiment seen from a rear side.

The image stabilizer portion of lens driving device 10 comprises coil board 40 having a rectangular ring shape that is disposed apart from to face undersurface 282c of permanent magnet 28 (see, FIG. 21). Coil board 40 is mounted on base 14 with flexible printed circuit (FPC) 44 sandwiched therebetween. Above-mentioned image stabilizer coil 18 is formed on coil board 40.

Referring now to FIG. 3, the description will proceed to auto-focusing lens driving portion 20. Auto-focusing lens driving portion 20 is also called an AF unit.

Auto-focusing lens driving portion 20 comprises lens holder 24 including tubular portion 240 for holding lens barrel 12, focusing coil 26 (first coil) fixed so as to position around tubular portion 240 of lens holder 24, permanent magnet 28 disposed opposite to focusing coil 26 at the outside of focusing coil 26, magnet holder 30 for holding permanent magnet 28, and first and second leaf springs 32 and 34 mounted on first end 30a (upper end) and second end 30b (lower end) of magnet holder 30 in the direction of optical axis O.

First and second leaf springs 32 and 34 support lens holder 24 in the direction of optical axis O shiftably so as to position lens holder 24 in a radial direction. In the example being illustrated, first leaf spring 32 is called an upper leaf spring while second leaf spring 34 is called a lower leaf spring.

In addition, in the manner which is described above, in the actual use situation in which a user shoots a front subject, the upper direction in the Z-axis direction (the direction of optical axis O) becomes the front direction while the lower direction in the Z-axis direction (the direction of optical axis O) becomes the rear direction. Accordingly, upper leaf spring 32 is also called a front-side spring while lower leaf spring 34 is also called a rear-side spring.

Magnet holder 30 has configuration of a substantially octagonal tube. Specifically, magnet holder 30 comprises outer tubular portion 302 made of a frame body of an octagonal tubular shape, octagonal upper ring-shaped end portion 304 provided at upper end (front end, first end) 30a of outer tubular portion 302, and octagonal lower ring-shaped end portion 306 provided at lower end (rear end, second end) 30b of outer tubular portion 302. Upper ring-shaped end portion 304 has eight upper protrusions 304a which project at four corners corresponding to short edges of octagon upwards by two per corner. Lower ring-shaped end portion 306 has four lower protrusions 306a which project at four corners corresponding to short edges of octagon downwards by one per corner.

Focusing coil 26 has an octagonal cylindrical shape which coincides with a shape of magnet holder 30 having the octagonal tubular shape. Permanent magnet 28 comprises four rectangular permanent magnet pieces 282 which are disposed in outer tubular portion 302 having the octagonal tubular shape in magnet holder 30 so as to apart from each other in first direction (fore-and-aft direction) X and second direction (left-and-right direction) Y. Four permanent magnet pieces 282 are disposed with spaces between them and focusing coil 26. In the example being illustrated, each permanent magnet piece 282 has an inner end side polarized (magnetized) to the north pole and an outer end side polarized (magnetized) to the south pole. Hereunder, a surface (in this case, inner wall surface 282a) facing a circumferential face of focusing coil 26 of permanent magnet piece 282 is referred to as "first surface", a surface (in this case, the undersurface) that is perpendicular to the first surface and optical axis O is referred to as "second surface", and a surface (in this case, the top surface) opposite to the second surface of permanent magnet piece 282 is referred to as "third surface".

Upper leaf spring (front-side spring) 32 is disposed at an upper side (a front side) of lens holder 24 in the direction of optical axis O while lower leaf spring (rear-side spring) 34 is disposed at a lower side (a rear side) of lens holder 24 in the direction of optical axis O.

Upper leaf spring (front-side spring) 32 comprises upper inner end portion 322 mounted on an upper end portion of lens holder 24 and upper outer end portion 324 mounted on upper ring-shaped end portion 304 of magnet holder 30. Between upper inner end portion 322 and upper outer end portion 324, a plurality of upper arm portions 326 are provided. That is, the plurality of upper aim portions 326 connects upper inner end portion 322 to upper outer end portion 324.

Tubular portion 240 of lens holder 24 has, at an upper end thereof, four upper protrusions 240a projecting at four corners upwards. Upper inner end portion 322 has four upper holes 322a in which four upper protrusions 240a are compression inserted (charged), respectively. That is, four upper protrusions 240a of tubular portion 240 of lens holder 24 are compression inserted (charged) in four upper holes 322a of upper inner end portion 322 of upper leaf spring 32, respectively.

On the other hand, upper outer end portion 324 has eight upper holes 324a in which eight upper protrusions 304a of magnet holder 30 are charged, respectively. That is, eight upper protrusions 304a of magnet holder 30 are charged in eight upper holes 324a of upper outer end portion 324.

Upper leaf spring (front-side spring) 32 further comprises four arc-shaped extending portions 328 which extend at four corners of upper outer end portion 324 in the radial direction outwards. Four arc-shaped extending portions 328 have four wire fixing holes 328a in which the other ends of four suspension wires 16 are inserted (charged), respectively. A detailed structure of each arc-shaped extending portion 328 will later be described with reference to FIG. 29 in detail.

Lower leaf spring (rear-side spring) 34 comprises lower inner end portion 342 mounted on a lower end portion of lens holder 24 and lower outer end portion 344 mounted on lower ring-shaped end portion 306 of magnet holder 30. Between lower inner end portion 342 and lower outer end portion 344, a plurality of lower arm portions 346 are provided. That is, the plurality of lower arm portions 346 connect lower inner end portion 342 to lower outer end portion 344.

Lower leaf spring 34 has a lower portion in which spacer 36 having a substantially same outside shape is disposed. More specifically, spacer 36 comprises outer ring portion 364 having a shape which is substantially equivalent to that of lower outer end portion 344 of lower leaf spring 34 and inner ring portion 362 having a shape so as to cover lower inner end portion 342 and lower arm portions 346 of lower leaf spring 34.

Tubular portion 240 of lens holder 24 has, at a lower end, four lower protrusions (not shown) projecting at four corners downwards. Lower inner end portion 342 has four lower holes 342a in which the four lower protrusions are compression inserted (charged), respectively. That is, the four lower protrusions of tubular portion 240 of lens holder 24 are compression inserted (charged) in four lower holes 342a of lower inner end portion 342 of lower leaf spring 34.

On the other hand, lower outer end portion 344 of lower leaf spring 34 has four lower holes 344a in which four lower protrusions 306a of magnet holder 30 are charged, respectively. Outer ring portion 364 of spacer 36 also has four lower holes 364a in which four lower protrusions 306a of magnet holder 30 are compression inserted at positions corresponding to four lower holes 344a, respectively. That is, four lower protrusions 306a of magnet holder 30 are compression inserted in four lower holes 364a of outer ring portion 364 of spacer 36 via four lower holes 344a of lower outer end portion 344 of lower leaf spring 34, and thermally-welded at tip ends thereof, respectively.

As is apparent from FIG. 2, the four lower protrusions 306a of magnet holder 30 protrude so as to approach coil board 40. In other words, it will be understood that a gap between the four lower protrusions 306a and coil board 40 is narrower than a gap in another region (that is, a gap between spacer 36 and coil board 40).

An elastic member comprising upper leaf spring 32 and lower leaf spring 34 serves as a guiding arrangement for guiding lens holder 24 so as to be movable in the direction of optical axis O alone. Each of upper leaf spring 32 and lower leaf spring 34 is made of beryllium copper, phosphor bronze, or the like.

Tubular portion 240 of lens holder 24 has an inner wall in which female screw thread 240b is cut. On the other hand, lens barrel 12 has an outer wall in which male screw thread 12a screwed in above-mentioned female screw thread 240b is cut. In a case of fitting lens barrel 12 to lens holder 24, it includes the steps of rotating lens barrel 12 with respect to tubular portion 240 of lens holder 24 around optical axis O to screw it along the direction of optical axis O thereby accommodating lens barrel 12 in lens holder 24, and of connecting them to each other via an adhesive agent or the like.

In the manner which will later be described, by flowing an auto-focusing (AF) current through focusing coil 26, it is possible to positionally adjust lens holder 24 (lens barrel 12) in the direction of optical axis O according to interaction between a magnetic field of permanent magnet 28 and a magnetic field due to the AF current flowing through focusing coil 26.

In the manner which is described above, auto-focusing lens driving portion (AF unit) 20 comprises lens holder 24, focusing coil 26, permanent magnet 28, magnet holder 30, upper leaf spring 32, lower leaf spring 34, and spacer 36.

Referring now to FIG. 3, the description will proceed to the image stabilizer portion of lens driving device 10 in more detail.

In the manner which is described above, the image stabilizer portion of lens driving device 10 comprises four suspension wires 16 each having one ends fixed at four corner portions of base 14, and image stabilizer coil 18 disposed to face permanent magnet 28 of above-mentioned auto-focusing lens driving portion 20.

Four suspension wires 16 extend along optical axis O and swingably support auto-focusing lens driving portion 20 as a whole in first direction (fore-and-aft direction) X and second direction (left-and-right direction) Y. Four suspension wires 16 have the other ends which are fixed to the upper end portion of above-mentioned auto-focusing lens driving portion 20.

More specifically, in the manner which is described above, four arc-shaped extending portions 328 of upper leaf spring 32 have wire fixing holes 328a in which the other ends of suspension wires 16 are inserted (charged), respectively (see, FIG. 3). In four wire fixing holes 328a, the other ends of four suspension wires 16 are inserted (charged) and are fixed by means of an adhesive agent, solder, or the like.

Although each arc-shaped extending portion 328 has an L-shape in the example being illustrated, of course, it is not limited to this.

Two of four suspension wires 16 are also used to feed to focusing coil 26.

In the manner which is described above, permanent magnet 28 comprises four permanent magnet pieces 282 which are disposed so as to oppose to each other in first direction (the fore-and-aft direction) X and second direction (the left-and-right direction) Y The image stabilizer portion of lens driving device 10 comprises ring-shaped coil board 40 which is inserted between four permanent magnet pieces 282 and base 14 and which is disposed so as to apart from them. Coil board 40 has, at four corners thereof, four through holes 40a through which four suspension wires 16 pass. Above-mentioned image stabilizer coil 18 is formed on coil board 40.

The combination of base 14, coil board 40, image stabilizer coil 18 and flexible printed circuit (FPC) 44 serves as fixed member (14, 40, 18, 44) that is disposed apart from auto-focusing lens driving portion 20 in optical axis O direction.

Herein, in four permanent magnet pieces 282, the permanent magnet pieces disposed with respect to optical axis O at a front side, a rear side, a left side, and a right side are called front-side permanent magnet piece 282f, rear-side permanent magnet piece 282b, left-side permanent magnet piece 282l, and right-side permanent magnet piece 282r, respectively.

Figure 4:
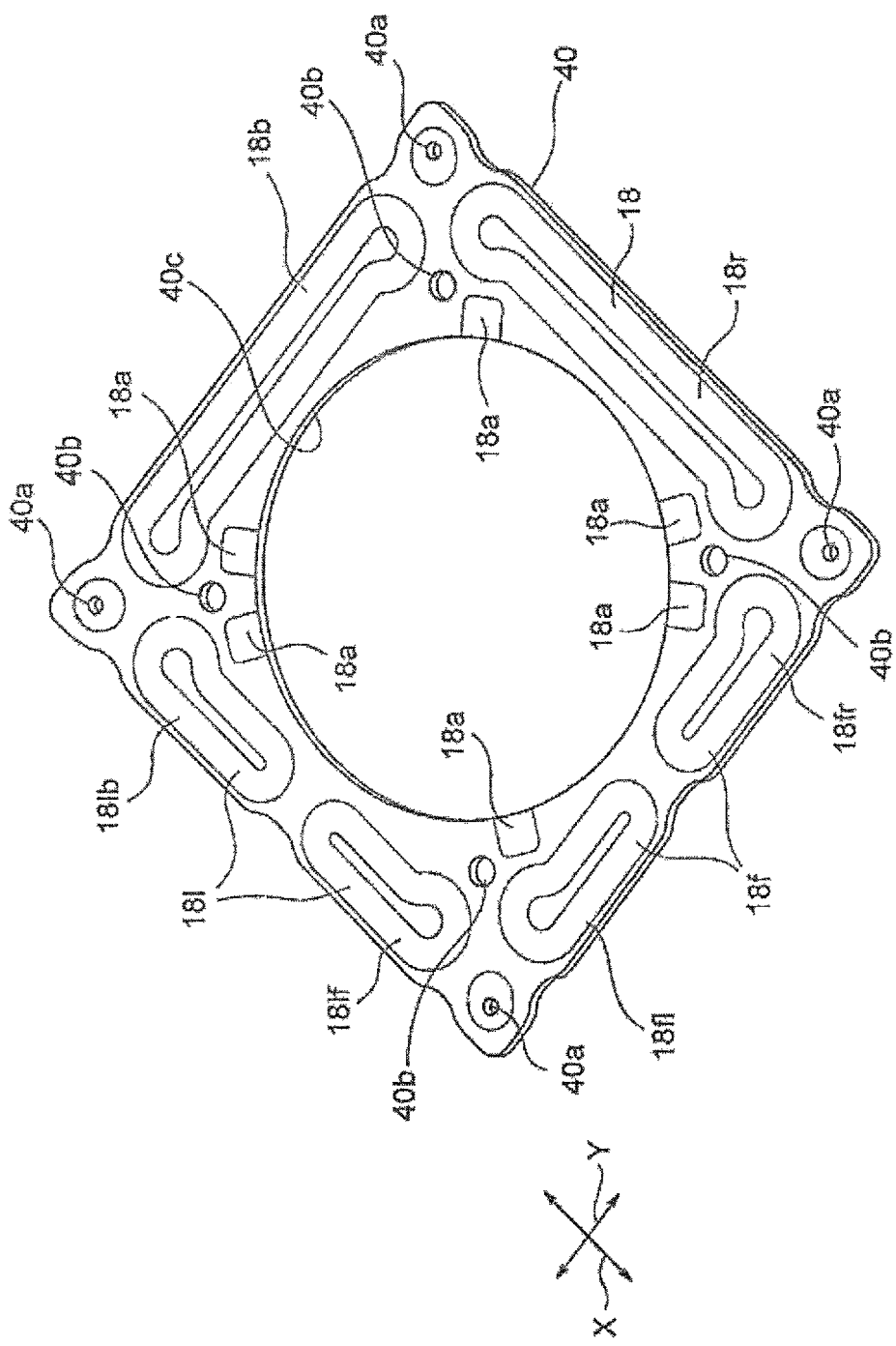
FIG. 4 is a perspective view of a coil board and an image stabilizer coil formed therein which are used in the lens driving device illustrated in FIG. 1.

Referring to FIG. 4 also, on coil board 40, four image stabilizer coil portions 18f, 18b, 18l, and 18r are formed as image stabilizer coil 18.

Disposed opposite to each other in first direction (fore-and-aft direction) X, two image stabilizer coil portions 18f and 18b are for moving (swinging) auto-focusing lens driving portion (AF unit) 20 in first direction (fore-and-aft direction) X. Such two image stabilizer coil portions 18f and 18b are called a first direction actuator. Herein, image stabilizer coil portion 18f disposed at a front side with respect to optical axis O is called "a front-side image stabilizer coil portion" while image stabilizer coil portion 18b disposed at a back side with respect to optical axis O is called "a back-side image stabilizer coil portion".

On the other hand, disposed opposite to each other in second direction (the left-and-right direction) Y, two image stabilizer coil portions 18l and 18r are for moving (swinging) auto-focusing lens driving portion (AF unit) 20 in second direction (the left-and-right direction) Y. Such two image stabilizer coil portions 18l and 18r are called a second direction actuator. Herein, image stabilizer coil portion 18l disposed at a left side with respect to optical axis O is called "a left-side image stabilizer coil portion" while image stabilizer coil portion 18r disposed at a right side with respect to optical axis O is called "a right-side image stabilizer coil portion".

As shown in FIG. 4, in illustrated image stabilizer coil 18, front-side image stabilizer coil portion 18f and left-side image stabilizer coil portion 18l are divided into two coil parts so as to separate at a center in a longitudinal direction of front-side permanent magnet piece 282f and left-side permanent magnet piece 282l opposite thereto, respectively. That is, front-side image stabilizer coil portion 18f comprises left-side coil part 18fl and right-side coil part 18fr. Likewise, left-side image stabilizer coil portion 18l comprises front-side coil part 18lf and back-side coil part 18lb.

In other words, each of front-side image stabilizer coil portion 18f and left-side image stabilizer coil portion 18r comprises two loop portions while each of back-side image stabilizer coil portion 18b and right-side image stabilizer coil portion 18r comprises only one loop portion.

In the manner which is described above, among four image stabilizer coil portions 18f, 18b, 18l, and 18r, each of two particular image stabilizer coil portions 18f and 18l disposed in first direction X and second direction Y is divided into two coil parts 18fl, 18fr and 18lf, 18lb so as to separate it at the center of the longitudinal direction of permanent magnet pieces 282f and 282l opposite thereto.

Four image stabilizer coil portions 18f, 18b, 18l, and 18r configured as described above in cooperation with permanent magnet 28 are for driving auto-focusing lens driving portion (AF unit) 20 as a whole in the X-axis direction (the first direction) and the Y-axis direction (the second direction). A combination of four image stabilizer coil portions 18f, 18b, 18l, and 18r and permanent magnet 28 serves as a voice coil motor (VCM).

In the manner which is described above, the illustrated image stabilizer portion of lens driving device 10 stabilizes the blurry images by moving lens barrel 12 received in auto-focusing lens driving portion (AF unit) 20 in itself in first direction (fore-and-aft direction) X and second direction (left-and-right direction) Y. Accordingly, the image stabilizer portion of lens driving device 10 is called an image stabilizer portion of "a barrel shift method".

Lens driving device 10 further comprises shielding cover 42 for covering auto-focusing lens driving portion (AF unit) 20. Shielding cover 42 comprises rectangular tubular portion 422 for covering an outer periphery of auto-focusing lens driving portion (AF unit) 20 and upper end portion 424 for covering an upper surface of auto-focusing lens driving portion (AF unit) 20. Upper end portion 424 has circular opening 424a concentric with optical axis O.

The illustrated image stabilizer portion of lens driving device 10 further comprises position detection arrangement 50 for detecting a position of auto-focusing lens driving portion (AF unit) 20 with respect to base 14. Illustrated position detection arrangement 50 comprises a magnetic position detection arrangement comprising two Hall elements 50f and 50l mounted on base 14. Two Hall elements 50f and 50l are disposed so as to oppose with a space to two of four permanent magnet pieces 282, respectively, in the manner which will later be described. As shown in FIG. 2, each Hall element 50f and 50l is disposed so as to cross in a direction from the north pole to the south pole in permanent magnet piece 282.

In the example being illustrated, one Hall element 50f is called a front-side Hall element because Hall element 50f is disposed at a front side in first direction (fore-and-aft direction) X with respect to optical axis O. Another Hall element 50l is called a left-side Hall element because Hall element 50l is disposed at a left side in second direction (left-and-right direction) Y with respect to optical axis O.

Front-side Hall element 50f is disposed on base 14 at a position where front-side image stabilizer coil portion 18f having divided two coil parts 18fl and 18fr is separated into two coil parts 18fl and 18fr. Similarly, left-side Hall element 50l is disposed on base 14 at a position where left-side image stabilizer coil portion 18l having divided two coil parts 18lf and 18lb is separated into two coil parts 18lf and 18lb.

In the manner which is described above, two Hall elements 50f and 50l are disposed on base 14 at the positions where particular two image stabilizer coil portions 18f and 18l having divided two coil parts 18fl, 18fr and 18lf, 18lb are separated into two coil parts 18fl, 18fr and 18lf, 18lb.

Front-side Hall element 50f detects a first position with a movement (a swing) in first direction (fore-and-aft direction) X by detecting a magnetic force of front-side permanent magnet piece 282f opposite thereto. Left-side Hall element 50l detects a second position with a movement (a swing) in second direction (left-and-right direction) Y by detecting a magnetic force of left-side permanent magnet piece 282l opposite thereto.

Figure 5:
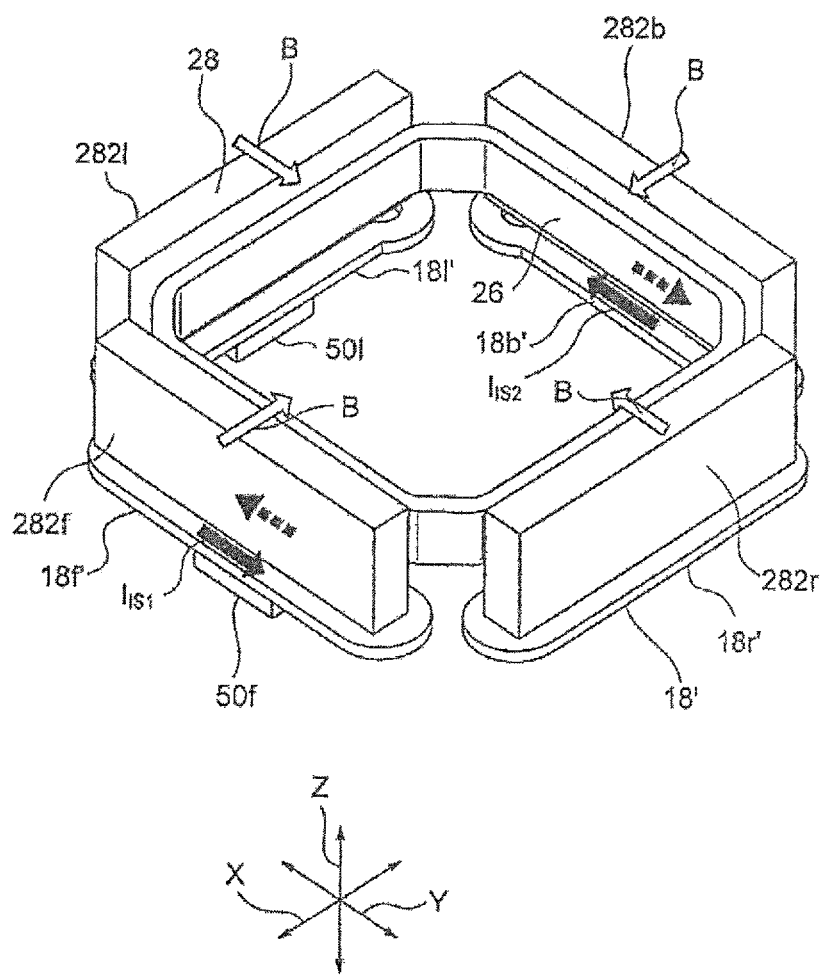
FIG. 5 is a perspective view showing a relationship between a related magnetic circuit and Hall elements.
Figure 6:
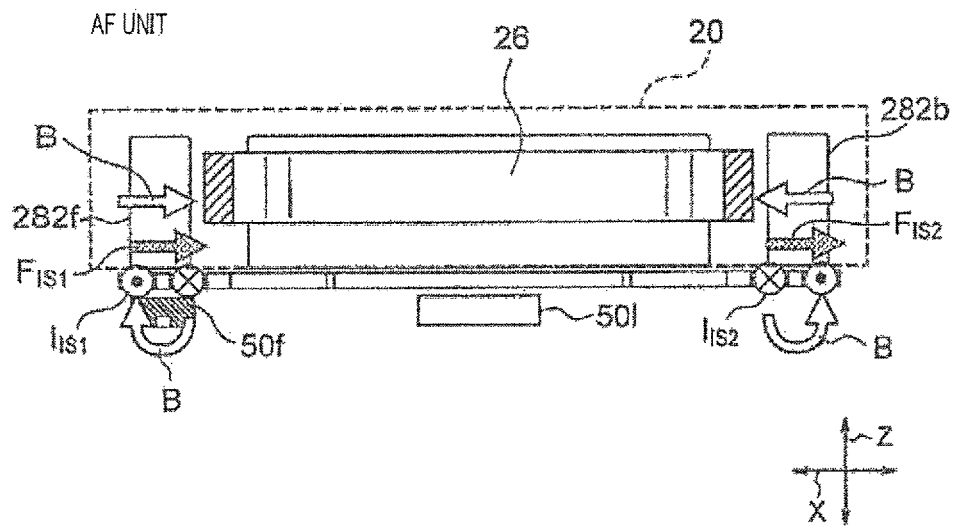
FIG. 6 is a vertical cross sectional view showing a relationship between the related magnetic circuit and the Hall elements.
Figure 7:
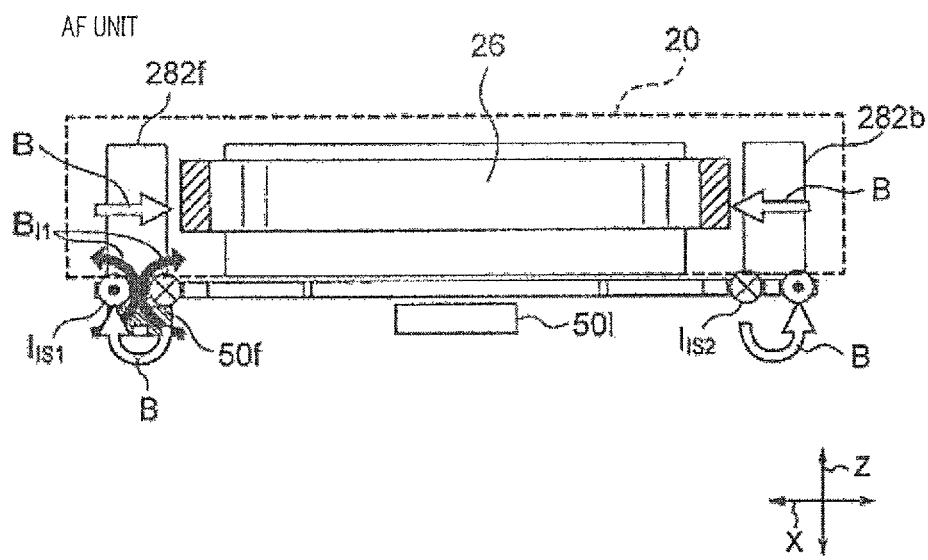
FIG. 7 is a vertical cross sectional view shoring a relationship between the related magnetic circuit and the Hall elements in a case of displacing an AF unit in a fore-and-aft direction X.

Referring to FIGS. 5 through 7, the description will proceed to a relationship between a related magnetic circuit and Hall elements for use in a related lens driving device in order to facilitate the understanding of lens driving device 10 according to the exemplary embodiment of the present invention. The relationship between the illustrated related magnetic circuit and the Hall elements is similar in structure (relationship) to that illustrated in the above-mentioned PTL 17. FIG. 5 is a perspective view showing the relationship between the related magnetic circuit and the Hall elements; FIG. 6 is a vertical cross sectional view showing the relationship between the related magnetic circuit and the Hall elements, and FIG. 7 is a vertical cross sectional view shoring the relationship between the related magnetic circuit and the Hall elements in a case of displacing AF unit 20 in fore-and-aft direction X.

A difference between the related magnetic circuit and the magnetic circuit used in lens driving device 10 according to this exemplary embodiment is that any of four image stabilizer coil portions 18f', 18b', 18l', and 18r' constituting image stabilizer coil 18' in the related magnetic circuit comprises no two loop ports. That is, in the conventional magnetic circuit, each of four image stabilizer coil portions 18f, 18b', 18l', and 18r' comprises only one loop part.

As described above, four permanent magnet pieces 282f, 282b, 282l, and 282r have the inner side polarized (magnetized) to the north pole and the outer side polarized (magnetized) to the south pole. Arrows B depicted in FIG. 5 indicate directions of magnetic fluxes generated by the permanent magnet pieces.

Referring now to FIG. 5, the description will be made as regards operation in a case of position adjusting lens holder 24 (lens barrel) in the direction of optical axis O by using the related magnetic circuit.

By way of illustration, it will be assumed that the AF current is flowed through focusing coil 26 counterclockwise. In this event, according to Fleming's right-hand rule, focusing coil 26 is acted upon by an electromagnetic force upwards. As a result, it is possible to move lens holder 24 (lens barrel) in the direction of optical axis O upwards.

Conversely, by flowing the AF current through focusing coil 26 clockwise, it is possible to move lens holder 24 (lens barrel) in the direction of optical axis O downwards.

Referring now to FIGS. 5 to 7, the description will be made as regards operation in a case of moving the auto-focusing lens driving portion (AF unit) 20 as a whole in first direction (fore-and-aft direction) X or second direction (left-and-right direction) Y by using the conventional magnetic circuit.

First, the description will be made as regards operation in a case of moving auto-focusing lens driving portion (AF unit) 20 as a whole in first direction (the fore-and-aft direction) X backwards. In this event, as shown in FIG. 5, a first image stabilizing (IS) current flows through front-side image stabilizer coil portion 18f' counterclockwise as depicted at arrow $I_{IS1}$ and a second image stabilizing (IS) current flows through back-side image stabilizer coil portion 18b' clockwise as depicted at arrow $I_{IS2}$.

In this event, according to Fleming's right-hand rule, front-side image stabilizer coil portion 18f' is acted upon by an electromagnetic force forwards and back-side image stabilizer coil portion 18b' is also acted upon by an electromagnetic force forwards. However, inasmuch as there image stabilizer coil portions 18f' and 18r' are fixed to base 14, as reaction, auto-focusing lens driving portion (the AF unit) 20 as a whole is acted upon by an electromagnetic force backwards, as depicted at arrows $F_{IS1}$ and $F_{IS2}$ in FIG. 6. As a result, it is possible to move auto-focusing lens driving portion (AF unit) 20 as a whole backwards.

Conversely, by flowing the first IS current through front-side image stabilizer coil portion 18f' clockwise and by flowing the second IS current through back-side image stabilizer coil portion 18b' counterclockwise, it is possible to move auto-focusing lens driving portion (AF unit) 20 as a whole forwards.

On the other hand, by flowing a third IS current through left-side image stabilizer coil portion 18l' counterclockwise and by flowing a fourth IS current through right-side image stabilizer coil portion 18r' clockwise, it is possible to move auto-focusing lens driving portion (AF unit) 20 as a whole rightwards.

In addition, by flowing the third IS current through left-side image stabilizer coil portion 18l' clockwise and by flowing the fourth IS current through right-side image stabilizer coil portion 18r' counterclockwise, it is possible to move auto-focusing lens driving portion (AF unit) 20 as a whole leftwards.

In the manner which is described above, it is possible to stabilize blurry images.

Figure 8:
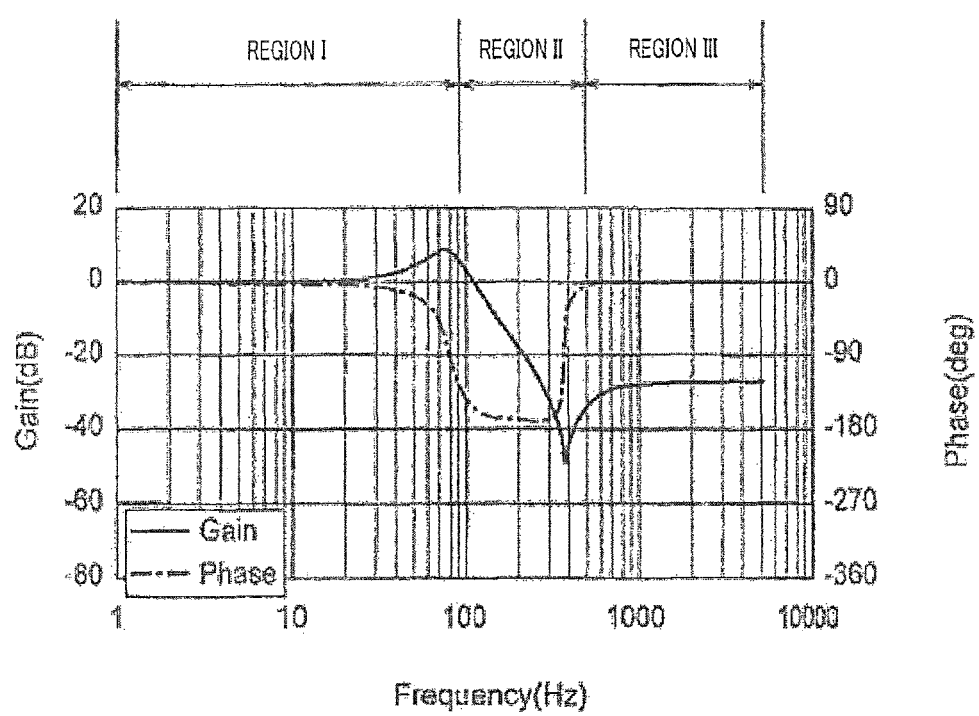
FIG. 8 is a view showing a frequency response of a front-side Hall element in the related magnetic circuit.
Figure 9:
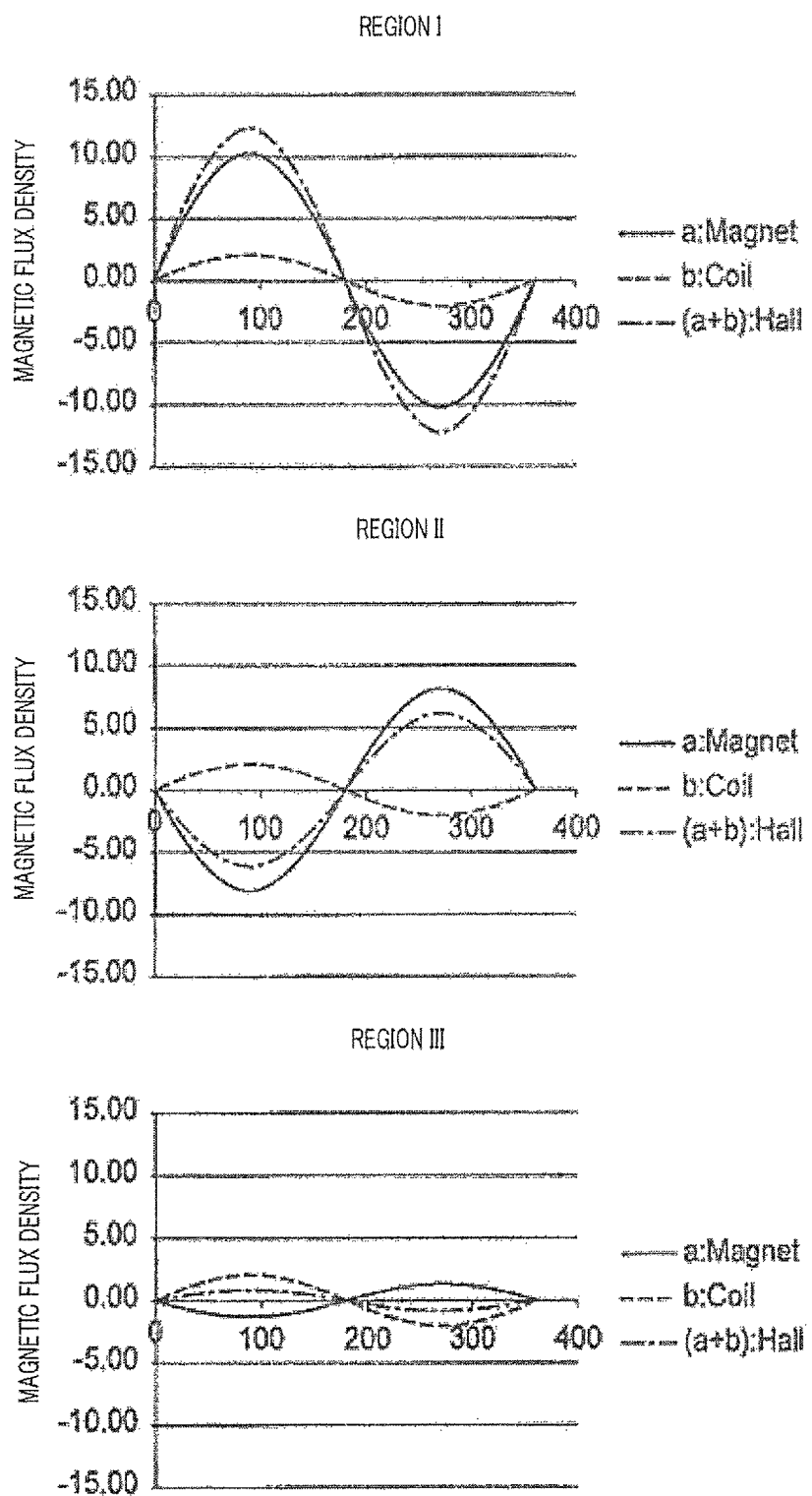
FIG. 9 is a view showing relationships between phases and magnitudes among a magnetic flux density a of a magnetic field B generated by the a front-side permanent magnet piece, a magnetic flux density b of a magnetic field $B_{f1}$ generated by a first IS current $I_{IS1}$ flowing through a front-side image stabilizer coil, and a total magnetic flux density (a+b) detected by the front-side Hall element in a region I, a region II, and a region III of FIG. 8, respectively.

Referring now to FIGS. 8 through 10 in addition to FIGS. 5 through 7, the description will proceed to problems in the conventional lens driving device using the conventional magnetic circuit in more details.

The description will be made as taking a case as an example where the first IS current flows through front-side image stabilizer coil portion 18f counterclockwise as depicted at arrow $I_{IS1}$ and the second IS current flows through back-side image stabilizer coil portion 18b' clockwise as depicted at arrow $I_{IS2}$, as shown in FIG. 5, in order to move auto-focusing lens driving portion (AF unit) 20 as a whole backwards in the manner which is described above.

In this event, as shown in FIG. 7, it is understood that magnetic field $B_{f1}$ produced by first IS current $I_{IS1}$ flowing through front-side image stabilizer coil portion 18f and magnetic field B produced by front-side permanent magnet piece 282f are in phase. It will be assumed that magnetic flux density of magnetic field B is indicated by a and magnetic flux density of magnetic field $B_{f1}$ is indicated by b. Accordingly, front-side Hall element 50f detects total magnetic flux density (a+b) obtained by summing magnetic flux density a of magnetic field B and magnetic flux density b of magnetic field $B_{f1}$.

It is herein noted that it is necessary that magnetic flux density a of the magnetic field B and total magnetic flux density (a+b) are in phase in order to detect a position of auto-focusing lens driving portion (AF unit) 20 by means of front-side Hall element 50f.

FIG. 8 is a view showing a frequency response of front-side Hall element 50f in the related magnetic circuit. In FIG. 8, the horizontal axis represents a frequency (Frequency) (Hz), the left-hand vertical axis represents a gain (Gain) (dB), and the right-hand vertical axis represents a phase (Phase) (deg). In addition, in FIG. 8, a solid line indicates a gain characteristic and an alternate long and short dashed line indicate a phase characteristic.

As is apparent from FIG. 8, the frequency response of font-side Hall element 50f is divided into a region I, a region II, and a region III. The region I is a region having a band not higher than a primary resonance frequency of the actuator and having low frequencies. The region II is a region having a band not lower than the primary resonance frequency of the actuator and having middle frequencies. The region III is a region having a band not lower than the primary resonance frequency of the actuator and having high frequencies.

FIG. 9 is a view showing relationships between phases and magnitudes among magnetic flux density a of magnetic field B generated by front-side permanent magnet piece 282f, magnetic flux density b of magnetic field $B_{f1}$ generated by first IS current $I_{IS1}$ flowing through front-side image stabilizer coil 18f, and total magnetic flux density (a+b) detected by front-side Hall element 50f in region I, region II, and region III, respectively. FIG. 10 is a view tabulated for the relationships of FIG. 9.

It is understood from FIGS. 9 and 10 as follows.

In the band not higher than the primary resonance frequency of region I, a magnitude |a| of magnetic flux density a of magnetic field B is larger than a magnitude |b| of magnetic flux density b of magnetic field $B_{f1}$ (|a|>|b|), and magnetic flux density a of magnetic field B, magnetic flux density b of magnetic field $B_{f1}$, and total magnetic flux density (a+b) are in phase. Accordingly, in region I, it is possible to detect the position of auto-focusing lens driving portion (AF unit) 20 by means of front-side Hall element 50f.

On the other hand, in a band not lower than primary resonance frequency, phase is opposite because movement of front-side permanent magnet piece 282f shifts with respect to a phase of first IS current $I_{IS1}$, flowing through front-side image stabilizer coil 18f by 180 degrees.

In the band not lower than the primary resonance frequency of region II, magnetic flux density a of magnetic field B and total magnetic flux density (a+b) are in phase because the magnitude |a| of magnetic flux density a of magnetic field B is larger than a magnitude |b| of magnetic flux density b of magnetic field $B_{f1}$ (|a|>|b|). Accordingly, in region II, it is possible to detect the position of auto-focusing lens driving portion (AF unit) 20 by means of front-side Hall element 50f.

However, in the band not lower than the primary resonance frequency of region III, it is understood that the magnitude of magnetic flux density a of the magnetic field B is smaller than a magnitude |b| of magnetic flux density b of the magnetic field $B_{f1}$ (|a|<|b|). Therefore, magnetic flux density a of magnetic field B and total magnetic flux density (a+b) are opposite phase. As a result, in region III, it is impossible to detect the position of auto-focusing lens driving portion (AF unit) 20 by means of front-side Hall element 50f. That is, an output of Hall element has resonance.

Accordingly, when the Hall element is disposed between (in) the loop part of the coil, it is understood that it is impossible to detect the position of auto-focusing lens driving portion (AF unit) 20 in region III which is not lower than the primary resonance frequency. In other words, Hall elements 50f and 50l are subjected to adverse effect caused by the magnetic fields generated by the currents flowing through image stabilizer coils 18f and 18l', respectively.

Figure 11:
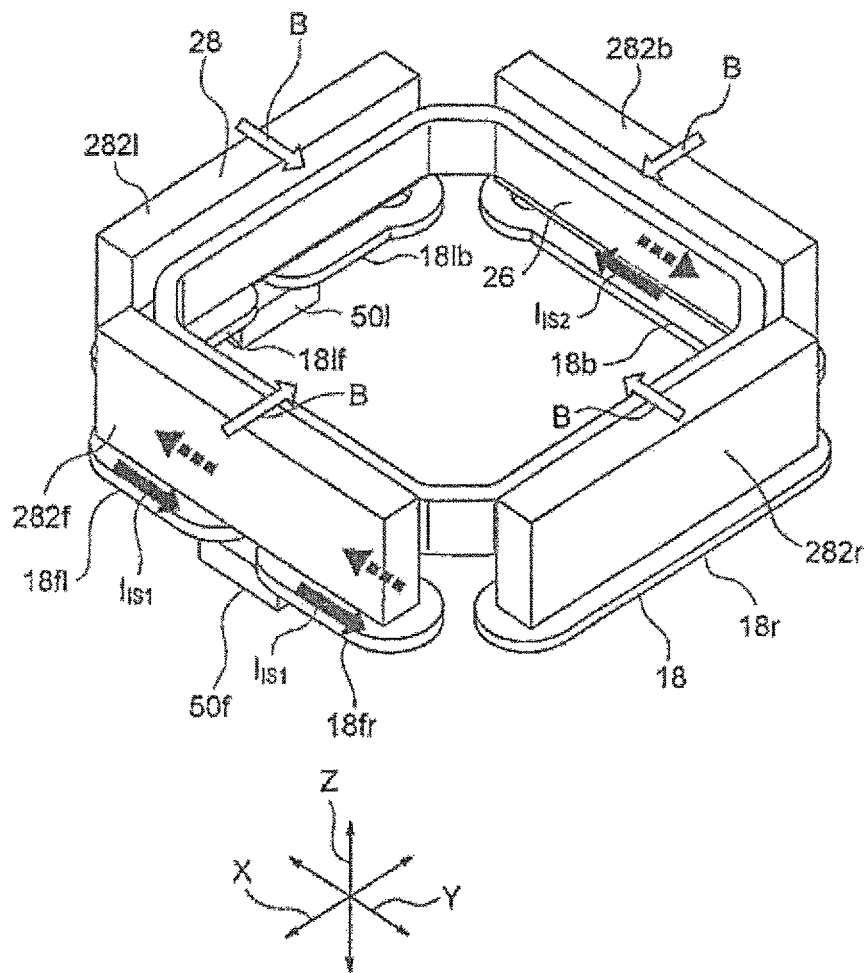
FIG. 11 is a perspective view showing a relationship between a magnetic circuit and Hall elements for use in the lens driving device illustrated in FIG. 1.
Figure 12:
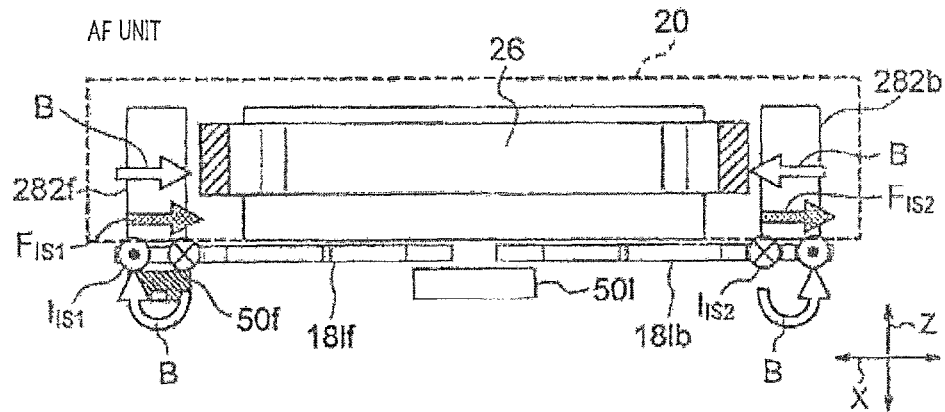
FIG. 12 is a vertical cross sectional view showing a relationship between the magnetic circuit and the Hall elements illustrated in FIG. 11.
Figure 13:
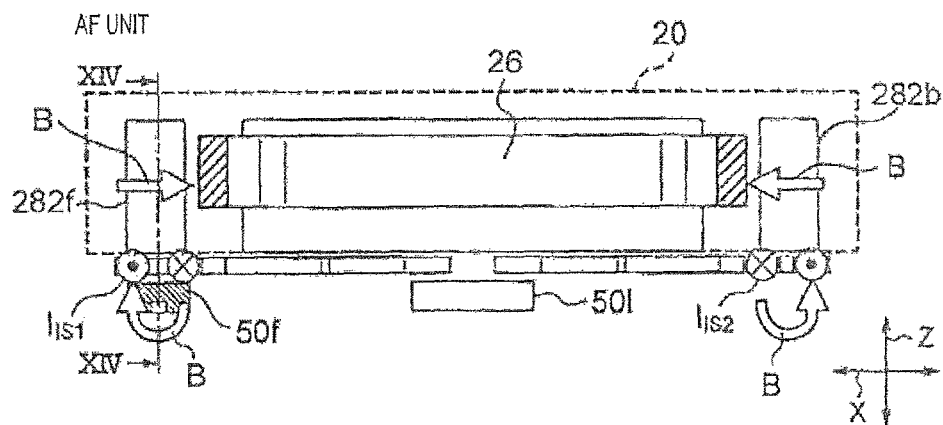
FIG. 13 is a vertical cross sectional view showing a relationship between the magnetic circuit and the Hall elements illustrated in FIG. 11 in a case of displacing an AF unit in a fore-and-aft direction X.
Figure 14:
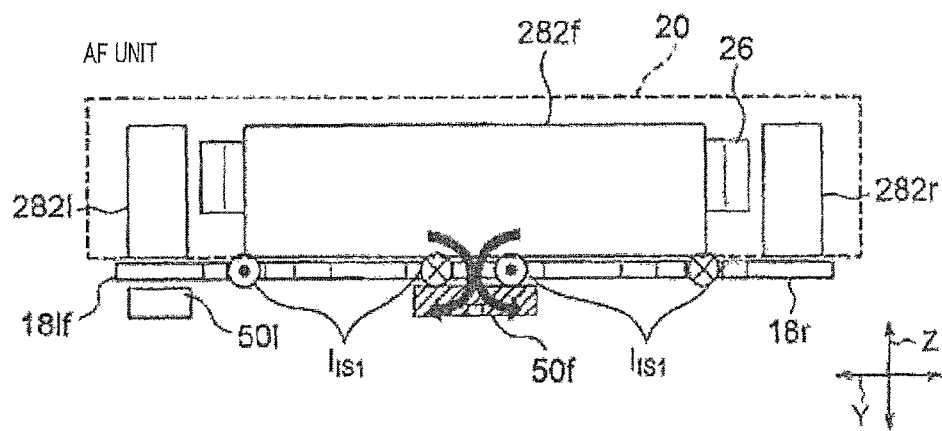
FIG. 14 is a cross sectional view taken on line XIV-XIV of FIG. 13.

Referring now to FIGS. 11 through 14, the description will proceed to a relationship between the magnetic circuit according to this exemplary embodiment and the Hall elements for use in lens driving device 10 according to the first exemplary embodiment of this invention. FIG. 11 is a perspective view showing the relationship between the magnetic circuit according to this exemplary embodiment and the Hall elements, FIG. 12 is a vertical cross sectional view showing the relationship between the magnetic circuit according to this exemplary embodiment and the Hall elements, FIG. 13 is a vertical cross sectional view shoring the relationship between the magnetic circuit according to this exemplary embodiment and the Hall elements in a case of displacing AF unit 20 in fore-and-aft direction X, and FIG. 14 is a cross sectional view taken on line XIV-XIV of FIG. 13.

As described above, four permanent magnet pieces 282f, 282b, 282l, and 282r have the inner side polarized (magnetized) to the north pole and the outer side polarized (magnetized) to the south pole. Arrows B depicted in FIG. 11 indicate directions of magnetic fluxes generated by the permanent magnet pieces.

Referring now to FIG. 11, the description will be made as regards operation in a case of position adjusting lens holder 24 (the lens barrel) in the direction of optical axis O by using the magnetic circuit according to this exemplary embodiment.

By way of illustration, it will be assumed that the AF current is flowed through focusing coil 26 counterclockwise. In this event, according to Fleming's right-hand rule, focusing coil 26 is acted upon by an electromagnetic force upwards. As a result, it is possible to move lens holder 24 (lens barrel) in the direction of optical axis O upwards.

Conversely, by flowing the AF current through focusing coil 26 clockwise, it is possible to move lens holder 24 (lens barrel) in the direction of optical axis O downwards.

Referring now to FIGS. 11 to 14, the description will be made as regards operation in a case of moving auto-focusing lens driving portion (AF unit) 20 as a whole in first direction (fore-and-aft direction) X or second direction (left-and-right direction) Y by using the magnetic circuit according to this exemplary embodiment.

First, the description will be made as regards operation in a case of moving auto-focusing lens driving portion (AF unit) 20 as a whole in first direction (the fore-and-aft direction) X backwards. In this event, as shown in FIG. 11, a first image stabilizing (IS) current flows through each of two coil parts 18*fl* and 18*fr* of front-side image stabilizer coil portion 18*f* counterclockwise as depicted at arrow $I_{IS1}$ and a second image stabilizing (IS) current flows through backside image stabilizer coil portion 18*b* clockwise as depicted at arrow $I_{IS2}$.

In this event, according to Fleming's right-hand rule, front-side image stabilizer coil portion 18*f* is acted upon by an electromagnetic force forwards and back-side image stabilizer coil portion 18*b* is also acted upon by an electromagnetic force forwards. However, inasmuch as there image stabilizer coil portions 18*f* and 18*r* are fixed to base 14, as reaction, auto-focusing lens driving portion (AF unit) 20 as a whole is acted upon by an electromagnetic force backwards, as depicted at arrows $F_{IS1}$ and $F_{IS2}$ in FIG. 12. As a result, it is possible to move auto-focusing lens driving portion (AF unit) 20 as a whole backwards.

Conversely, by flowing the first IS current through each of two coil parts 18*fl* and 18*fr* of front-side image stabilizer coil portion 18*f* clockwise and by flowing the second IS current through back-side image stabilizer coil portion 18*b* counterclockwise, it is possible to move auto-focusing lens driving portion (AF unit) 20 as a whole forwards.

On the other hand, by flowing a third IS current through each of two coil parts 18*lf* and 18*lb* of left-side image stabilizer coil portion 18*l* counterclockwise and by flowing a fourth IS current through right-side image stabilizer coil portion 18*r* clockwise, it is possible to move auto-focusing lens driving portion (AF unit) 20 as a whole rightwards.

In addition, by flowing the third IS current through each of two coil parts 18*lf* and 18*lr* of left-side image stabilizer coil portion 18*l* clockwise and by flowing the fourth IS current through right-side image stabilizer coil portion 18*r* counterclockwise, it is possible to move auto-focusing lens driving portion (AF unit) 20 as a whole leftwards.

In the manner which is described above, it is possible to stabilize blurry images in the camera.

Figure 15:
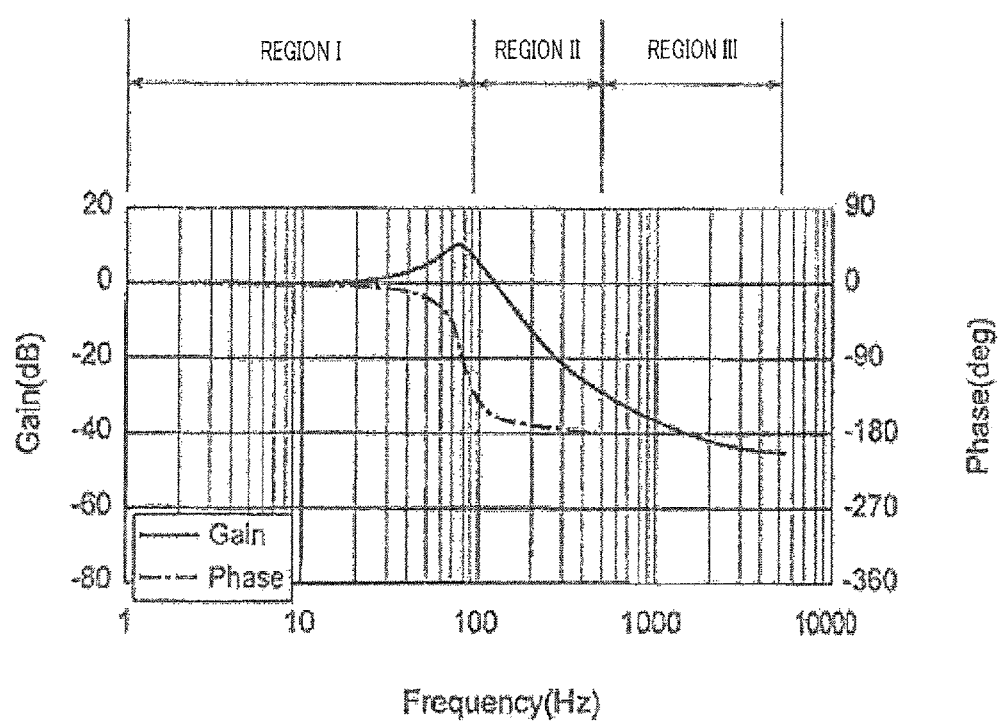
FIG. 15 is a view showing a frequency response of a front-side Hall element in the magnetic circuit illustrated in FIG. 11.
Figure 16:
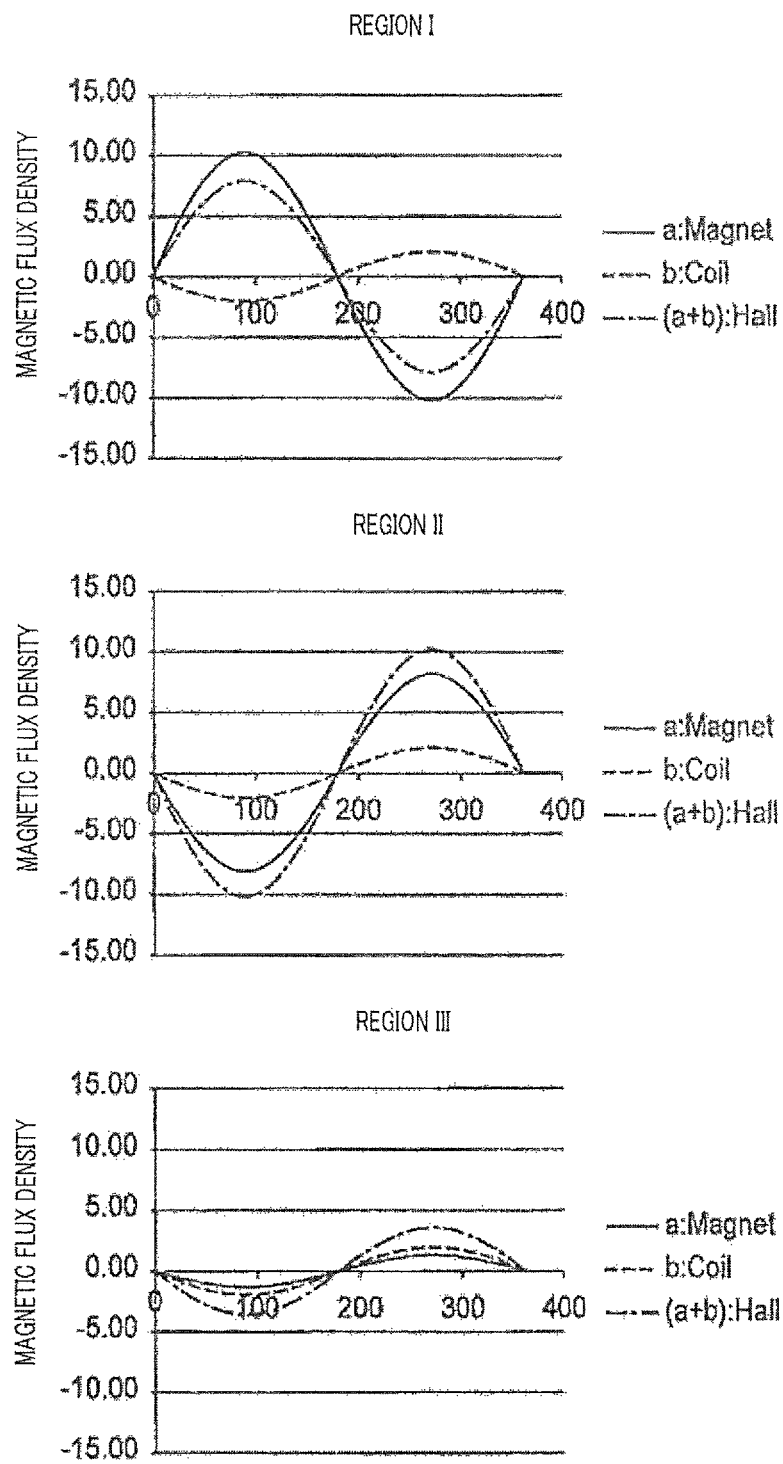
FIG. 16 is a view showing relationships between phases and magnitudes among a magnetic flux density a of a magnetic field B generated by the a front-side permanent magnet piece, a magnetic flux density b of a magnetic field $B_{f1}$ generated by a first IS current IIS 1 flowing in a front-side image stabilizer coil, and a total magnetic flux density (a+b) detected by the front-side Hall element in a region I, a region II, and a region III of FIG. 15, respectively.

Referring now to FIGS. 15 through 17 in addition to FIGS. 11 through 14, the description will proceed to advantages in lens driving device 10 using the magnetic circuit according to this exemplary embodiment in more details.

The description will be made as taking a case as an example where the first IS current flows through each of two coil parts 18*fl* and 18*fr* of front-side image stabilizer coil portion 18*f* counterclockwise as depicted at arrow $I_{IS1}$ and the second IS current flows through back-side image stabilizer coil portion 18*b* clockwise as depicted at arrow $I_{IS2}$, as shown in FIG. 11, in order to move auto-focusing lens driving portion (AF unit) 20 as a whole backwards in the manner which is described above.

In this event, as shown in FIGS. 13 and 14, it is understood that a magnetic field $B_{f1}$ produced by first IS current $I_{IS1}$ flowing through front-side image stabilizer coil portion 18*f* and magnetic field B produced by front-side permanent magnet piece 282*f* are opposite phase. It will be assumed that magnetic flux density of magnetic field B is indicated by a and magnetic flux density of magnetic field $B_{f1}$ is indicated by b. Accordingly, it is understood that front-side Hall element 50*f* detects total magnetic flux density (a+b) obtained by summing magnetic flux density a of magnetic field B and magnetic flux density b of magnetic field $B_{f1}$.

It is herein noted that it is necessary that magnetic flux density a of magnetic field B and total magnetic flux density (a+b) are in phase in order to detect a position of autofocusing lens driving portion (AF unit) 20 by means of front-side Hall element 50*f*.

FIG. 15 is a view showing a frequency response of front-side Hall element 50*f* in the magnetic circuit according to this exemplary embodiment. In FIG. 15, the horizontal axis represents a frequency (Frequency) (Hz), the left-hand vertical axis represents a gain (Gain) (dB), and the right-hand vertical axis represents a phase (Phase) (deg). In addition, in FIG. 15, a solid line indicates a gain characteristic and an alternate long and short dashed line indicate a phase characteristic.

As is apparent from FIG. 15, the frequency response of font-side Hall element 50*f* is divided into region I, region II, and region III. Region I is a region having a band not higher than a primary resonance frequency of the actuator and having low frequencies. Region II is a region having a band not lower than the primary resonance frequency of the actuator and having middle frequencies. Region III is a region having a band not lower than the primary resonance frequency of the actuator and having high frequencies.

FIG. 16 is a view showing relationships between phases and magnitudes among magnetic flux density a of magnetic field B generated by front-side permanent magnet piece 282*f*, magnetic flux density b of magnetic field $B_{f1}$ generated by first IS current $I_{IS1}$ flowing through front-side image stabilizer coil 18*f*, and total magnetic flux density (a+b) detected by front-side Hall element 50*f* in region I, region II, and region III. FIG. 17 is a view tabulated for the relationships of FIG. 16.

It is understood from FIGS. 16 and 17 as follows.

In the band not higher than the primary resonance frequency of region I, a magnitude |a| of magnetic flux density a of magnetic field B is larger than a magnitude |b| of magnetic flux density b of magnetic field $B_{f1}$ (|a|>|b|), and magnetic flux density a of magnetic field B and total magnetic flux density (a+b) are in phase although magnetic flux density a of magnetic field B and magnetic flux density b of magnetic field $B_{f1}$ are opposite phase. Accordingly, in region I, it is possible to detect the position of auto-focusing lens driving portion (AF unit) 20 by means of front-side Hall element 50*f*.

On the other hand, in a band not lower than primary resonance frequency, movement of front-side permanent magnet piece 282*f* is in phase with first IS current $I_{IS1}$ flowing through front-side image stabilizer coil portion 18*f*.

In the band not lower than the primary resonance frequency of region II, magnetic flux density a of magnetic field B and total magnetic flux density (a+b) are in phase because the magnitude |a| of magnetic flux density a of magnetic field B is larger than a magnitude |b| of magnetic flux density b of magnetic field $B_{f1}$ (|a|>|b|). Accordingly, in region II, it is possible to detect the position of auto-focusing lens driving portion (AF unit) 20 by means of front-side Hall element 50*f*.

On the other hand, in the band not lower than the primary resonance frequency of region III, the magnitude |a| of magnetic flux density a of magnetic field B is smaller than a magnitude |b| of magnetic flux density b of magnetic field $B_{f1}$ (|a|<|b|). However, inasmuch as the magnetic flux density a of the magnetic field B and total magnetic flux density (a+b) of the magnetic field B are in phase, the magnetic flux density a of the magnetic field B and the total magnetic flux density (a+b) are also in phase. As a result, in also region III, it is possible to detect the position of auto-focusing lens driving portion (AF unit) 20 by means of front-side Hall element 50*f*. That is, resonance does not occur in an output of Hall element.

Accordingly, when the Hall element is disposed between the two loop parts of the coil, it is understood that it is possible to detect the position of auto-focusing lens driving portion (AF unit) 20 in all of frequency ranges. In other words, Hall elements 50*f* and 50*l* can avoid to subject to adverse effect caused by the magnetic fields generated by the currents flowing through image stabilizer coil portions 18*f* and 18*l*, respectively.

Figure 18:
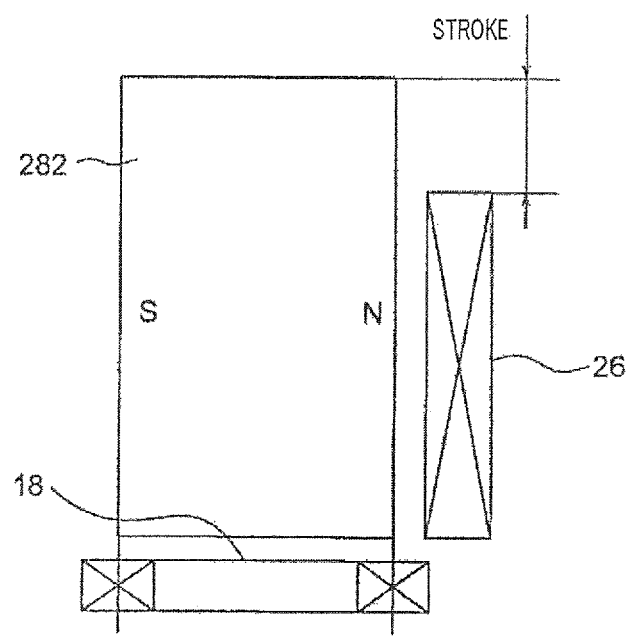
FIG. 18 is a cross sectional view showing a relationship of a placement among one permanent magnet piece of the permanent magnet, a focusing coil disposed around it, and an image stabilizer coil portion in the magnetic circuit illustrated in FIG. 11.
Figure 19:
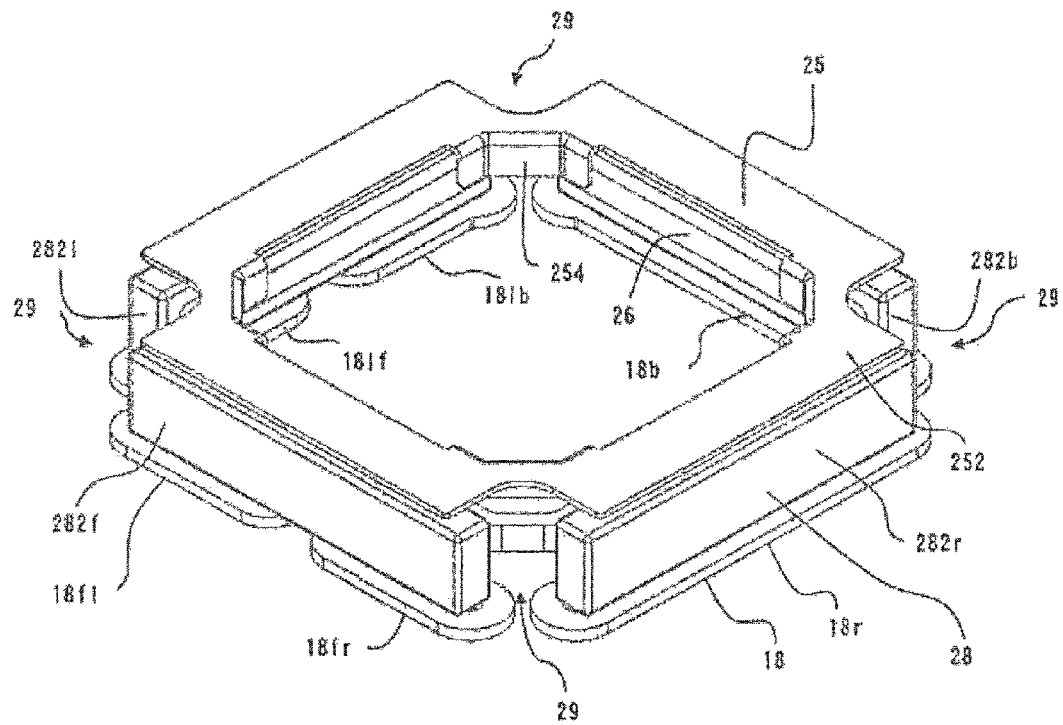
FIG. 19 is a perspective view illustrating a relationship with respect to a magnetic circuit in a lens driving device according to a first modified example of the first exemplary embodiment.
Figure 20:
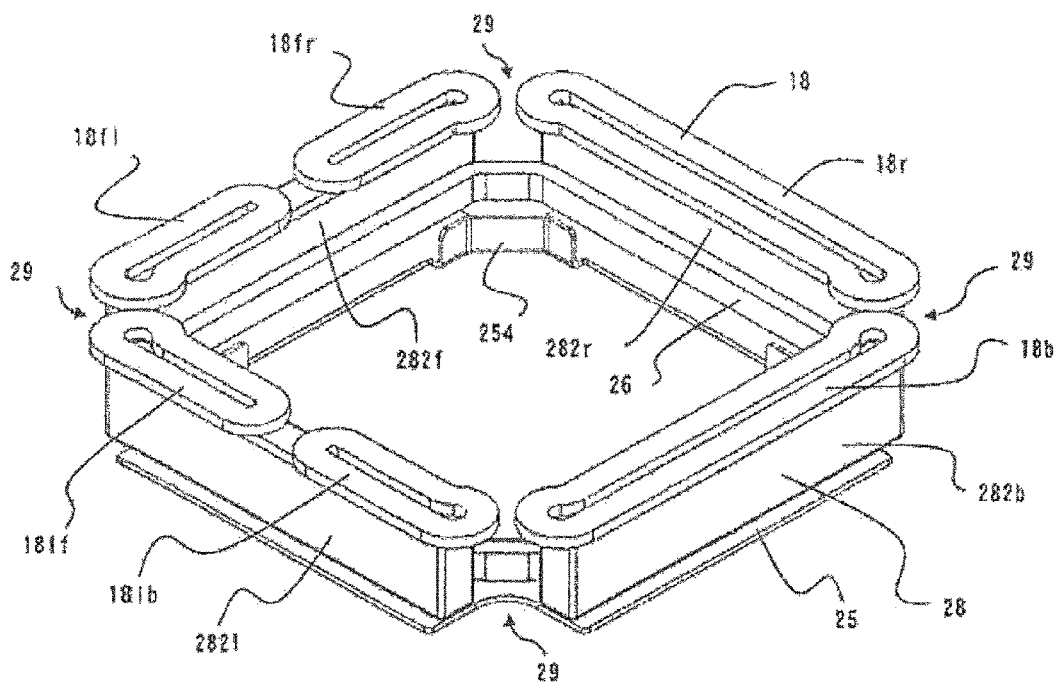
FIG. 20 is a perspective view illustrating the relationship with respect to the magnetic circuit in the lens driving device according to the first modified example of the first exemplary embodiment seen from a rear side.

FIG. 18 is a cross sectional view showing a relationship of a placement among one permanent magnet piece 282 of permanent magnet 28, focusing coil 26 disposed around it, and image stabilizer coil 18 in the magnetic circuit.

It is understood that the height of permanent magnet piece 282 is higher than the height of focusing coil 26. It is therefore possible to make a stoke larger in a case of position adjusting lens holder 24 (lens barrel) in the direction of optical axis O.

FIG. 19 to FIG. 23 illustrate a first modified example of the first exemplary embodiment.

FIG. 19 to FIG. 23 illustrate a configuration in which yoke 25 is newly added to the magnetic circuit constituted by permanent magnet 28, focusing coil 26 and image stabilizer coil 18 that is shown in FIG. 5.

Yoke 25 has coupling portion 252 integrally disposed in a substantially rectangular annular ring shape on a side facing the top surface (third surface) of each permanent magnet piece 282, and four vertical extension portions 254 that extend vertically downward in parallel with optical axis O at the inner sides of the four corners of coupling portion 252. That is, the yoke (25) has first yoke portions (vertical extension portions 254) that are disposed facing the first surfaces (inner wall surfaces 282*a*) of a plurality of magnets (permanent magnet pieces 282) in a manner in which a first coil (focusing coil 26) is sandwiched therebetween, and second yoke portions (coupling portions 252) that are disposed facing the third surface (top surface) of the plurality of magnets (permanent magnet pieces 282).

Yoke 25 is mounted to magnet holder 30, for example, by inserting protrusions (not shown) formed on an inner surface side at an upper portion of magnet holder 30 into holes (not shown) formed in coupling portion 252 and performing thermal welding. Vertical extension portions 254 are inserted into spaces formed between tubular portion 240 of lens holder 24 and focusing coil 26.

The four permanent magnet pieces 282 are fixed apart from each other in magnet holder 30, and gaps 29 are formed between the respective permanent magnet pieces 282. Vertical extension portions 254 of yoke 25 each have outer wall surface 254*a*. That is, the first yoke portions (vertical extension portions 254) have wall surfaces (outer wall surfaces 254*a*) that face the first surfaces (inner wall surfaces 282*a*) of the respective adjacent magnets (permanent magnet pieces 282) and separation parts (gaps 29) between the adjacent magnets (permanent magnet pieces 282), and are coupled by means of the second yoke portions (coupling portions 252).

In this case, since the four permanent magnet pieces 282 are disposed so as to each form one side of a square, the number of first yoke portions (vertical extension portions 254) disposed facing gaps 29 between the four permanent magnet pieces 282 is also four.

The respective outer wall surfaces 254*a* of vertical extension portions 254 are disposed at positions facing one part of inner wall 282*a* that is parallel with optical axis O of the respective permanent magnet pieces 282 as well as the corresponding gap 29. Focusing coil 26 is disposed between one part of inner wall 282*a* of the respective permanent magnet pieces 282 and gaps 29, and outer wall surfaces 254*a* of vertical extension portions 254.

Note that, although yoke 25 is mounted to magnet holder 30 and is separated from permanent magnet pieces 282 (see FIG. 21), a configuration may also be adopted in which yoke 25 and each permanent magnet piece 282 are directly contacting each other.

By constructing the magnetic circuit in the manner described above, a configuration can be adopted in which a magnetic circuit is added between permanent magnet 28 and focusing coil 26 of the first exemplary embodiment, and in which a magnetic circuit is newly formed between vertical extension portions 254 of yoke 25 and focusing coil 26. That is, together with a plurality of magnets (permanent magnet pieces 282), yoke (25) forms a magnetic circuit that generates a magnetic flux that crosses the first coil (focusing coil 26). In this case, a magnetic circuit in which a magnetic flux is emitted from the north poles (inner wall surfaces 282*a*) of permanent magnet pieces 282 and crosses focusing coil 26 and efficiently returns to the south poles of permanent magnet pieces 282 through yoke 25 is formed by permanent magnet pieces 282 and yoke 25. Since the magnetic flux crosses the four corners of focusing coil 26, a propulsive force that arises when a current flows through focusing coil 26 is larger than in the first exemplary embodiment.

That is, according to the first modified example, the capacity of permanent magnet 28 and focusing coil 26 can be made less than in the first exemplary embodiment. Since small components can be applied as permanent magnet 28 and focusing coil 26, the total weight of auto-focusing lens driving portion 20 does not become heavier as a result of newly adding yoke 25. Rather, in the case of securing the same driving force for auto-focusing lens driving portion 20 as in the first exemplary embodiment, it is possible to reduce the total weight of auto-focusing lens driving portion 20. Accordingly, by applying yoke 25, it is also possible to reduce power consumption when driving auto-focusing lens driving portion 20 to move up and down in parallel with optical axis O.

In addition, permanent magnet piece 282 and image stabilizer coil 18 are disposed so that edges of permanent magnet piece 282 in the radial direction are laid in a coil sectional width of image stabilizer coil 18 in the radial direction. It is therefore possible to heighten sensitivity of a driving force for moving auto-focusing lens driving portion (AF unit) 20 as a whole in a direction orthogonal to optical axis O.

Incidentally, there is a concern that four suspension wires 16 may be fracture in lens driving device 10 having such a structure because four suspension wires 16 are subjected to force in a direction to expand caused by a drop impact or the like. However, lens driving device 10 according to this exemplary embodiment comprises a fracture preventing member for preventing four suspension wires 16 from fracturing in the manner which will be presently described.

Figure 24:
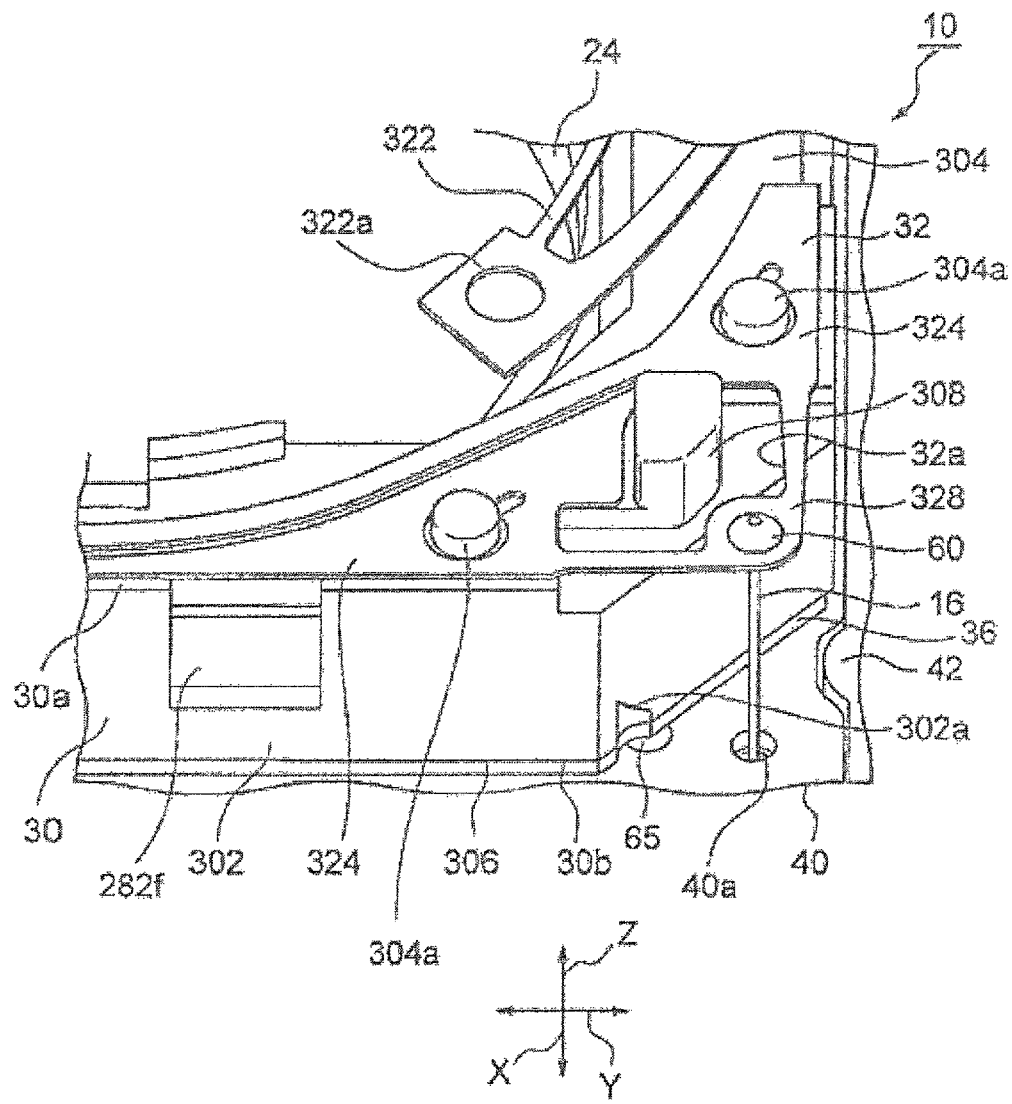
FIG. 24 is a partial perspective view enlargedly showing a part fixing the other end of a suspension wire to an upper leaf spring for use in the lens driving device illustrated in FIG. 1.
Figure 25:
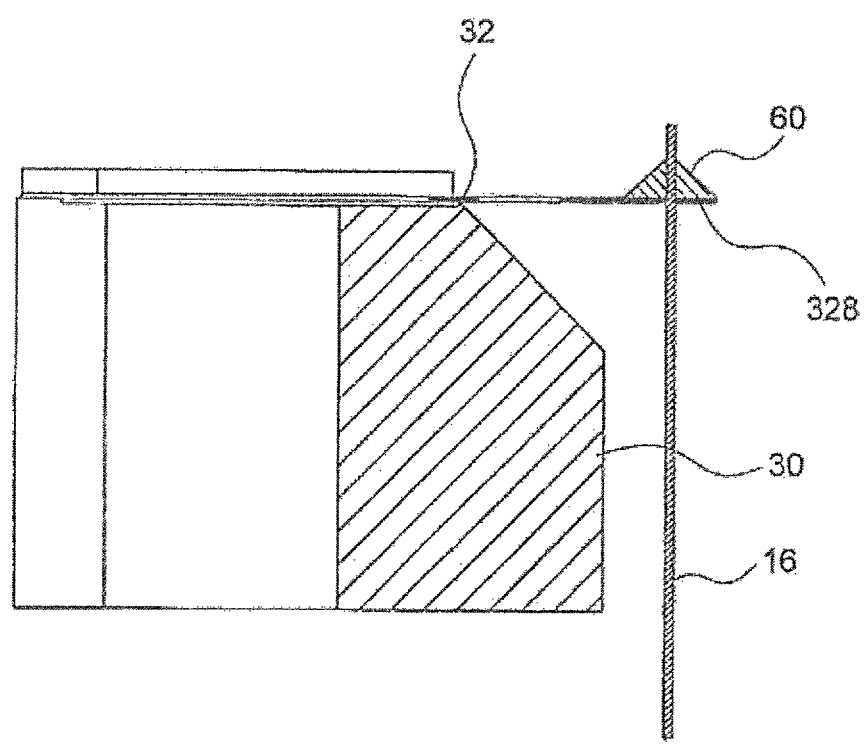
FIG. 25 is a partial cross sectional view of the fixed part illustrated in FIG. 24.

Referring to FIGS. 24 and 25, the description will proceed to the fracture preventing member according to this exemplary embodiment in detail. FIG. 24 is a partial perspective view enlargedly showing a part fixing the other end of suspension wire 16 to upper leaf spring 32, and FIG. 25 is a partial cross sectional view of the fixed part.

In the manner which is described above, upper leaf spring 32 comprises four arc-shaped extending portions 328 (only one arc-shaped extending portion 328 is shown in FIG. 24) for extending at the four corners of upper outer end portion 324 in the radial direction outwards. Four arc-shaped extending portions 328 have, at tip portions thereof, four wire fixing holes 328a (see, FIG. 3) in which the other ends of four suspension wires 16 are inserted (fitted), respectively. The other ends of four suspension wires 16 are inserted in four wire fixing holes 328a to be fixed by means of solder 60 or adhesive agent (not shown).

Accordingly, four arc-shaped extending portions 328 serve as a wire fixing portion for fixing the other ends of four suspension wires 16.

In lens driving device 10 having such a structure, although auto-focusing lens driving portion (AF unit) 20 is subjected to the force in the direction to apart from base 14 due to a drop impact or the like, auto-focusing lens driving portion (AF unit) 20 moves upward with four arc-shaped extending portions 328 elastically deformed in a state where the other ends of four suspension wires 16 are fixed to four arc-shaped extending portions 328 of upper leaf spring 32.

As a result, it is possible to prevent four suspension wires 16 from fracturing. Accordingly, four arc-shaped extending portions 328 act as the facture preventing member for preventing four suspension wires 16 from fracturing.

On the other hand, as shown in FIG. 24, magnet holder 30 comprises four upper stoppers 308 (only one upper stopper 308 is shown in FIG. 24) which project at the four corners of upper ring-shaped end portion 304 upwards. Each upper stopper 308 projects from opening 32a formed in upper leaf spring 32 between upper outer end portion 324 and each arc-shaped extending portion 328.

In other words, four upper stoppers 308 project from magnet holder 30 toward an inner wall surface of shielding cover 42.

By four upper stoppers 308, movement of auto-focusing lens driving portion (AF unit) 20 upwards is limited. In other words, when auto-focusing lens driving portion (AF unit) 20 moves upwards, four upper stoppers 308 of magnet holder 30 hits to the inner wall surface of upper end portion 424 of shielding cover 42 although four arc-shaped extending portions 328 become elastically deformed before four arc-shaped extending portions 328 buckle or before four suspension wires 16 are subjected to a fracturing force.

That is, four upper stoppers 308 serve as a fracture prevention supporting member for supporting prevention of fracture in four suspension wires 16.

As shown in FIG. 2, there is little clearance (gap) between fixed members (14, 40, 18, 44) and auto-focusing lens driving portion (AF unit) 20. Accordingly, although auto-focusing lens driving portion (AF unit) 20 is subjected to a force in a direction to get near base 14 due to a drop impact or the like, four suspension wires 16 do not buckle because auto-focusing lens driving portion (AF unit) 20 immediately hits to an upper surface of fixed members (14, 40, 18, 44).

Figure 26:
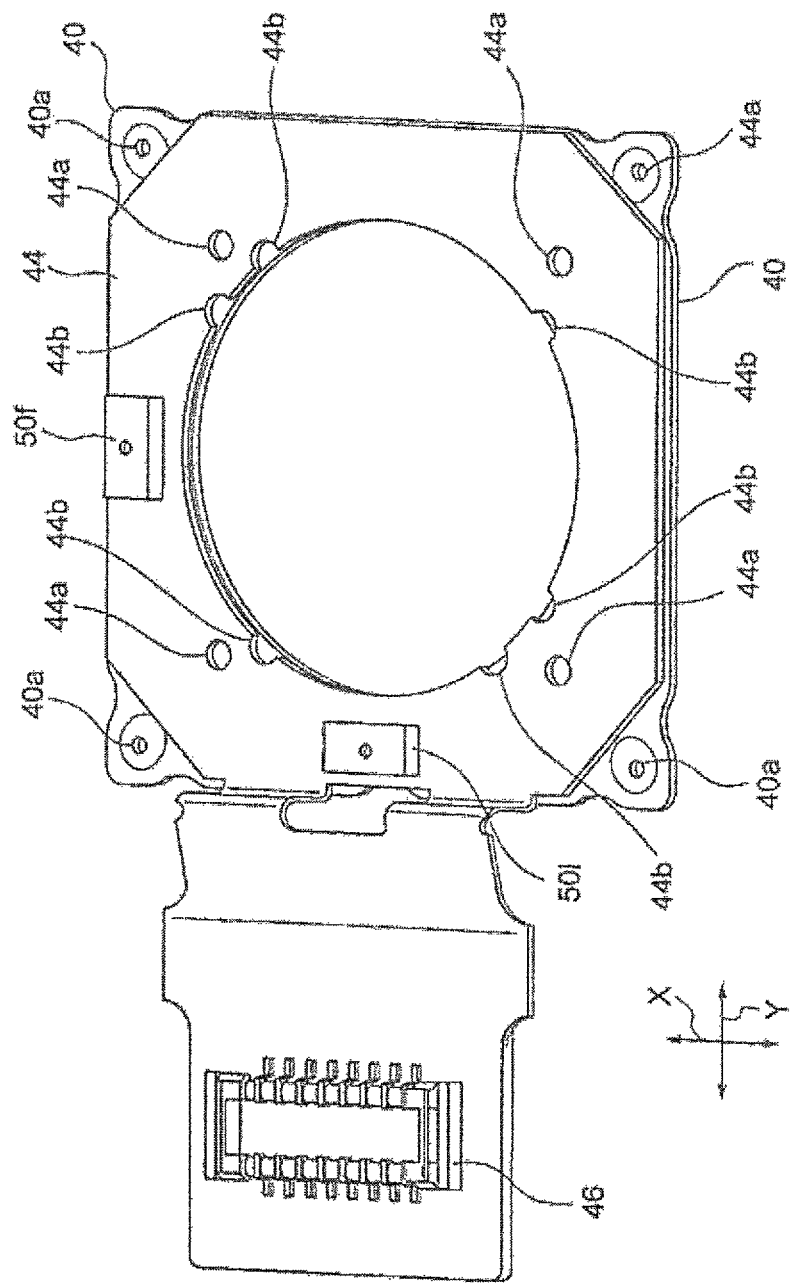
FIG. 26 is a perspective view showing an assembly of a coil board and a flexible printed circuit (FPC) for use in the lens driving device illustrated in FIG. 1 seen from a rear side.

Referring to FIG. 26 in addition to FIGS. 2 to 4, the description will proceed to flexible printed circuit (FPC) 44 disposed between base 14 and coil board 40 and a method of mounting it. FIG. 26 is a perspective view showing an assembly of coil board 40 and flexible printed circuit (FPC) 44 seen from a rear side.

As shown in FIG. 3, base 14 has four positioning protrusions 142 which project upwards on diagonal lines in vicinity of circular opening 14a in the radial direction outwards. On the other hand, as shown in FIG. 4, coil board 40 has four positioning hole portions 40b in which four positioning protrusions 142 are charged, respectively. As shown in FIG. 26, flexible printed circuit (FPC) 44 also has four positioning hole portions 44a at positions corresponding to four positioning hole portions 40b. Accordingly, four positioning protrusions 142 of base 14 are charged in four positioning hole portions 40b of coil board 40 via four positioning hole portions 44a of flexible printed circuit (FPC) 44.

As shown in FIG. 26, flexible printed circuit (FPC) 44 has a rear surface on which two Hall elements 50f and 50l are mounted. On the other hand, as shown in FIG. 2, base 14 has holes 14b in which two Hall elements 50f and 50l are fitted.

As shown in FIG. 4, on coil board 40, six lands 18a for supplying electric currents to four image stabilizer coil portions 18f, 18b, 18l, and 18r are formed along circular opening 40a bored at a central portion thereof. On the other hand, as shown in FIG. 26, on flexible printed circuit (FPC) 44, six notch portions 44b are formed at positions corresponding to six lands 18a. Accordingly, by mounting solder pastes on six notch portions 44b and by carrying out solder reflow, it is possible to electrically connect internal wiring (not shown) of flexible printed circuit (FPC) 44 with six lands 18a of coil board 40.

As shown in FIG. 26, flexible printed circuit (FPC) 44 has a rear surface on which control portion 46 is mounted. Control portion 46 controls the current flowing through focusing coil 16 and controls the currents flowing through four image stabilizer coil portions 18f, 18b, 18l, and 18r so as to compensate wobbling detected based on two directional gyros (not shown) on the basis of position detected signals detected by two Hall elements 50f and 50l.

Figure 27:
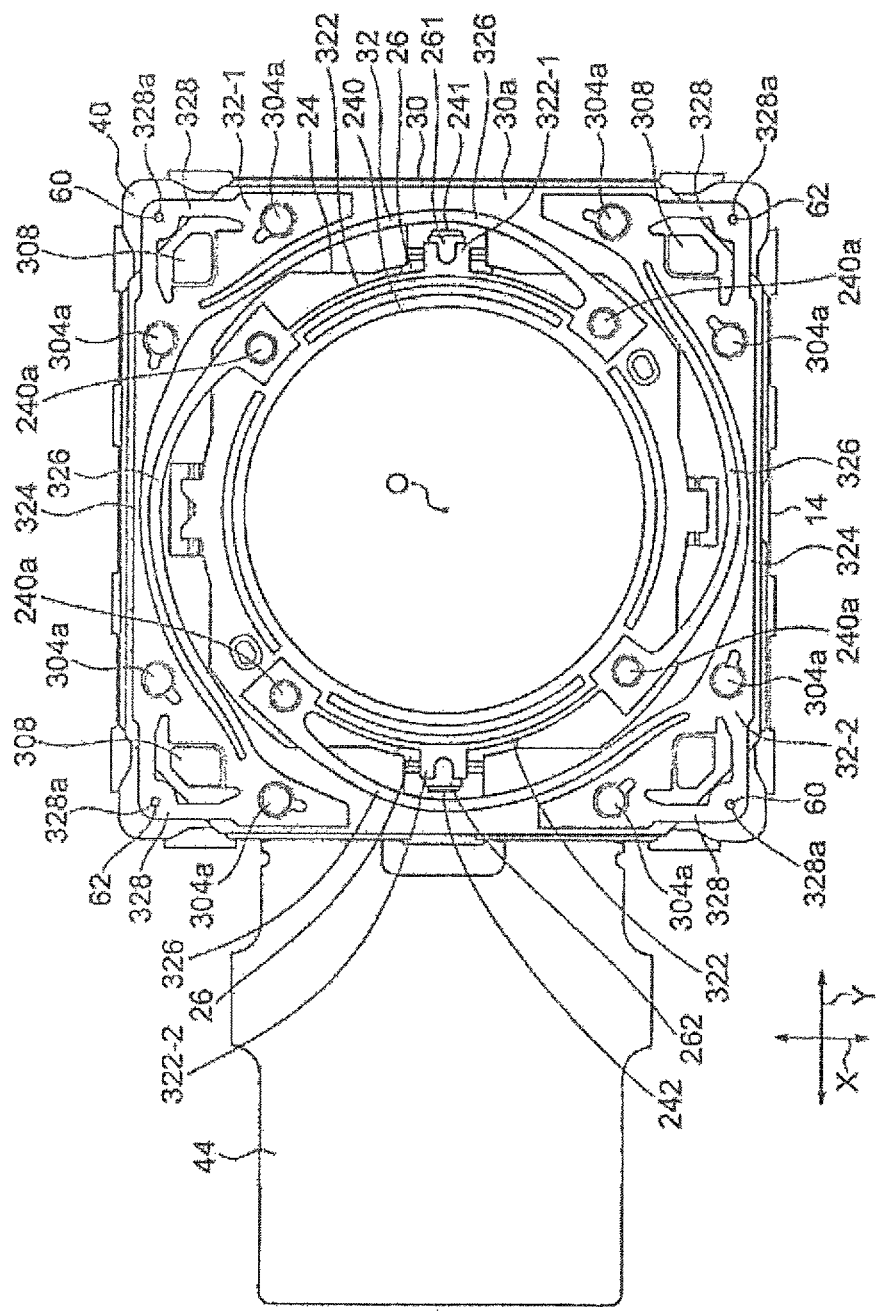
FIG. 27 is a plan view showing a state where a shielding cover is omitted from the lens driving device illustrated in FIG. 1.
Figure 28:
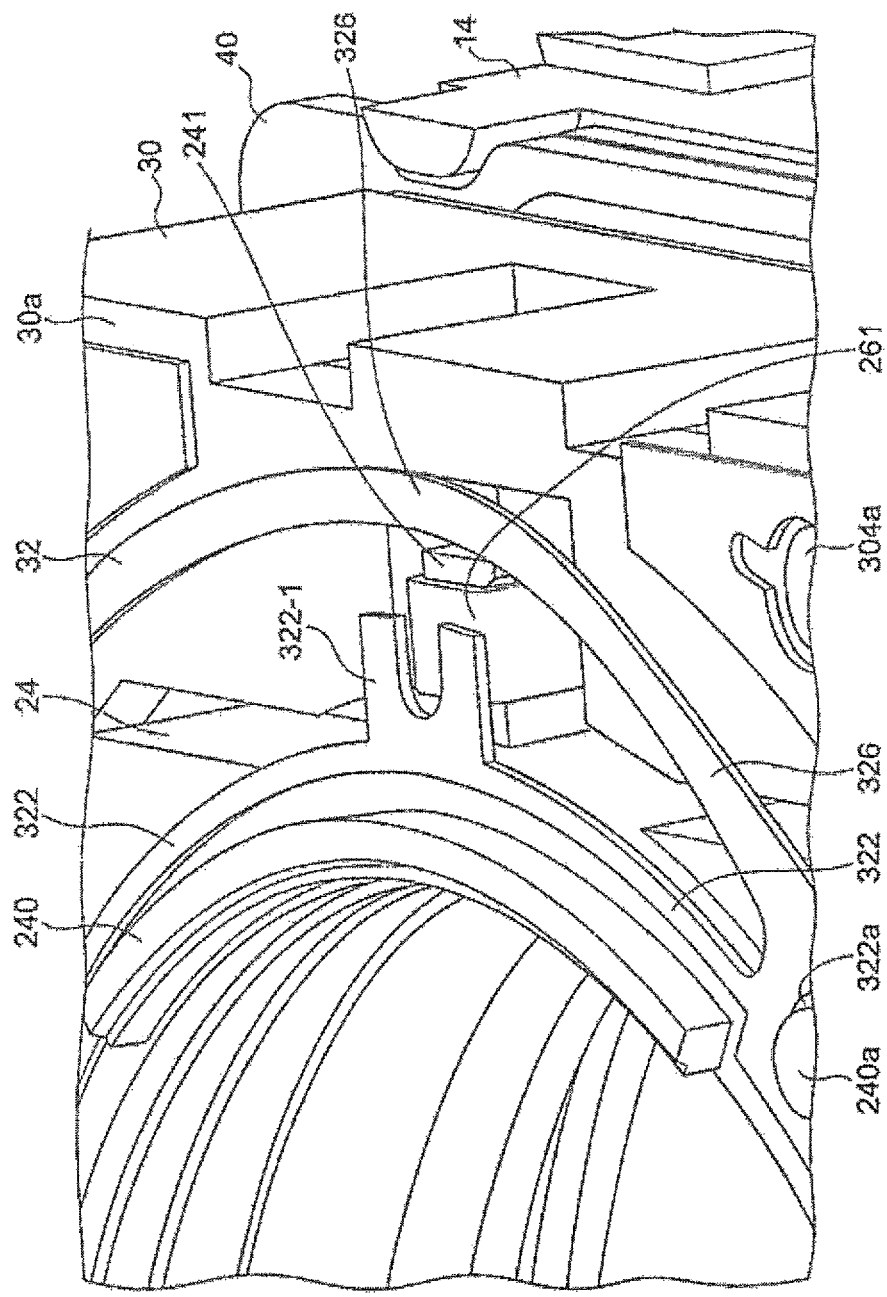
FIG. 28 is a partial enlarged perspective view enlargedly showing a tied-up part of an end portion of a wire composed of the focusing coil in FIG. 27.

Referring to FIGS. 27 and 28, the description will proceed to a method for feeding to focusing coil 26. FIG. 27 is a plan view showing a state where shielding cover 42 is omitted from lens driving device 10. FIG. 28 is a partial enlarged perspective view enlargedly showing a tied-up part of an end portion of a wire composed of focusing coil 26 as shown in FIG. 27.

As shown in FIG. 27, lens holder 24 has, at an upper end thereof, first and second projecting portions 241 and 242 which project in a direction (outwards in the radial direction) to apart from each other in left-and-right direction Y. In the example being illustrated, first projecting portion 241 is also called a right-side projecting portion because it projects to right side while second projecting portion 242 is also called a left-side projecting portion because it projects to left side.

On the other hand, the wire composed of focusing coil 26 has first and second end portions 261 and 262. As shown in FIG. 28, first end portion 261 of the wire of focusing coil 26 is tied up to first projecting portion (right-side projecting portion) 241 of lens holder 24. Similarly, second end portion 262 of the wire of focusing coil 26 is tied up to second projecting portion (left-side projecting portion) 242 of lens holder 24. Accordingly, first and second end portions 261 and 262 are also called first and second tied-up parts, respectively.

On the other hand, as shown in FIG. 27, first leaf spring (upper leaf spring) 32 comprises first and second leaf spring pieces 32-1 and 32-2 which are electrically insulated from each other. First and second leaf spring pieces 32-1 and 32-2 have rotational symmetry shapes with respect to optical axis O of the lens as a center. First leaf spring piece 32-1 is disposed, at the first end (the upper end) of magnet holder 30, substantially back side and right side while second leaf spring piece 32-2 is disposed, at the first end (the upper end) of magnet holder 30, substantially front side and left side.

Upper inner end portion 322 of first leaf spring piece 32-1 disposed at the right side has first U-shaped terminal portion 322-1 projecting rightwards (outwards in the radial direction) at a position corresponding to first projecting portion (right-side projecting portion) 241 of lens holder 24. Likewise, upper inner end portion 322 of second leaf spring piece 32-2 disposed at the left-side has second U-shaped terminal portion 322-2 projecting leftwards (outwards in the radial direction) at a position corresponding to second projecting portion (left-side projecting portion) 242 of lens holder 24. First U-shaped terminal portion 322-1 is also called a right-side U-shaped terminal portion while second U-shaped terminal portion 322-2 is also called a left-side U-shaped terminal portion.

First U-shaped terminal portion (right-side U-shaped terminal portion) 322-1 is electrically connected to first end portion (first tied-up part) 261 of focusing coil 26 by means of solder (not shown) at first projecting portion (right-side projecting portion) 241 of lens holder 24. Similarly, second U-shaped terminal portion (left-side U-shaped terminal portion) 322-2 is electrically connected to second end portion (second tied-up part) 262 of focusing coil 26 by means of solder (not shown) at second projecting portion (left-side projecting portion) 242 of lens holder 24.

In addition, in the manner which is described above, among four suspension wires 16, the other ends of two suspension wires 16 (right-back and left-front in the example of FIG. 27) are connected to arc-shaped extending portions 328 through wire fixing holes 328a by means of solder 60. The other ends of remaining two suspension wires 16 (left-back and right-front in the example of FIG. 27) are fixed to arc-shaped extending portions 328 through wire fixing holes 328a by means of adhesive agent 62.

Accordingly, suspension wire 16 of the right-back is electrically connected to first end portion (first tied-up part) 261 of focusing coil 26 via first leaf spring piece 32-1 of first leaf spring (upper leaf spring) 32, and first U-shaped terminal portion (right-side U-shaped terminal portion) 322-1. Similarly, suspension wire 16 of the left-front is electrically connected to second end portion (second tied-up part) 262 of focusing coil 26 via second leaf spring piece 32-2 of first leaf spring (upper leaf spring) 32, and second U-shaped terminal portion (left-side U-shaped terminal portion) 322-2.

In the manner which is described above, feeding to focusing coil 26 is carried out from suspension wires 16 via first leaf spring 32.

In this connection, yoke 25 that is described in the first modified example is interposed between first leaf spring 32 and lens holder 24. Therefore, in a case where lens holder 24 and first leaf spring 32 are connected as described above, yoke 25 that is made from a single member as described in the first modified example cannot be mounted.

Further, in a case in which a specific part of lens holder 24 interferes with yoke 25 accompanying upward movement of lens holder 24 also, a problem will arise if yoke 25 that is made from a single member is applied. For example, even in a case where lens holder 24 and first leaf spring 32 are not connected, if lens holder 24 includes first projecting portion 241 and second projecting portion 242 for tying end portions 261 and 262 of focusing coil 26, there is a risk that first projecting portion 241 and second projecting portion 242 will collide with yoke 25 accompanying upward movement of lens holder 24.

Figure 40:
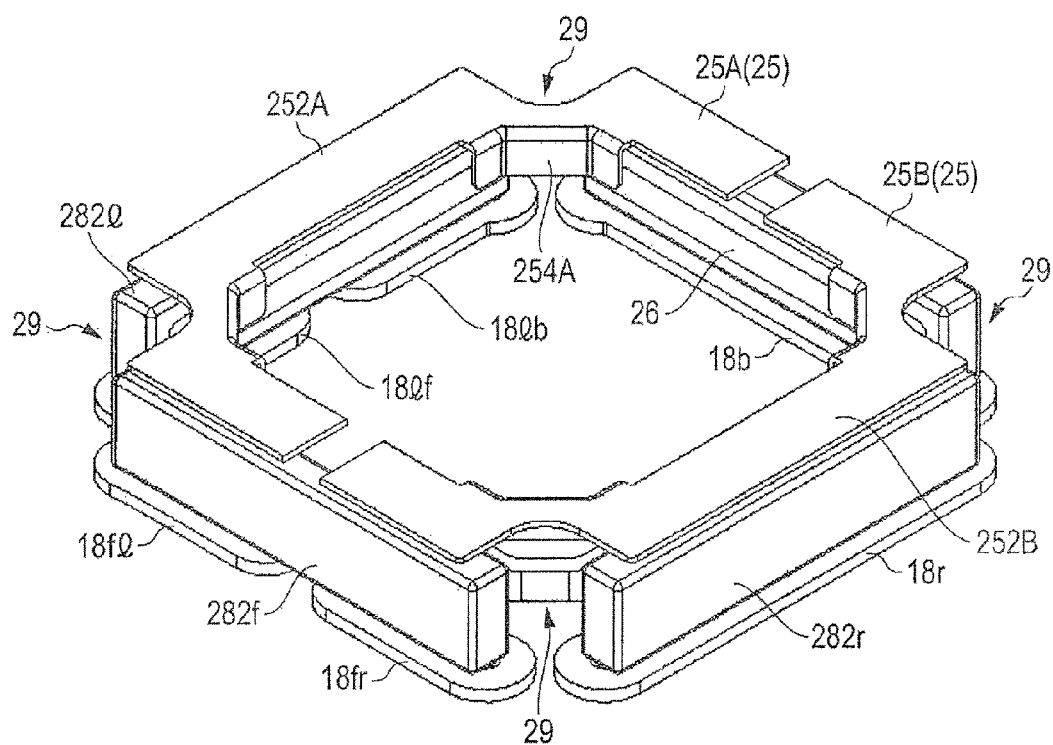
FIG. 40 is a perspective view illustrating an example in a case where a yoke is constituted by a plurality of members.
Figure 41:
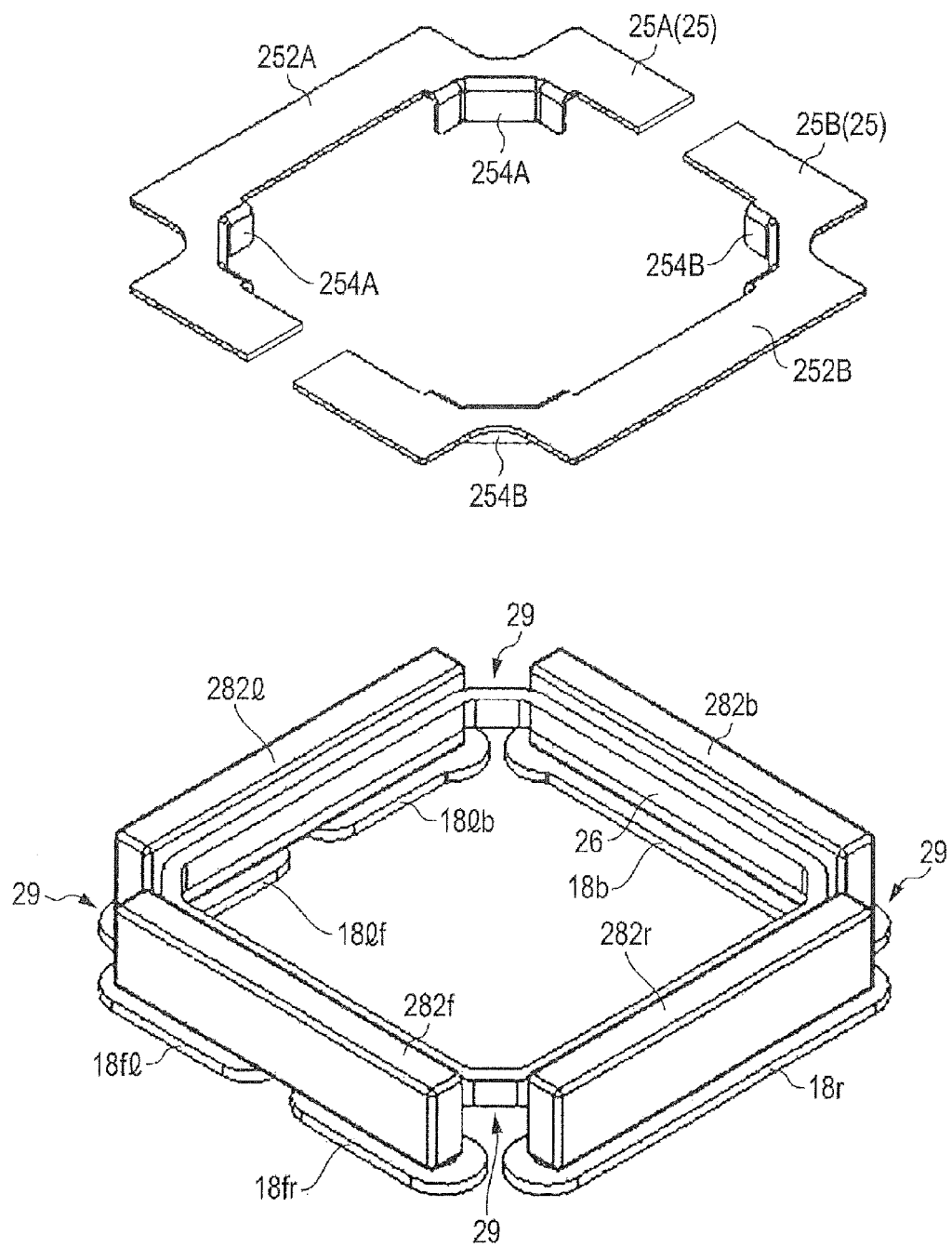
FIG. 41 is an exploded perspective view illustrating an example in a case where a yoke is constituted by a plurality of members.
Figure 42:
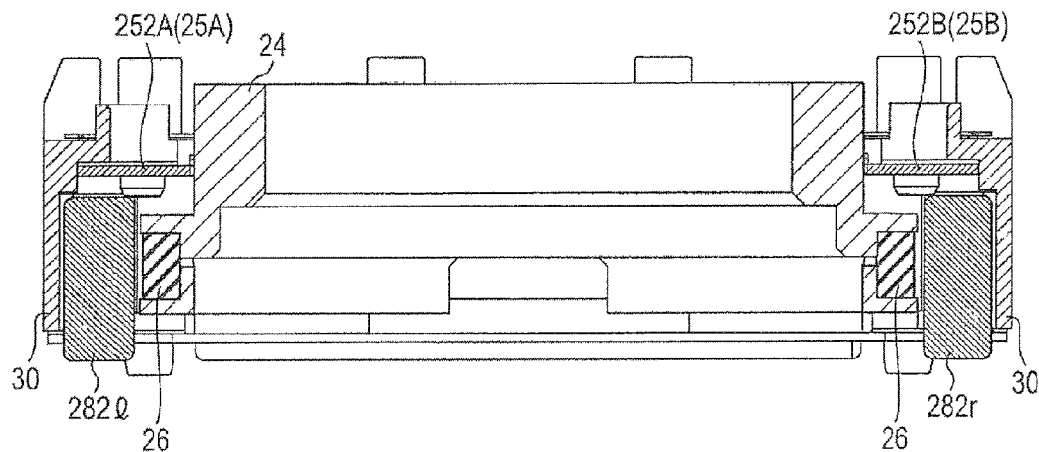
FIG. 42 is a vertical cross sectional view at a portion at which a yoke is present.
Figure 43:
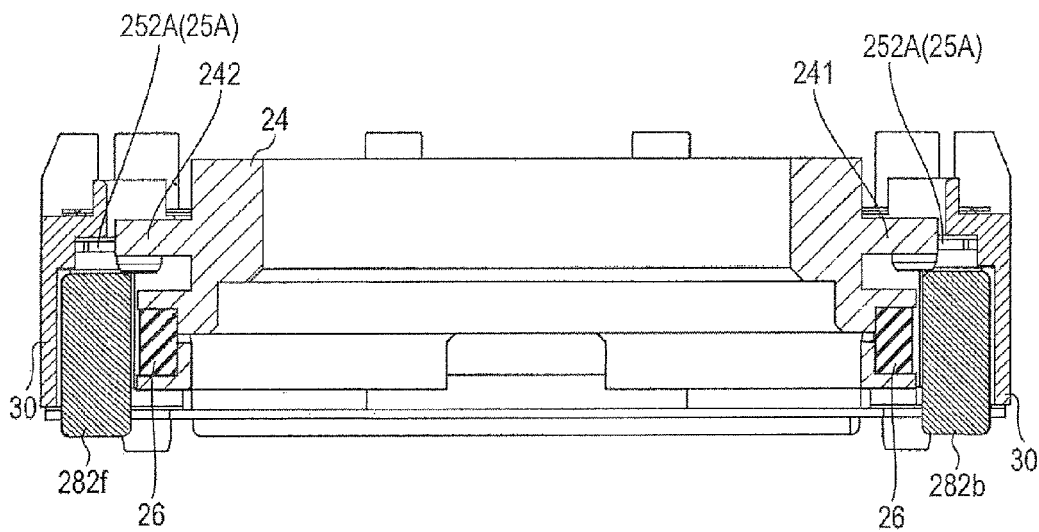
FIG. 43 is a vertical cross sectional view at a portion at which a yoke is not present (separation part)

In such a case, it is preferable to construct yoke 25 with a plurality of members as shown in FIG. 40 to FIG. 43. FIG. 40 is a perspective view illustrating an example in a case where yoke 25 is constituted by a plurality of members. FIG. 41 is an exploded perspective view illustrating an example in a case where yoke 25 is constituted by a plurality of members. FIG. 42 is a vertical cross sectional view at a portion at which yoke 25 is present. FIG. 43 is a vertical cross sectional view at a portion at which yoke 25 is not present (separation part).

In the example shown in FIG. 40 to FIG. 43, yoke 25 according to the first modified example (see FIGS. 19 to 23) is constituted by a plurality of members (yokes 25A and 25B). Further, predetermined parts (parts with respect to which there is a risk of interfering with yoke 25, for example, first projecting portion 241 and second projecting portion 242) of lens holder 24 are positioned at a separation part between yokes 25A and 25B.

In a case where yoke 25 is constituted by a single member, as in the first modified example, lens holder 24 can only move upward as far as a position that is immediately before a position at which lens holder 24 would collide with yoke 25. Therefore, to secure the moving distance, it is necessary to increase the size of lens driving device 10 in the optical axis direction. Further, in a case where it is necessary to electrically connect lens holder 24 and first leaf spring 32, it is not even possible to mount yoke 25.

In contrast, in a case where yoke 25 is constituted by a plurality of members (yokes 25A and 25B), since interference with yoke 25 when lens holder 24 moves upward can be avoided, the height of lens driving device 10 can be lowered. Further, in a case where lens holder 24 and first leaf spring 32 are electrically connected also (see FIGS. 27 and 28), yoke 25 can be mounted without any problem.

Next, the description will proceed to a method of assembling lens driving device 10.

First, auto-focusing lens driving portion (AF unit) 20 is manufactured by assembling lens holder 24, focusing coil 26, permanent magnet 28, magnet holder 30, upper leaf spring 32, lower leaf spring 34, and spacer 36.

On the other hand, an assembly consisting of coil board 40 and flexible printed circuit (FPC) 44, as shown in FIG. 26, is manufactured by the above-mentioned solder reflow. The assembly is mounted on base 14 to which one ends of four suspension wires 16 are fixed.

Subsequently, above-mentioned auto-focusing lens driving portion (AF unit) 20 is mounted on base 14 via the above-mentioned assembly and the other ends of four suspension wires 16 are fixed to arc-shaped extending portions 328 via wire fixing holes 328a by means of solder 60 or adhesive agent 62.

First and second U-shaped terminal portions 322-1 and 322-2 of first leaf spring (the upper leaf spring) 32 are connected to first and second end portions 261 and 262 of focusing coil 26.

Lastly, shielding cover 42 is put so as to cover auto-focusing lens driving portion (AF unit) 20 and a lower end of shielding cover 42 is fixed to base 14.

As such a manner, it is possible to easily assemble lens driving device 10.

Lens driving device 10 assembled in such a manner has a size of 11 mm×11 mm×4.2 mm.

A method of attaching damper material 65 for suppressing undesired resonance in the direction of optical axis O of auto-focusing lens driving portion (AF unit) 20 as well as placement positions of damper material 65 in lens driving device 10 will now be described with reference to FIG. 29 to FIG. 31.

Figure 29:
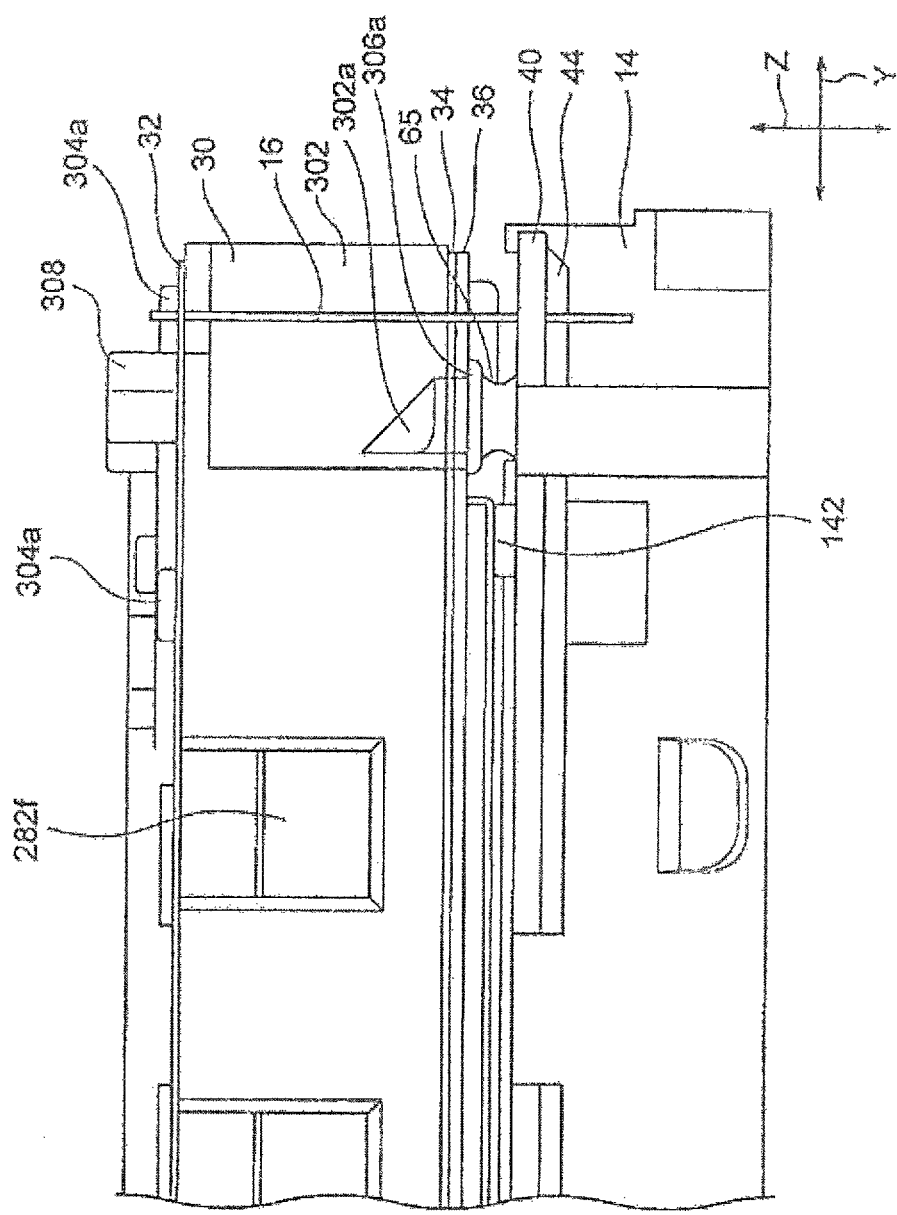
FIG. 29 is a partial vertical cross sectional view showing a state where a shielding cover is omitted from the lens driving device illustrated in FIG. 1.
Figure 30:
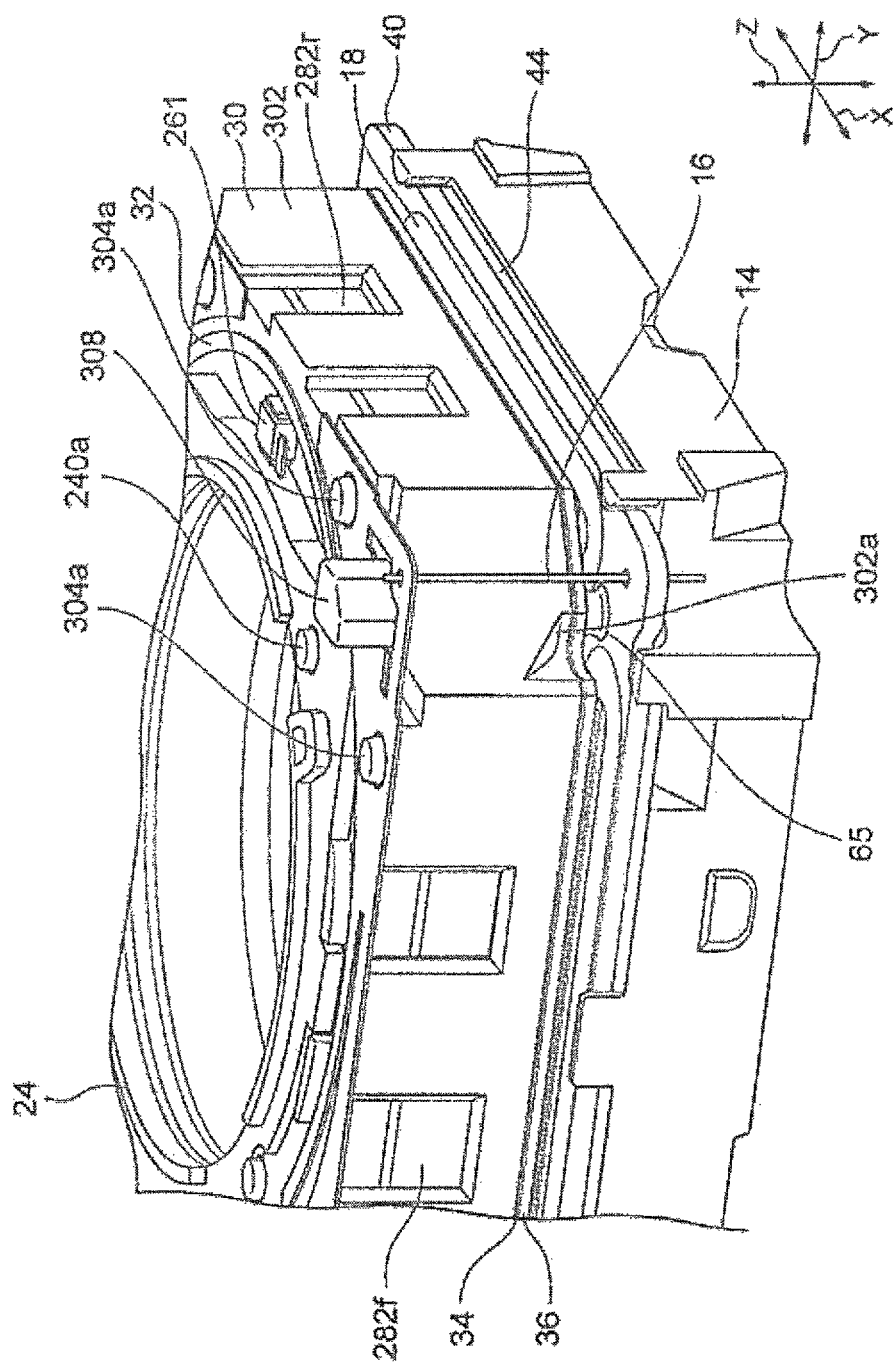
FIG. 30 is a partial perspective view of the lens driving device illustrated in FIG. 29 seen from a diagonally upward direction.

FIG. 29 is a partial front view of lens driving device 10 in a state where shielding cover 42 is omitted therefrom. FIG. 30 is a partial perspective view of lens driving device 10 illustrated in FIG. 29 seen from a diagonally upward direction. FIG. 31 is a plan view showing placement positions of damper material 65 in lens driving device 10 in a state in which shielding cover 42 is omitted and one part of upper leaf spring (first leaf spring) 32 is omitted.

Damper material 65 is disposed between four lower protrusions 306a of magnet holder 30 and coil board 40. Outer tubular portion 302 of magnet holder 30 has four guide grooves 302a that guide a dispenser (not shown) for applying damper material 65. It is thereby possible to easily apply damper material 65 in gaps between the four lower protrusions 306a and coil board 40 using the dispenser. As described in the foregoing, the gaps between the four lower protrusions 306a and coil board 40 are narrower than gaps in another region. Therefore, when the dispenser that is inserted along guide grooves 302a is used to apply damper material 65 in the vicinity of four lower protrusions 306a, the applied damper material 65 naturally accumulates in the gaps between the four lower protrusions 306a and coil board 40 by the effect of surface tension.

In the example being illustrated, as damper material 65, an ultraviolet curing silicone gel having a viscosity of 90 Pa·s is used that is manufactured by ThreeBond Co. Ltd. and sold under the product name TB3168E.

Accordingly, after applying damper material 65 into gaps between the four lower protrusions 306a of magnet holder 30 and coil board 40 in the manner described above, damper material 65 is cured by irradiating damper material 65 with ultraviolet light.

Figure 32:
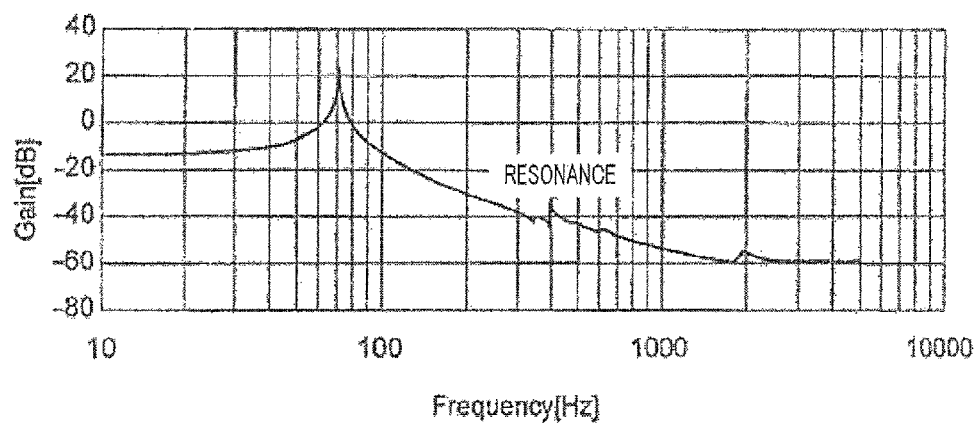
FIG. 32 illustrates a frequency response in an optical axis direction of an auto-focusing lens driving portion of a conventional lens driving device in which there is no damper material.
Figure 33:
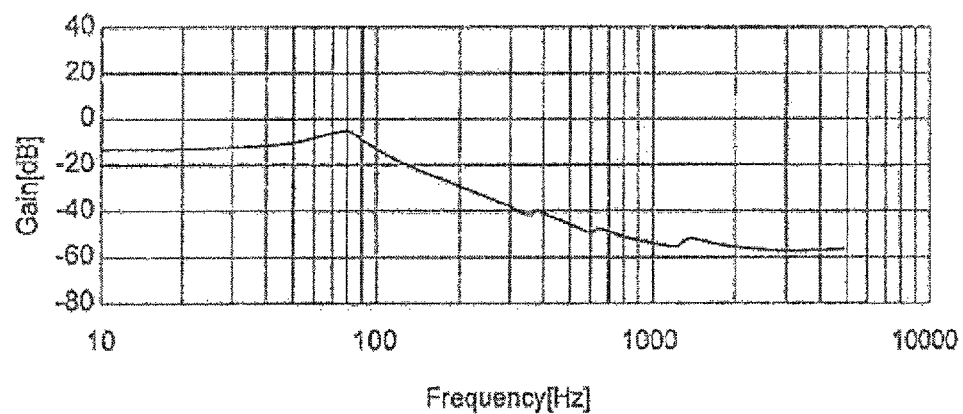
FIG. 33 illustrates a frequency response in an optical axis direction of the auto-focusing lens driving portion of the lens driving device according to the first exemplary embodiment of the present invention.

Frequency responses in a case where damper material 65 is not provided (conventional example) and a case where damper material 65 is provided (first exemplary embodiment) will now be described referring to FIG. 32 and FIG. 33. FIG. 32 illustrates a frequency response in optical axis O direction of auto-focusing lens driving portion (AF unit) 20 of a conventional lens driving device in a case where damper material 65 is not provided. FIG. 33 illustrates a frequency response in optical axis O direction of auto-focusing lens driving portion (AF unit) 20 of lens driving device 10 according to the first exemplary embodiment of the present invention in a case where damper material 65 is provided. In each of FIG. 32 and FIG. 33, the abscissa axis represents a frequency [Hz] while the ordinate axis represents a gain [dB].

As is apparent from FIG. 32, in the conventional lens driving device without damper material 65, resonance (a high-order resonance mode) is generated in optical axis O direction at frequencies of about 400 Hz.

In contrast, as is apparent from FIG. 33, in lens driving device 10 according to the first exemplary embodiment that includes damper material 65, generation of such resonance (the high-order resonance mode) in optical axis O direction is suppressed.

Accordingly, lens driving device 10 according to the first exemplary embodiment enables control operations that realize stable image stabilization.

Further, since damper material 65 is disposed so as to support auto-focusing lens driving portion (AF unit) 20 that is a movable portion on the image stabilizing side, damper material 65 also has an effect of relieving the impact on auto-focusing lens driving portion (AF unit) 20 if lens driving device 10 is dropped.

Above-mentioned lens driving device 10 according to the first exemplary embodiment of the present invention has effects which will be presently described.

First, it is possible for two Hall elements 50f and 50l to avoid a detrimental effect caused by the magnetic field generated by the current flowing through specific two image stabilizer coil portions 18f and 18l because two Hall elements 50f and 50l are disposed on base 14 at the positions where specific two image stabilizer coil portions 18f and 18l are separated into respective two coil parts 18fl, 18fr and 18lf, 18lb.

Secondly, it is possible to prevent four suspension wires 16 from fracturing and to heighten impact resistance of lens driving device 10 because the lens driving device comprises fracture preventing member 328.

Thirdly, it is possible to electrically connect the inner wiring of flexible printed circuit (FPC) 44 with the plurality of lands 18a of coil board 40 by means of solder reflow because notch portions 44b are formed to flexible printed circuit (FPC) 44 at the positions corresponding to the plurality of lands 18a formed on coil board 40.

Fourthly, it is possible to make the stoke in the case of position adjusting lens holder 24 (lens barrel) in the direction of optical axis O larger because the height of focusing coil 26 is lower than the height of permanent magnet piece 282.

Fifthly, it is possible to enhance sensitivity of the driving force for moving auto-focusing lens driving portion (AF unit) 20 as a whole in the direction orthogonal to optical axis O because permanent magnet pieces 282 and image stabilizer coil portions 18 are disposed so that the edges of permanent magnet pieces 282 in the radial direction are laid in the coil sectional width of image stabilizer coil portions 18 in the radial direction.

Sixthly, since damper material 65 is disposed between the fixed member (14, 40, 18, and 44) and auto-focusing lens driving portion 20, undesired resonance can be suppressed and stable operations can be performed.

Seventhly, since damper material 65 is disposed between the fixed member (14, 40, 18, and 44) and auto-focusing lens driving portion 20, the proof stress at a time that lens driving device 10 is dropped can be improved.

Next, modified examples of lens driving device 10 according to the first exemplary embodiment will be described.

Figure 31:
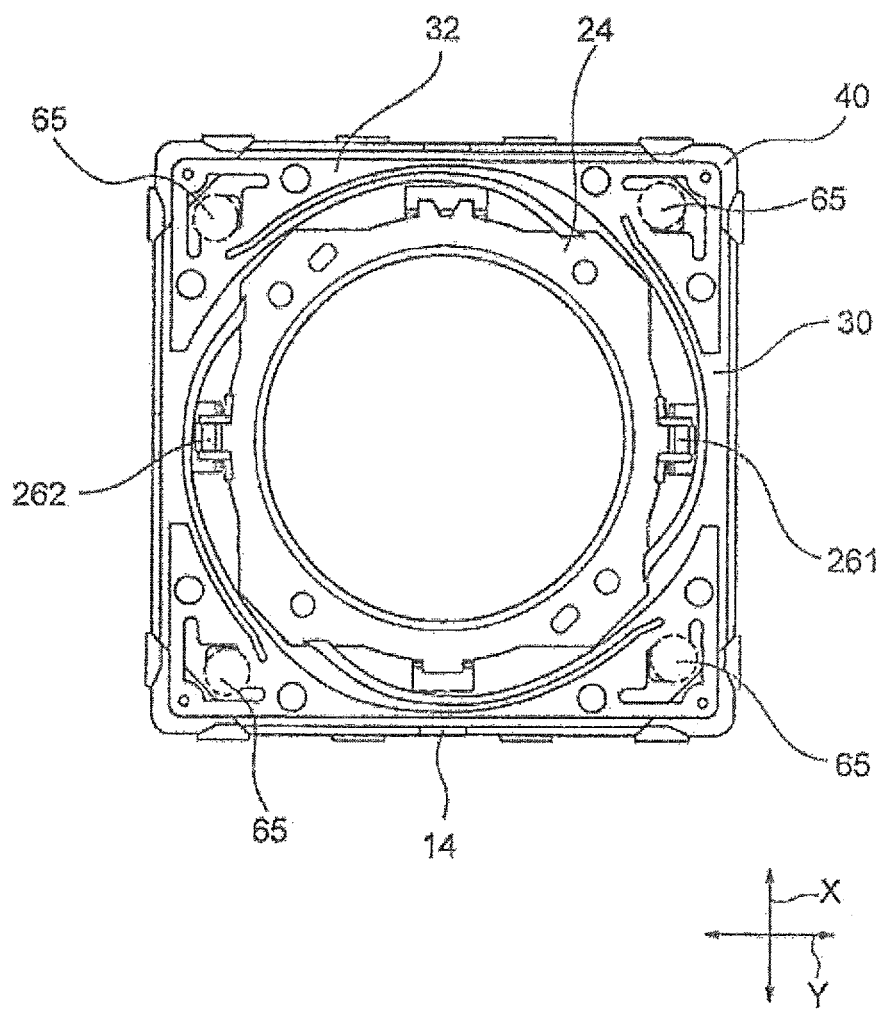
FIG. 31 is a plan view showing placement positions of a damper material in the lens driving device illustrated in FIG. 29 in which one part of an upper leaf spring (first leaf spring) is omitted.

While damper material 65 is provided at four places as shown in FIG. 31 in lens driving device 10 according to the first exemplary embodiment described above, the number of places at which damper material 65 is provided and the placement positions are not important for the present invention. The important point is that damper material 65 is disposed between movable portion (auto-focusing lens driving portion) 20 and the fixed member (14, 40, 18, and 44).

Figure 34:
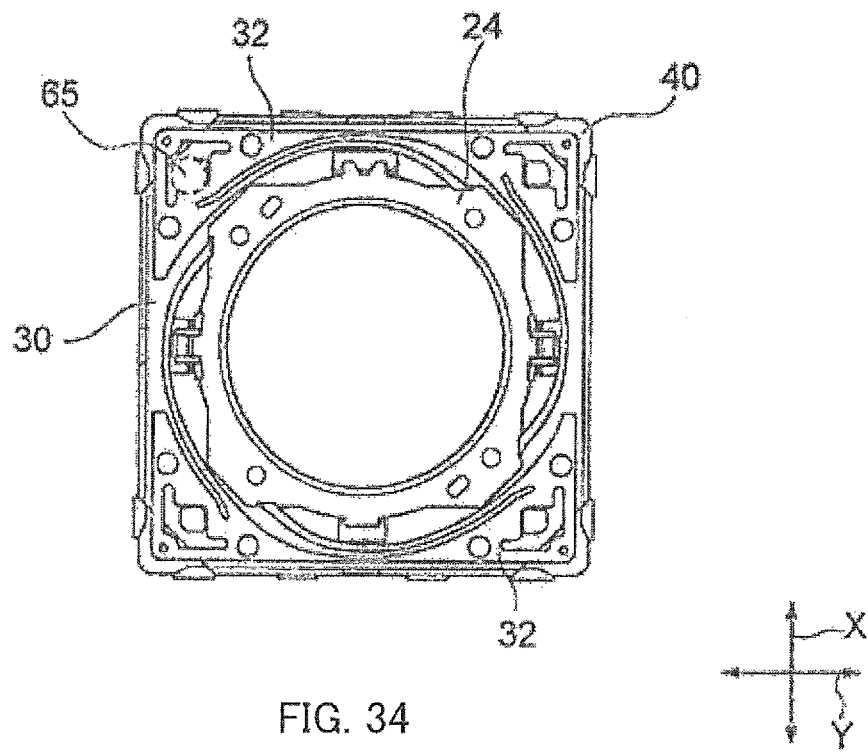
FIG. 34 is a plan view showing placement positions of a damper material in a lens driving device according to a second modified example of the first exemplary embodiment in a state in which a shielding cover is omitted therefrom and one part of an upper leaf spring (first leaf spring) is omitted.
Figure 35:
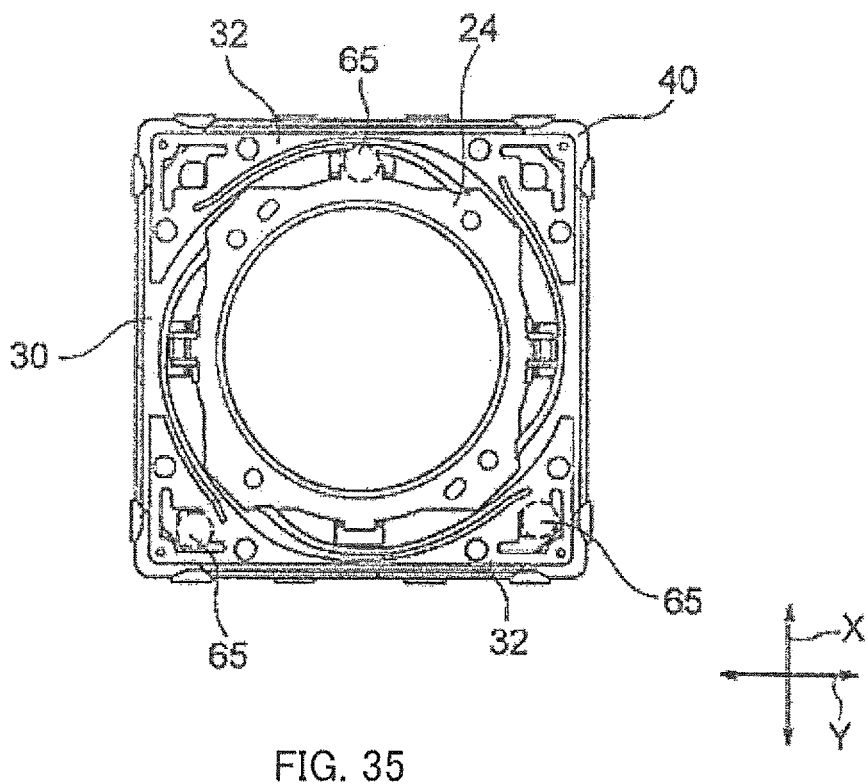
FIG. 35 is a plan view showing placement positions of a damper material in a lens driving device according to a third modified example of the first exemplary embodiment in a state in which a shielding cover is omitted therefrom and one part of an upper leaf spring (first leaf spring) is omitted.
Figure 36:
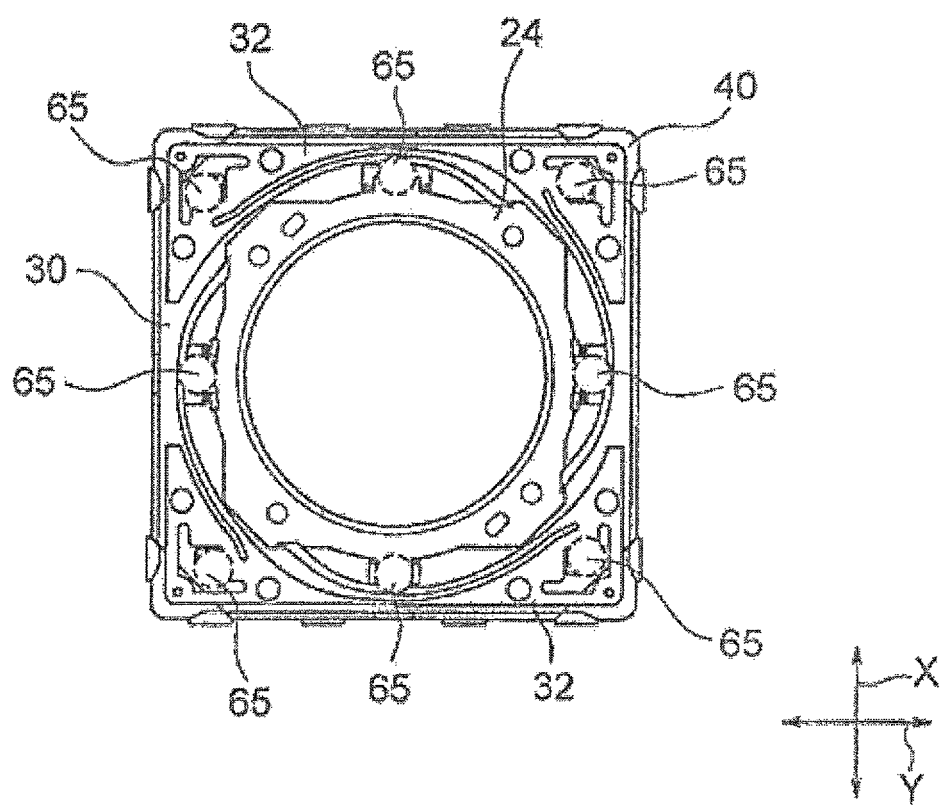
FIG. 36 is a plan view showing placement positions of a damper material in a lens driving device according to a fourth modified example of the first exemplary embodiment in a state in which a shielding cover is omitted therefrom and one part of an upper leaf spring (first leaf spring) is omitted.

For example, a configuration may be adopted in which damper material 65 is provided at only one place, as in lens driving device 10 according to a second modified example as illustrated in FIG. 34. Further, a configuration may be adopted in which damper material 65 is provided at three places, as in lens driving device 10 according to a third modified example as illustrated in FIG. 35. In addition, a configuration may be adopted in which damper material 65 is provided at eight places, as in lens driving device 10 according to a fourth modified example as illustrated in FIG. 36.

By providing damper material 65 at one or a plurality of places in this manner, effects similar to those of the above-mentioned first exemplary embodiment are obtained.

Figure 37:
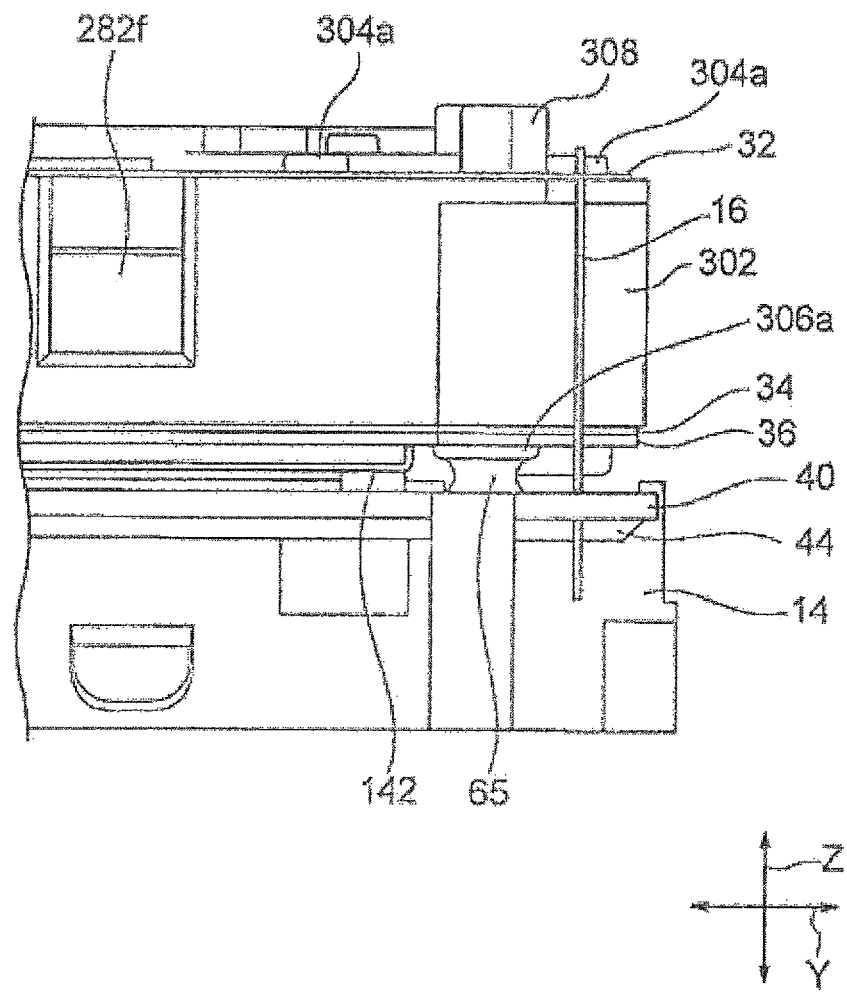
FIG. 37 is a partial vertical cross sectional view showing a state where a shielding cover is omitted from a lens driving device according to a fifth modified example of the first exemplary embodiment.

Further, in lens driving device 10 according to the first exemplary embodiment described above, as shown in FIG. 29 and FIG. 25, guide grooves 302*a* are faulted in magnet holder 30 to facilitate application of damper material 65. However, a configuration may also be adopted in which guide groove 302*a* is not provided, as in lens driving device 10 according to a fifth modified example as shown in FIG. 37.

Further, although the ultraviolet curing silicone gel is used as damper material 65 in lens driving device 10 according to the first exemplary embodiment described above, the material of damper material 65 is not limited thereto, and any material that has a damper effect may be used.

Second Exemplary Embodiment

Figure 38:
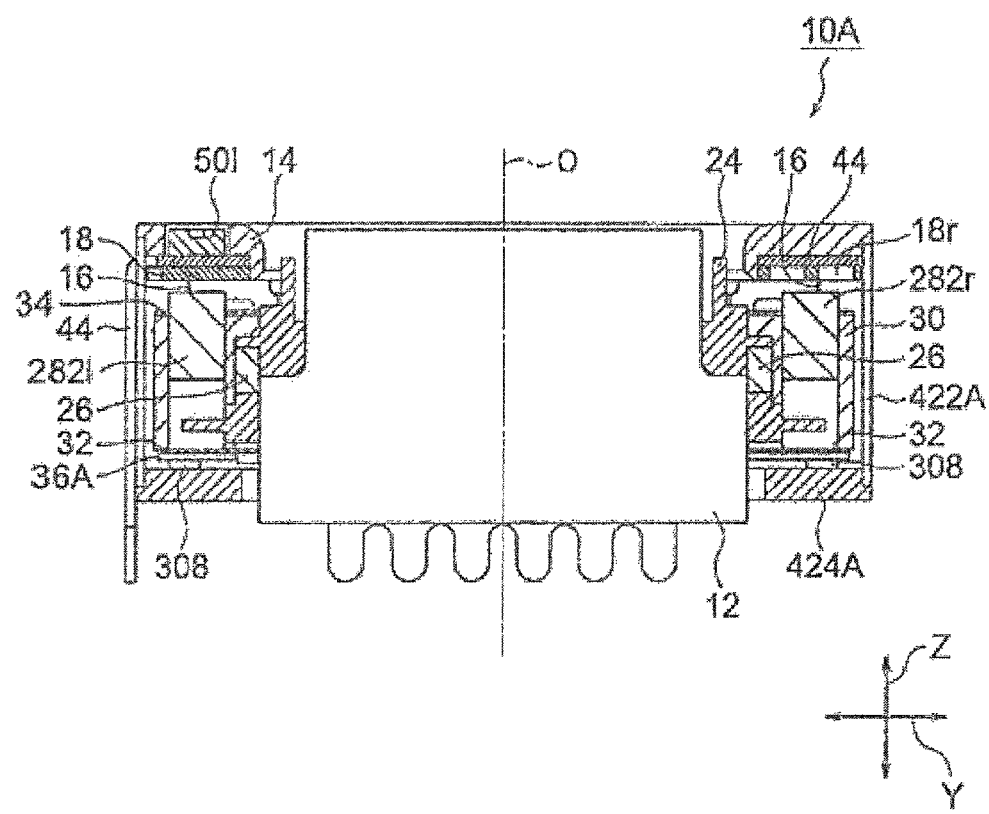
FIG. 38 is a vertical cross sectional view of a lens driving device according to a second exemplary embodiment of the present invention.
Figure 39:
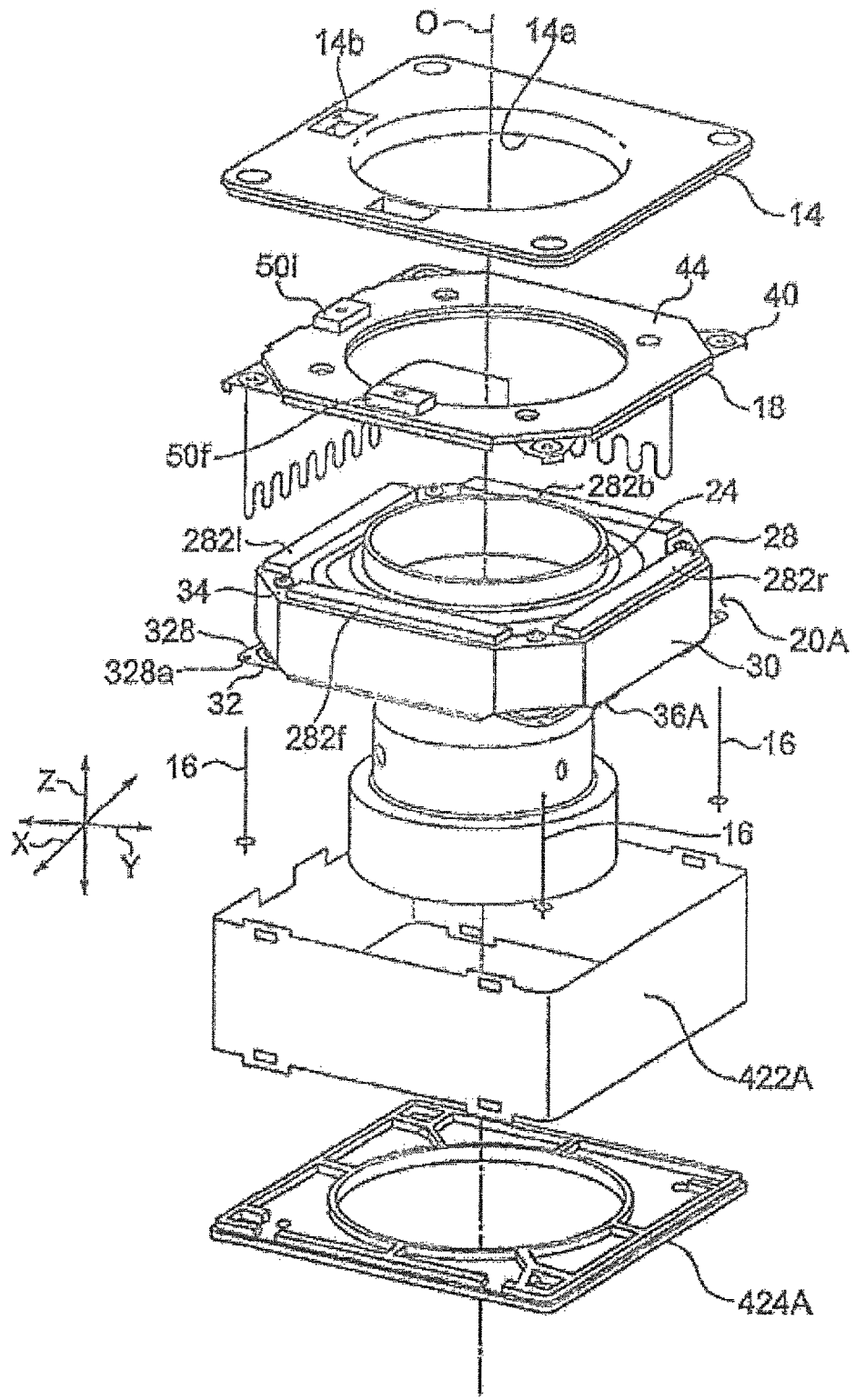
FIG. 39 is an exploded perspective view of the lens driving device illustrated in FIG. 38.

Referring to FIGS. 38 and 39, the description will proceed to lens driving device 10A according to a second exemplary embodiment of the present invention. FIG. 38 is a vertical cross sectional view of lens driving device 10A. FIG. 39 is an exploded perspective view of lens driving device 10A.

Herein, in the manner shown in FIGS. 38 and 39, an orthogonal coordinate system (X, Y, Z) is used. In a state illustrated in FIGS. 38 and 39, in the orthogonal coordinate system (X, Y, X), an X-axis direction is a fore-and-aft direction (a depth direction), a Y-axis direction is a left-and-right direction (a width direction), and a Z-axis direction is an up-and-down direction (height direction). In addition, in the example being illustrated in FIGS. 38 and 39, up-and-down direction Z is a direction of optical axis O of a lens. In the second exemplary embodiment, the X-axis direction (the fore-and-aft direction) is called a first direction while the Y-axis direction (the left-and-right direction) is called in a second direction.

However, in an actual use situation, the direction of optical axis O, namely, the Z-axis direction becomes a fore-and-aft direction. In other words, an upper direction of the Z-axis becomes a front direction while a lower direction of the Z-axis becomes a rear direction.

Illustrated lens driving device 10A includes auto-focusing lens driving portion 20A and an image stabilizer portion for stabilizing blurry images produced in auto-focusing lens driving portion 20A on picking up a static image using a miniature camera for a mobile phone and is a device which can pick up the image free from image blurred.

Illustrated lens driving device 10A has a structure in which lens driving device 10 according to the above-mentioned first exemplary embodiment is substantially turned upside down. Accordingly, it is suitable to change "upper" into "lower" and to change "lower" into "upper". In order to simplify the description, the same reference signs are attached to those having functions similar those of lens driving device 10 according to the first exemplary embodiment and the description will later be made as regards only differences.

Lens barrel 12 has a shape like a hanging bell. In place of shielding cover 42, shielding wall 422A having a rectangular tubular shape and second base (cover) 424A are used. In auto-focusing lens driving portion (AF unit) 20A, spacer 36A is mounted to lower leaf spring 32 serving as a first leaf spring.

A configuration except for those is similar to above-mentioned lens driving device 10 according to the first exemplary embodiment.

That is, damper material (not shown) is disposed between the fixed member (14, 40, 18, and 44) and auto-focusing lens driving portion (AF unit) 20A that is a movable portion.

Accordingly, lens driving device 10A according to the second exemplary embodiment of the present invention has effects similar to those of above-mentioned lens driving device 10 according to the first exemplary embodiment.

While this invention has been particularly shown and described with reference to the exemplary embodiments thereof, the invention is not limited to the embodiment. It will be understood by those of ordinary skill in the art that various changes in form and details may be therein without departing from the spirit and scope of the present invention as defined by the claims. For example, although the four suspension wires are used as the supporting member for swingably supporting the auto-focusing lens driving portion with respect to the fixed member in the above-mentioned exemplary embodiments, the number of the suspension wires is not limited to four and therefore may be two or more. Furthermore, although protrusions 306*a* are provided in magnet holder 30 in the above-described embodiment, a configuration may also be adopted in which, instead of providing protrusions 306*a*, a concave portion or convex portion is provided on coil board 40, and damper material is retained in that place.

The disclosures of the specification, the drawings and the abstract included in Japanese Patent Application No. 2012-029729 filed on Feb. 14, 2012 are incorporated herein by reference in their entirety.

REFERENCE SIGNS LIST

10, 10A Lens driving device
12 Lens barrel
12*a* Male thread
13 Image pickup board
131 Image pickup device
132 Infrared light cutoff filter
14 Base
14*a* Circular opening
14*b* Hole
142 Positioning protrusion
16 Suspension wire
18 Image stabilizer coil (second coil)
18*a* Land
18*f* Front-side image stabilizer coil portion
18*fl* Left-side coil part
18*fr* Right-side coil part
18*b* Back-side image stabilizer coil portion
18*l* Left-side image stabilizer coil portion
18*lf* Front-side coil part
18*lb* Back-side coil part
18*r* Right-side image stabilizer coil portion
20, 20A Auto-focusing lens driving portion (AF unit)
24 Lens holder
240 Tubular portion
240*a* Upper protrusion
240*b* Female screw thread
241 First projecting portion (right-side projecting portion)
242 Second projecting portion (left-side projecting portion)
25, 25A, 25B Yoke
252 Coupling portion (second yoke portion)
254 Vertical extension portion (first yoke portion)
254*a* Outer wall surface
26 Focusing coil (first coil)
261 First end portion (first tied-up part)
262 Second end portion (second tied-up part)
28 Permanent magnet
282 Permanent magnet piece
282*a* Inner wall surface (first surface)

282c Undersurface (second surface)
282f Front-side permanent magnet piece
282b Rear-side permanent magnet piece
282l Left-side permanent magnet piece
282r Right-side permanent magnet piece
29 Gap
30 Magnet holder
30a First end
30b Second end
302 Outer tubular portion
302a Guide groove
304 Upper ring-shaped end portion
304a Upper protrusion
306 Lower ring-shaped end portion
306a Lower protrusion
308 Stopper (fracture prevention supporting member)
32 First leaf spring (upper leaf spring)
32-1 First leaf spring piece
32-2 Second leaf spring piece
32a Opening
322 Upper inner end portion
322-1 First U-shaped terminal portion (right-side U-shaped terminal portion)
322-2 Second U-shaped terminal portion (left-side U-shaped terminal portion)
322a Upper hole
324 Upper outer end portion
324a Upper hole
326 Upper arm portion
328 Arc-shaped extending portion (fracture preventing member, wire fixing portion)
328a Wire fixing hole
34 Second leaf spring (lower leaf spring)
342 Lower inner end portion
342a Lower hole
344 Lower outer end portion
344a Lower hole
346 Lower arm portion
36, 36A Spacer
362 Inner ring portion
364 Outer ring portion
364a Lower hole
40 Coil board
40a Through hole
40b Positioning hole portion
40c Circular opening
42 Shielding cover
422 Rectangular tubular portion
422A Shielding wall
424 Upper end portion
424A Second base (cover)
424a Circular opening
44 Flexible printed circuit (FPC)
44a Positioning hole portion
44b Notch portion
46 Control portion
50 Position detection arrangement (Hall element)
50f Front-side Hall element
50l Left-side Hall element
60 Solder
62 Adhesive agent
65 Damper material
O Optical axis
X First direction (fore-and-aft direction)
Y Second direction (left-and-right direction)

The invention claimed is:

1. A lens driving device, comprising:
a lens holder to which a lens barrel is mounted, the lens holder being movable in a direction of an optical axis;
a first coil for auto-focusing wound around the lens holder about the optical axis;
a plurality of magnets that each have a rectangular shape extending in a longitudinal direction and a short-side direction orthogonal to the longitudinal direction while being magnetized in the short-side direction, wherein each of the plurality of magnets has a first surface that extends in the longitudinal direction and magnetized to a south pole or a north pole and a second surface that is perpendicular to the first surface and the optical axis, the first surface of the plurality of magnets facing a circumferential face of the first coil;
a magnet holder that fixes the plurality of magnets apart from each other;
a yoke comprising, together with the plurality of magnets, a magnetic circuit that generates a magnetic flux that crosses the first coil;
a second coil for image stabilizing that comprises a plurality of image stabilizer coil portions, each provided such that a coil plane thereof faces the second surface of a corresponding one of the plurality of magnets and each having a shape extending in the longitudinal direction of the magnet, which is opposite thereto; and
a base on which the second coil is disposed,
wherein an auto-focusing lens driving portion that includes the lens holder, the first coil, the plurality of magnets, the magnet holder and the yoke is held so as to be relatively movable in first and second directions perpendicular to the optical axis with respect to the base,
a position detection arrangement that detects a position of the auto-focusing lens driving portion with respect to the base, comprising:
a plurality of Hall elements, each provided facing the second surface of a corresponding one of the plurality of magnets,
wherein the plurality of image stabilizer coil portions include specific image stabilizer coil portions disposed in the first and the second directions, each of the specific image stabilizer coil portions being divided into a plurality of coil parts disposed along the longitudinal direction of the magnet, which is opposite thereto, and
wherein each Hall element of the plurality of Hall elements is disposed on an imaginary line parallel to the optical axis and passing between two of the plurality of coil parts of each of the specific image stabilizer coil portions.

2. The lens driving device according to claim 1, wherein the magnet holder is a polygonal frame body.

3. The lens driving device according to claim 2, wherein the plurality of magnets are fixed to the magnet holder at positions such that adjacent magnets are in a perpendicular relationship with respect to each other.

4. The lens driving device according to claim 3, wherein a number of the magnets is four.

5. The lens driving device according to claim 1, wherein a number of the first yoke portions is four.

6. The lens driving device according to claim 1, wherein the yoke is fixed to the magnet holder.

7. The lens driving device according to claim 1, wherein:
the yoke comprises further a plurality of members; and
a predetermined part of the lens holder is located in a space between two of the plurality of members.

8. The lens driving device according to claim 1, wherein an image pickup device is mounted on the base.

9. A camera comprising the lens driving device according to claim 1 incorporated therein.

10. The lens driving device according to claim 1, wherein the yoke further comprises a plurality of first yoke portions disposed apart from each other, and a frame-shaped second yoke portion, one of the plurality of the first yoke portions extending from an inner edge of the second yoke portion so as to correspond to a separation part between adjacent magnets and being disposed so that the first coil is positioned between the one of the plurality of the first yoke portions and the adjacent magnets, the second yoke portion being disposed facing a third surface opposite to the second surface of the plurality of magnets, and wherein the one of the plurality of the first yoke portion comprises a first wall surface that faces a separation part between the adjacent magnets, and second wall surfaces that face end portions of the adjacent magnets, respectively.

* * * * *